United States Patent
Kajino

(10) Patent No.: US 11,541,783 B2
(45) Date of Patent: Jan. 3, 2023

(54) SEAT LIFTER DEVICE

(71) Applicant: TOYOTA BOSHOKU KABUSHIKI KAISHA, Aichi-ken (JP)

(72) Inventor: Yusuke Kajino, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/521,306

(22) Filed: Nov. 8, 2021

(65) Prior Publication Data

US 2022/0144149 A1 May 12, 2022

(30) Foreign Application Priority Data

Nov. 10, 2020 (JP) .............................. JP2020-187133

(51) Int. Cl.
*B60N 2/16* (2006.01)

(52) U.S. Cl.
CPC ........... *B60N 2/167* (2013.01); *B60N 2/1655* (2013.01)

(58) Field of Classification Search
CPC ...... B60N 2/167; B60N 2/1615; B60N 2/165; B60N 2/168; B60N 2/169; B60N 2/2227; B60N 2/1882; B60N 2/1889; B60N 2/1892
USPC .................................. 297/338, 339, 344.15
See application file for complete search history.

(56) References Cited

U.S. PATENT DOCUMENTS

| | | | | |
|---|---|---|---|---|
| 10,766,383 | B2* | 9/2020 | Mike | B60N 2/168 |
| 2015/0096859 | A1* | 4/2015 | Isoda | B60N 2/1882 |
| | | | | 192/15 |
| 2017/0240069 | A1 | 8/2017 | Asai et al. | |
| 2021/0122264 | A1* | 4/2021 | Kajino | B60N 2/0244 |
| 2021/0207665 | A1* | 7/2021 | Mikasa | B60N 2/165 |

FOREIGN PATENT DOCUMENTS

JP 2016-78850 A 5/2016

\* cited by examiner

*Primary Examiner* — Sarah B McPartlin
(74) *Attorney, Agent, or Firm* — Greenblum & Bernstein, P.L.C.

(57) ABSTRACT

A seat lifter device includes: an output shaft; a support unit that supports the output shaft; an input unit; a ratchet-type feed unit configured to transmit rotation of the input unit to the output shaft; a lock unit configured to lock rotation of the output shaft relative to the support unit; a friction generation unit configured to apply a friction force between a rotation member and the support unit in response to an operation of the input unit rotating in a direction in which the seat is lowered; and a slippage preventing unit. When the input unit rotates in the direction in which the seat is lowered and the output shaft rotates preceding to the feed unit against the friction force to slip, the slippage preventing unit is fitted to the support unit by an elastic force in response to slippage of the output shaft to stop the slippage.

6 Claims, 38 Drawing Sheets

SEAT LIFTER DEVICE

CROSS-REFERENCE TO RELATED APPLICATIONS

This application claims priority from Japanese Patent Application No. 2020-187133 filed on Nov. 10, 2020, the entire contents of which are incorporated herein by reference.

TECHNICAL FIELD

The present disclosure relates to a seat lifter device. Specifically, the present disclosure relates to a seat lifter device including an output shaft that raises and lowers a seat in accordance with a rotational operation amount of an operation handle.

BACKGROUND

A vehicle seat disclosed in JP-A-2016-78850 includes a seat lifter device that can adjust a seat surface height of a seat cushion. Specifically, the seat lifter device transmits an operational movement amount of an operation handle as a feed rotation movement amount of a gear by pulling the operation handle upward and pushing the operation handle downward to raise and lower the seat surface height by a certain amount each time. When the operation of the operation handle is released, the seat lifter device locks the rotation of the gear in its position and returns the operation handle to a neutral position before the operation by biasing the operation handle, so that the seat lifter device returns to an initial state in which the operation handle can be re-operated.

The feed rotation of the gear accompanying the operation of the operation handle is performed by pushing a feed claw meshed with the gear in the operation direction of the operation handle. The rotation of the gear is locked as follows when the operation of the operation handle is released. That is, a lock pawl, which includes a pair of symmetrical structures meshed with the gear, has a ratchet meshing structure in which one symmetrical structure is unmeshed accompanying the operation of the operation handle and the other symmetrical structure releases the rotation in the feed direction and bites in the opposite direction. When the operation of the operation handle is released, the other symmetrical structure stops the rotation of the gear in its position.

Similar to the lock pawl, the feed claw that performs the feed rotation of the gear includes a pair of symmetrical structures to allow the movement of returning the operation handle to the neutral position when the operation of the operation handle is released. The feed pawl has a ratchet meshing structure in which one symmetrical structure is unmeshed from the gear accompanying the operation of the operation handle and the other symmetrical structure meshes with the gear to transmit power in the feed direction and releases rotation in the opposite direction.

SUMMARY

In the related art described above, a friction force is constantly applied to an output shaft to prevent the output shaft from slipping due to the weight of the seat when the operation handle is pulled downward. However, when an excessive load exceeding the friction force is input to the seat, the seat may be lowered beyond a rotational operation amount of the operation handle. The present disclosure may provide a seat lifter device that can appropriately stop a seat from slipping when the seat is lowered.

One illustrative aspect of the present disclosure provides a seat lifter device including an output shaft configured to raise and lower a seat in accordance with a rotational operation amount of an operation handle. The seat lifter device includes a support unit that supports the output shaft such that the output shaft is rotatable, and an input unit rotatably coupled to the support unit and integrally coupled to the operation handle. The seat lifter device further includes a feed unit that transmits rotation of the input unit to the output shaft, and a lock unit that locks rotation of the output shaft relative to the support unit. The seat lifter device further includes a friction generation unit provided between the support unit and a rotation member configured to rotate together with the output shaft, and a slippage preventing unit provided in a power transmission path between the output shaft and the feed unit.

The feed unit is of a ratchet type, transmits bidirectional rotation of the input unit from a neutral position to the output shaft, and does not transmit rotation of the input unit returning to the neutral position to the output shaft. The lock unit unlocks the output shaft in response to an operation of the input unit rotating from the neutral position, and locks the rotation of the output shaft in response to an operation of the input unit returning to the neutral position. The friction generation unit applies a friction force between the rotation member and the support unit in response to the operation of the input unit rotating in a direction in which the seat is lowered, thereby stopping preceding rotation of the output shaft due to a weight of the seat. The slippage preventing unit transmits rotation of the feed unit to the output shaft by the operation of the input unit rotating from the neutral position. When the input unit rotates in the direction in which the seat is lowered and the output shaft rotates preceding to the feed unit against the friction force of the friction generation unit to slip, the slippage preventing unit is fitted to the support unit by an elastic force in response to the slippage of the output shaft to stop the slippage.

According to the above-described configuration, when the input unit is rotated in the direction in which the seat is lowered, the lock unit is unlocked and the output shaft is fed in a rotation direction in which the seat is lowered via the feed unit. At this time, the output shaft is prevented from slipping due to the weight of the seat by the friction generation unit. Even when an excessive load in a downward rotation direction that exceeds the friction force of the friction generation unit is input to the output shaft from an output side, the slippage preventing unit is fitted to the support unit so that a slip rotation is prevented. Therefore, it is possible to appropriately stop the slippage of the seat when the seat is lowered.

DETAILED DESCRIPTION

Figure 1:
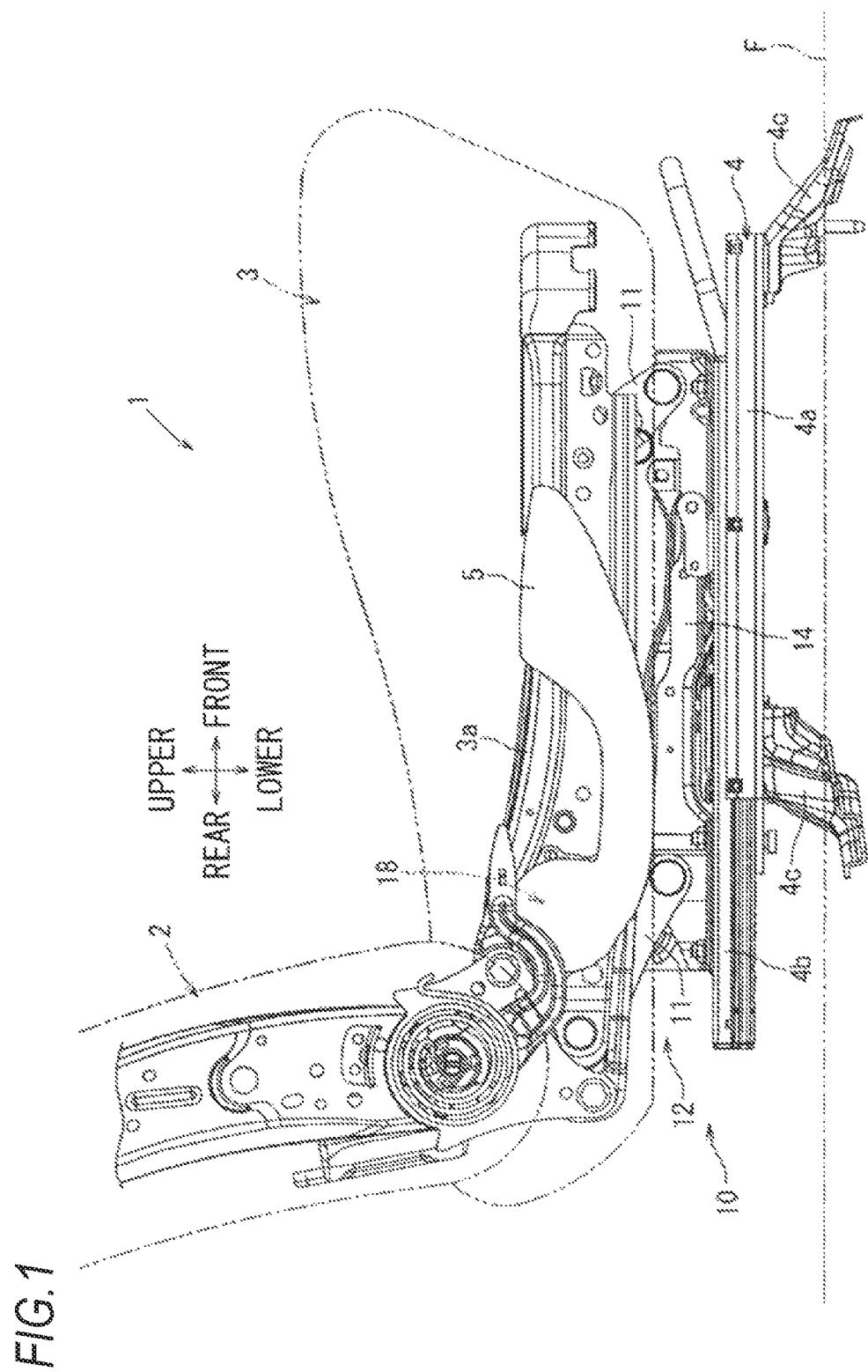
FIG. 1 is an outer side view illustrating a schematic configuration of a seat lifter device according to a first embodiment.

Hereinafter, embodiments of the present disclosure will be described with reference to the drawings.

First Embodiment

First, a configuration of a seat lifter device 10 according to the first embodiment of the present disclosure will be described with reference to FIGS. 1 to 38. In the following description, a forward direction, a rearward direction, an upward direction, a downward direction, a leftward direction, and a rightward direction refer to directions illustrated in the drawings. The term "seat width direction" refers to a left-right direction of a seat 1 to be described later. Further, in the following description, when no specific reference view is illustrated or when there is no corresponding reference numeral in a reference view, one of FIGS. 1 to 16 is appropriately referred to.

{Schematic Configuration of Seat Lifter Device 10}

Figure 2:
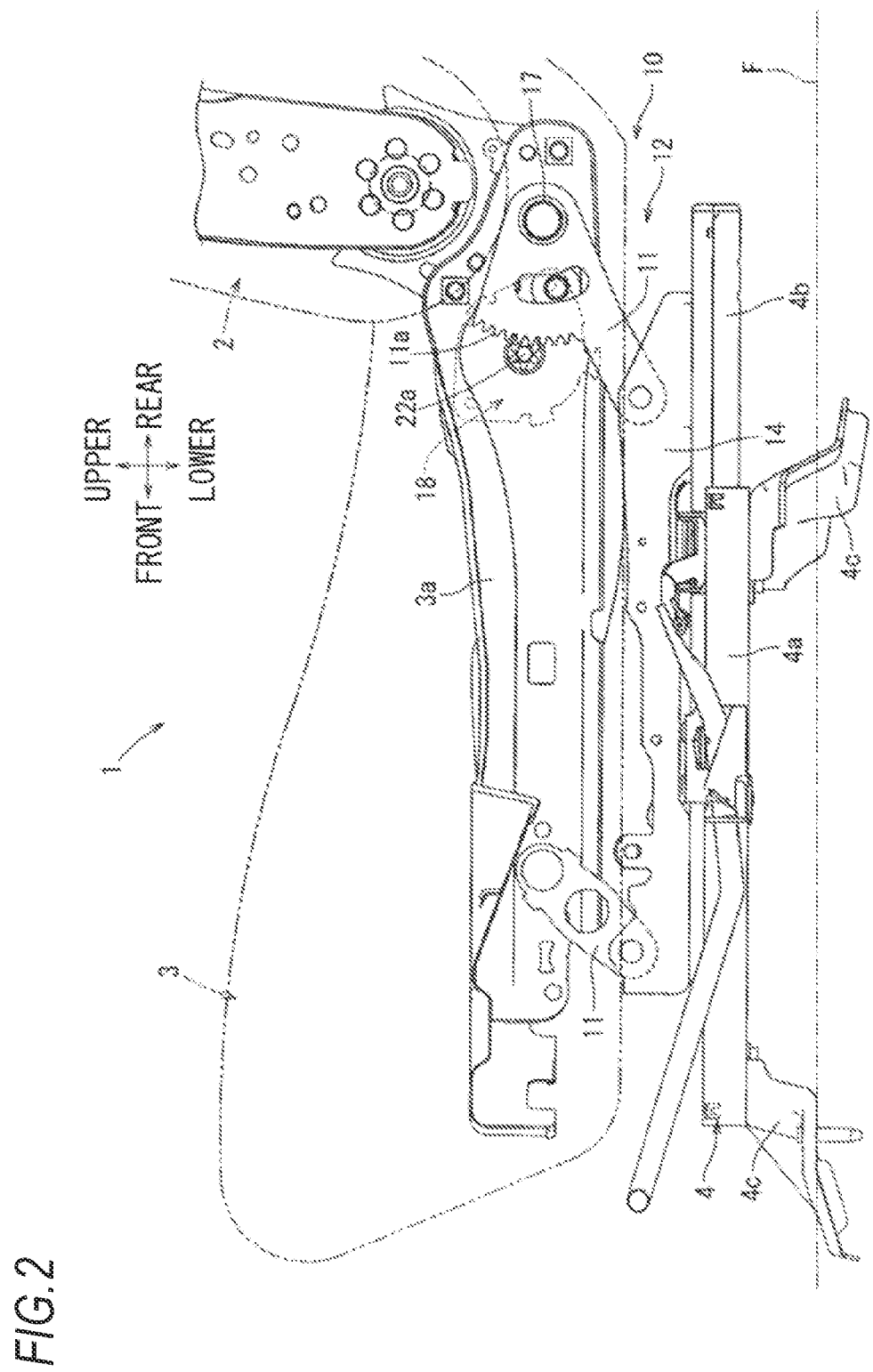
FIG. 2 is a side view of the structure on the same outer side as viewed from an inner side in a seat width direction.

The seat lifter device 10 according to the present embodiment is applied to the seat 1 of an automobile. As illustrated in FIGS. 1 and 2, the seat 1 includes a seat back 2 that is a backrest portion for a seated occupant and a seat cushion 3 that is a seat portion. The seat back 2 is coupled to a rear end portion of the seat cushion 3 via a recliner (not illustrated) such that a backrest angle is adjustable. The seat cushion 3 is coupled to a floor F of the vehicle via a seat slide device 4, which includes a pair of left and right rail structures, such that the position of the seat cushion 3 in a front-rear direction is adjustable.

The seat lifter device 10 including a pair of left and right link structures is coupled between the seat cushion 3 and the seat slide device 4 including a pair of left and right rail structures. By the coupling of the seat lifter device 10, the position of the seat cushion 3 in the height direction relative to the floor F is also adjustable.

The seat slide device 4 is a known device and includes a pair of left and right lower rails 4a extending in the front-rear direction, and a pair of left and right upper rails 4b assembled to the respective left and right lower rails 4a to be slidable in the front-rear direction. Each of the pair of left and right lower rails 4a is fixed to the floor F via a pair of front and rear legs 4c.

The seat lifter device 10 includes a support bracket 14 fixed to each of the upper rails 4b, and a pair of front and rear link members 11 coupled between the support bracket 14 and a corresponding side frame 3a of the seat cushion 3. By the coupling, the seat lifter device 10 includes a pair of left and right four-joint link mechanisms 12 in which the pair of front and rear link members 11 perform a link movement between the side frame 3a and the support bracket 14 on left and right sides.

As illustrated in FIG. 2, of the front, rear, left, and right four link members 11, the right rear link member 11 is formed with a sector gear 11*a* that meshes with a pinion gear 22*a* of a rotation control device 18 attached to the right side frame 3*a*. With the above-described configuration, the right rear link member 11 receives the transmission of a rotational driving force from the pinion gear 22*a* and performs the link movement. An upper end portion of the right rear link member 11 is rotatably coupled to the right side frame 3*a* via a torque rod 17.

The torque rod 17 is integrally bridged between an upper end portion of the right rear link member 11 and an upper end portion of the left rear side link member 11 to synchronously drive and rotate the two link members 11. When the rear link members 11 perform the link movement simultaneously, the front link members 1I constituting the four-bar link mechanisms 12 also perform the link movement synchronously. Accordingly, the position of the seat cushion 3 in a height direction relative to the floor F is adjusted.

Figure 3:
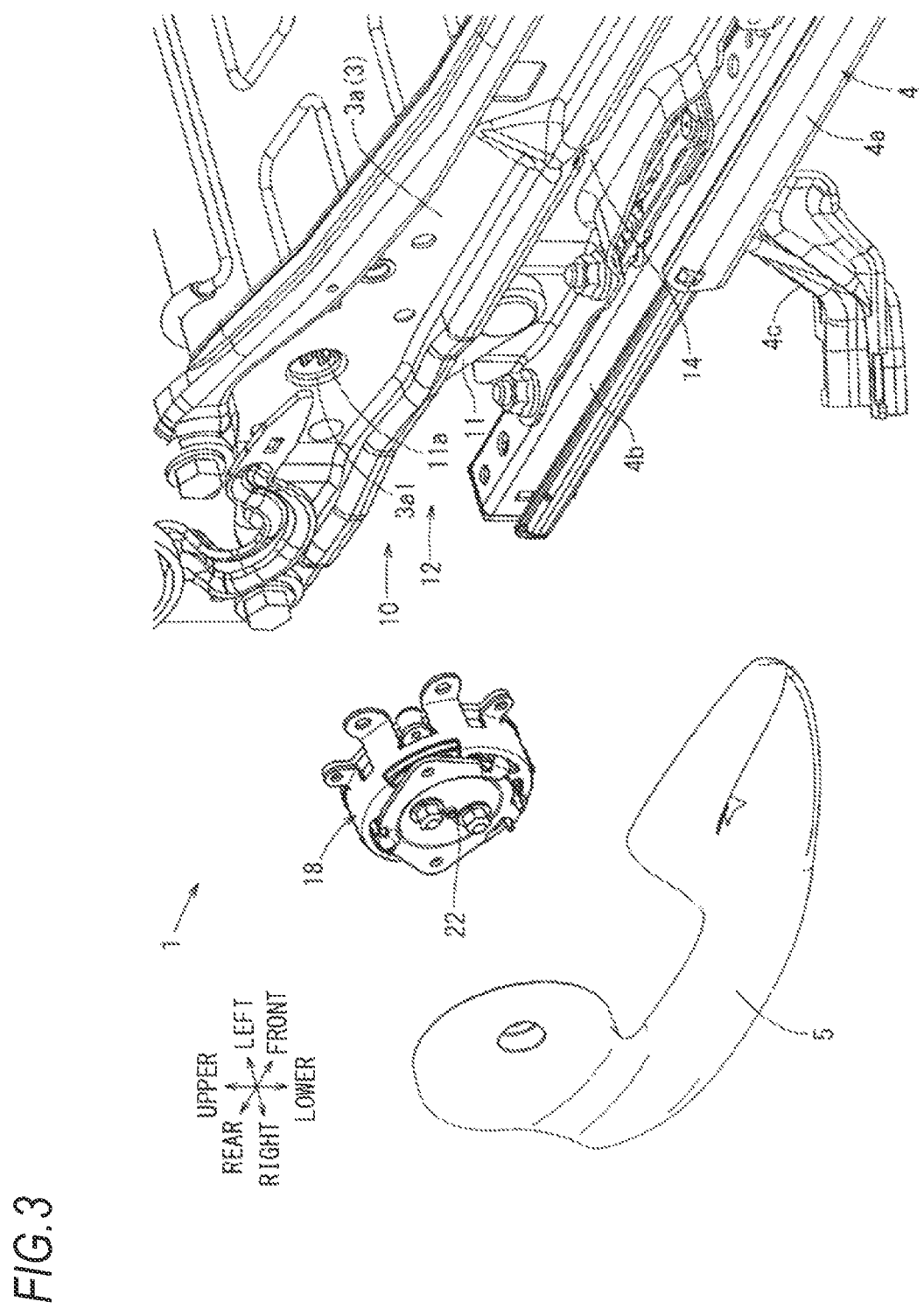
FIG. 3 is an exploded perspective view illustrating a state in which an operation handle and a rotation control device are detached from a side frame of a seat cushion.
Figure 4:
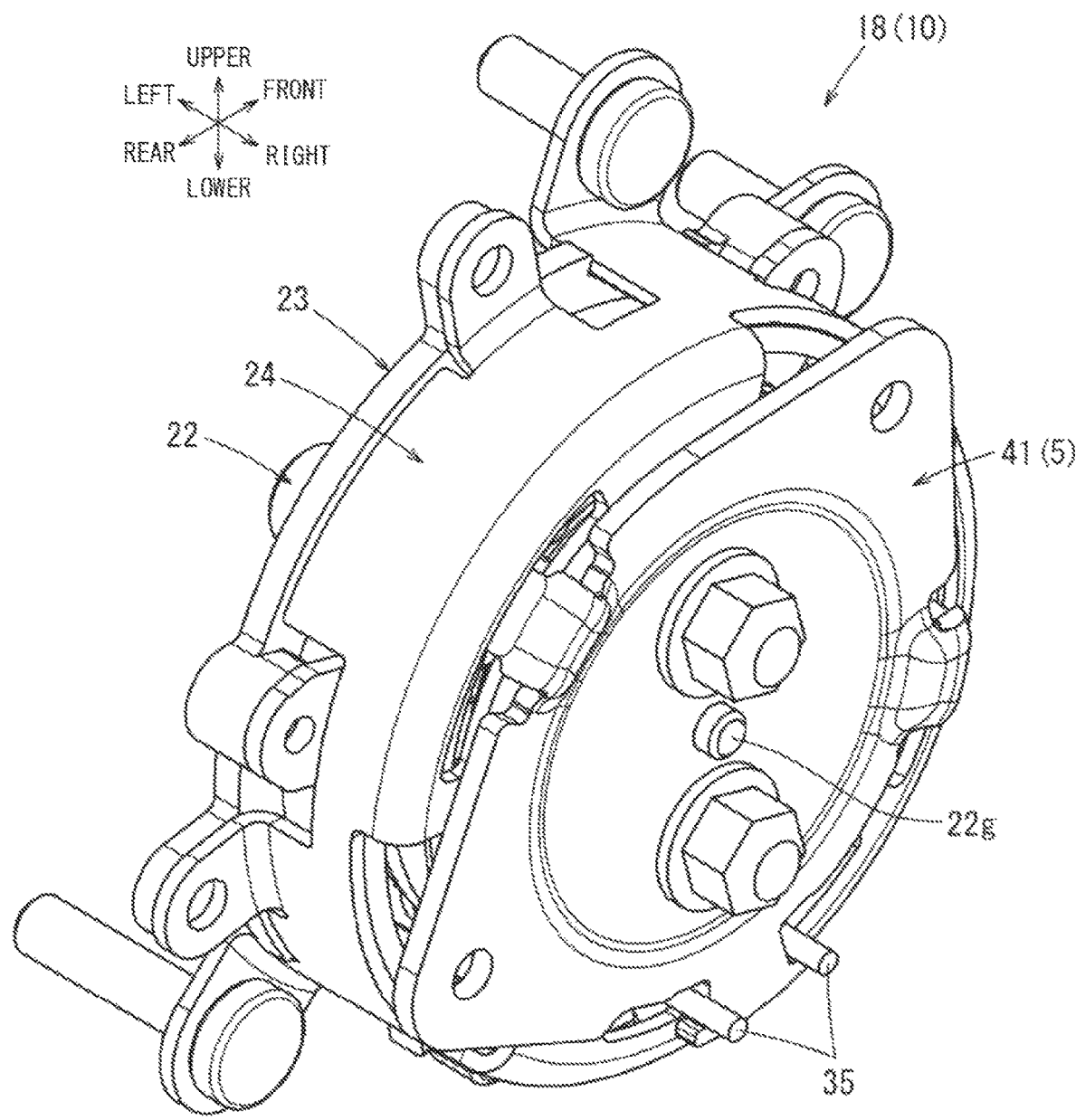
FIG. 4 is a perspective view of the rotation control device as viewed from an outer side in the seat width direction.
Figure 5:
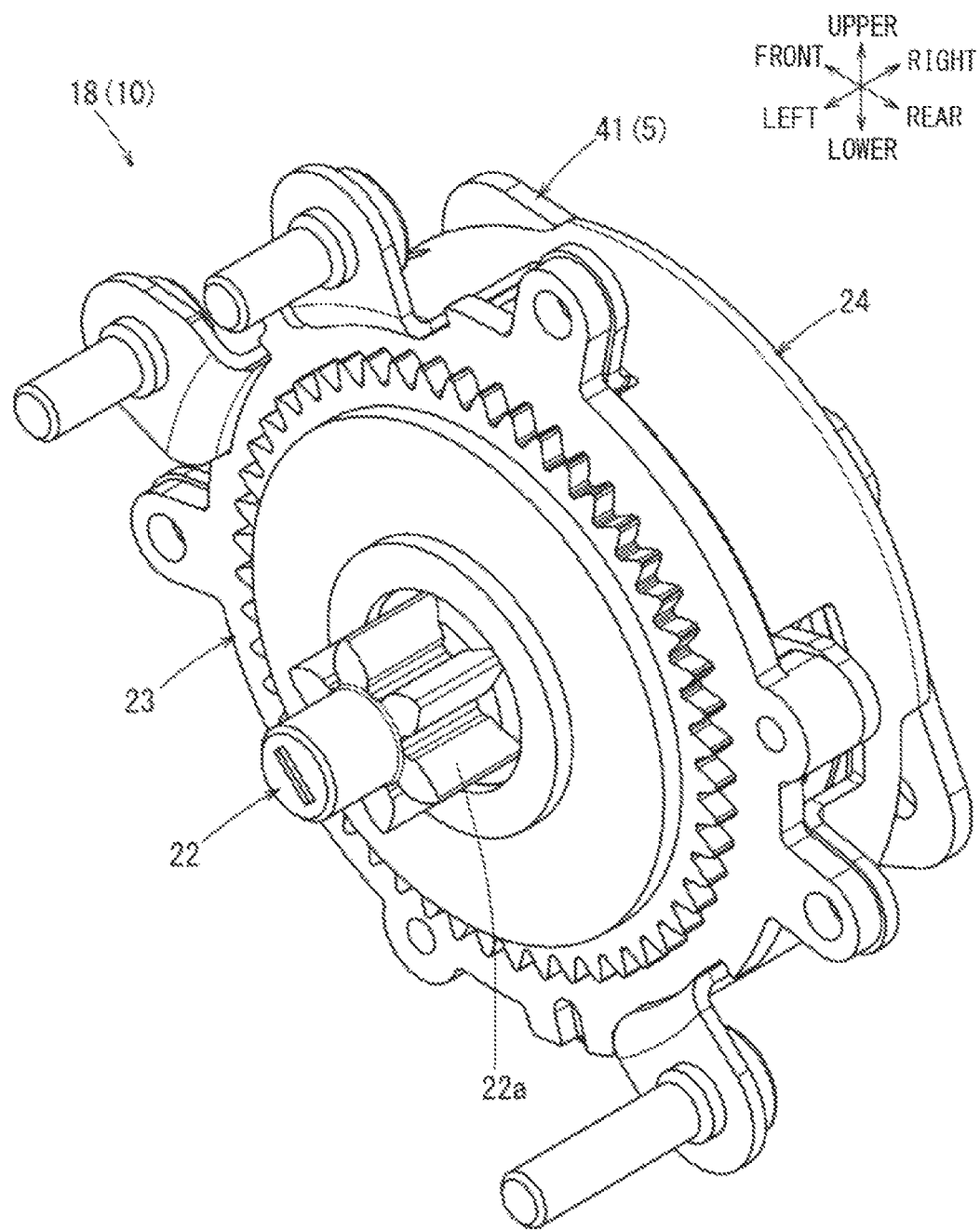
FIG. 5 is a perspective view of the rotation control device as viewed from the inner side in the seat width direction.
Figure 6:
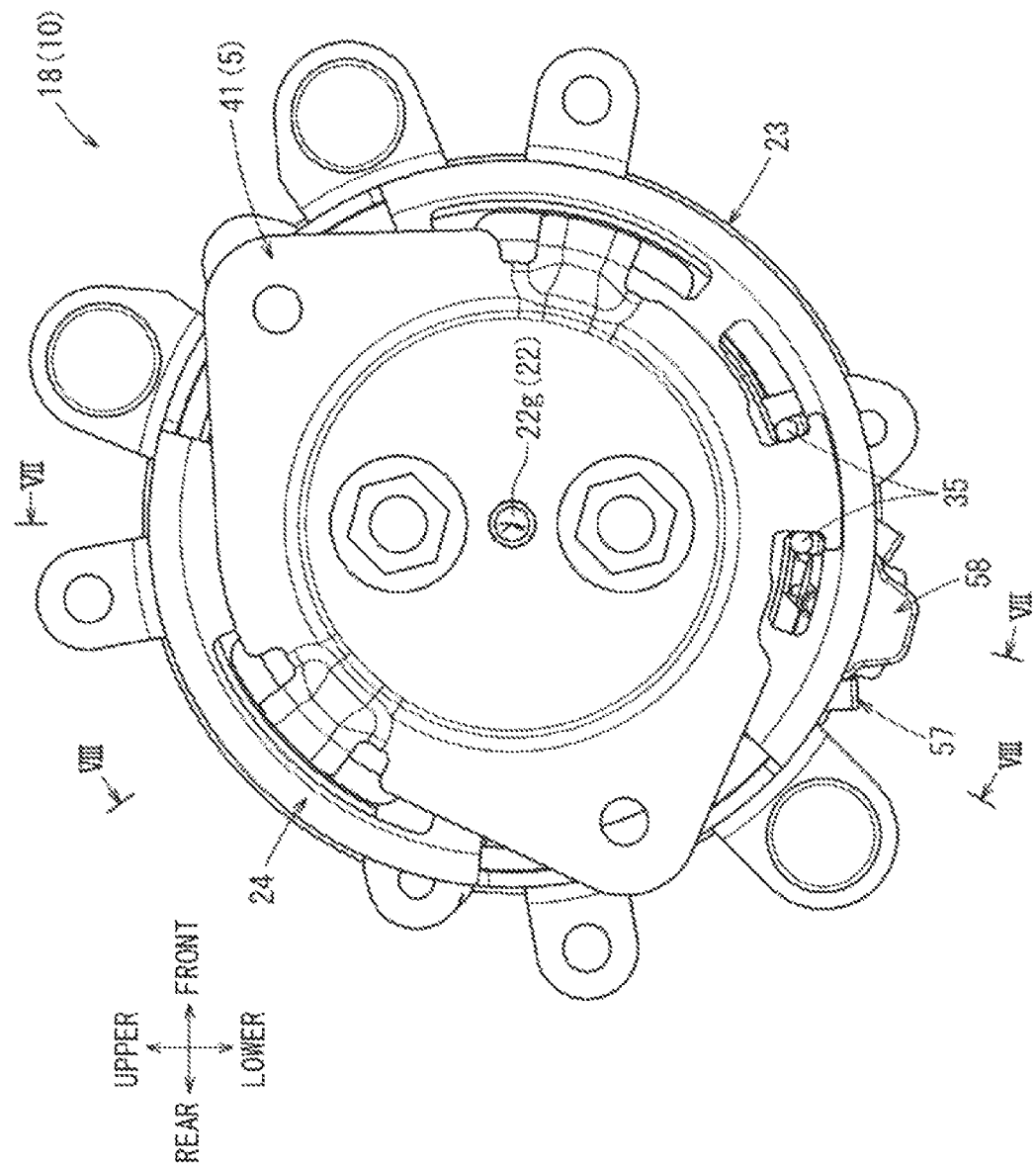
FIG. 6 is a front view of the rotation control device as viewed from the outer side in the seat width direction.

The rotation control device 18 is assembled to a right side portion of the right side frame 3*a*. Specifically, the rotation control device 18 is assembled to the side frame 3*a* in a state in which the pinion gear 22*a* is inserted through a through hole 3*al* formed in the right side frame 3*a* and is meshed with the sector gear 11*a* located on a left side of the side frame 3*a*. As illustrated in FIG. 3, an operation handle 5 extending forward is assembled to the rotation control device 18.

The operation handle 5 extends forward from a right rear portion of the seat cushion 3 and allows a user to pull the operation handle 5 upward and push the operation handle 5 downward from a neutral position. When the operation handle 5 is pulled upward and pushed downward from the neutral position, a rotational force corresponding to a movement amount in a corresponding operation direction is input to the rotation control device 18. Accordingly, the rotational force in the corresponding operation direction is transmitted to the pinion gear 22*a* formed on an output shaft 22 of the rotation control device 18 and the right rear link member 11 is moved in a rotation direction corresponding to the operation direction.

Specifically, the rotation control device 18 constantly keeps the operation handle 5 in the neutral position and prevents the output shaft 22 from rotating before the operation handle 5 is operated. When the operation handle 5 is pulled upward from the neutral position, the rotation control device 18 outputs to the pinion gear 22*a* a rotational force in a direction in which the right rear link member 11 is raised forward. Accordingly, the seat cushion 3 is pulled upward from the floor F.

When the operation handle 5 is pushed down from the neutral position, the rotation control device 18 outputs to the pinion gear 22*a* a rotational force in a direction in which the right rear link member 11 is tilted rearward. Accordingly, the seat cushion 3 is pushed downward toward the floor F. After the operation handle 5 is pulled upward and pushed downward from the neutral position, the operation state of the operation handle 5 is released. Accordingly, the rotation control device 18 operates to stop the pinion gear 22*a* in its rotation position and to return the operation handle 5 to the neutral position.

{Schematic Configuration of Rotation Control Device 18}

Hereinafter, a specific configuration of the rotation control device 18 will be described with reference to FIGS. 4 to 38. All members constituting the rotation control device 18 are pressed metal members.

As illustrated in FIGS. 4 to 8, the rotation control device 18 is a substantially disk-shaped unit whose axial direction is oriented in the seat width direction. Specifically, as illustrated in FIGS. 9 to 12, the rotation control device 18 includes an input unit N that is integrally assembled with the operation handle 5 (see FIG. 3) and a support unit S that is integrally assembled with the right side frame 3*a* (see FIG. 3).

The rotation control device 18 includes the output shaft 22 that receives a rotational force transmitted from the input unit N, and a feed unit A that transmits the rotational force from the input unit N to the output shaft 22. The rotation control device 18 further includes a lock unit B that locks the rotation of the output shaft 22 when no rotational force is transmitted from the input unit N, and a speed increasing unit U that increases the speed of the rotation of the output shaft 22 and transmits the rotation to a power transmission path between the lock unit B and the speed increasing unit U. The rotation control device 18 further includes a friction generation unit G that applies a friction force to the rotation of the output shaft 22, and a slippage preventing unit D that prevents the output shaft 22 from slipping during downward rotation.

Configurations of the above-described units will be described in detail. The input unit N includes an outer lever 41 and an inner lever 53 each having a substantially disk shape. The outer lever 41 and the inner lever 53 are integrally assembled side by side on a central axis C extending in the seat width direction with a cover 24, which will be described later, interposed therebetween.

The support unit S includes a substantially disk-shaped body base 23, a substantially ring plate-shaped intermediate base 25, and the substantially disk-shaped cover 24. The body base 23, the intermediate base 25, and the cover 24 are integrally assembled side by side in order on the central axis C extending in the seat width direction.

The feed unit A includes four feed claws 52, a substantially disk-shaped rotation transmission plate 36, and a substantially disk-shaped output plate 75. The four feed claws 52 are rotatably assembled to the inner lever 53. The rotation transmission plate 36 and the inner lever 53 are assembled side by side on the central axis C extending in the seat width direction and are relatively rotatable around the central axis C.

The rotation transmission plate 36 is assembled to the output plate 75 such that the output plate 75 can be rotated together in the rotation direction. The output shaft 22 is inserted into a central portion (portion through which the central axis C passes) of the output plate 75 and is integrally assembled with the output plate 75.

Figure 17:
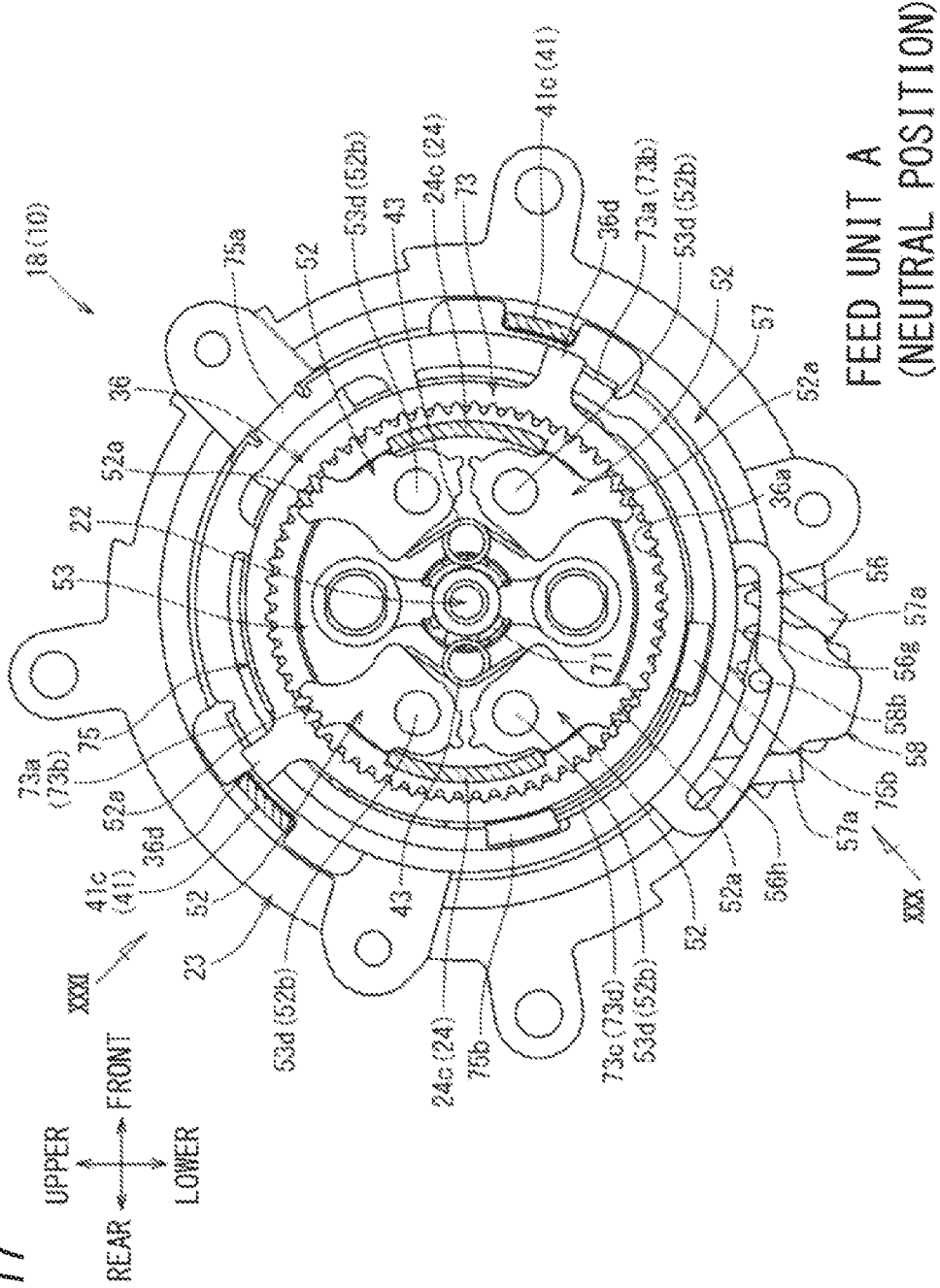
FIG. 17 is a schematic view illustrating a state of a feed unit when an operation handle is in a neutral position.
Figure 19:
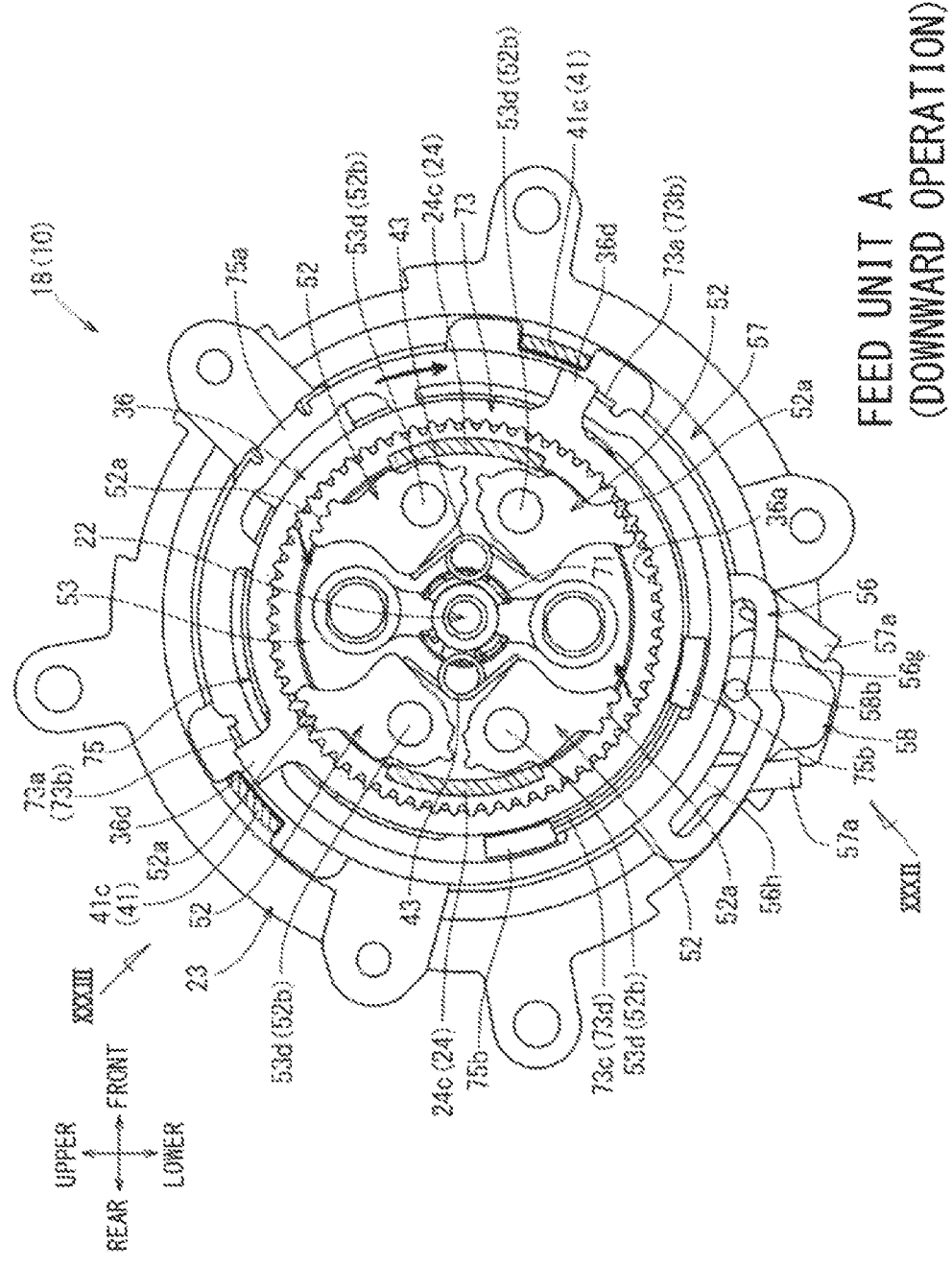
FIG. 19 is a schematic view illustrating a state of the feed unit when the operation handle is pushed downward from the neutral position.
Figure 24:
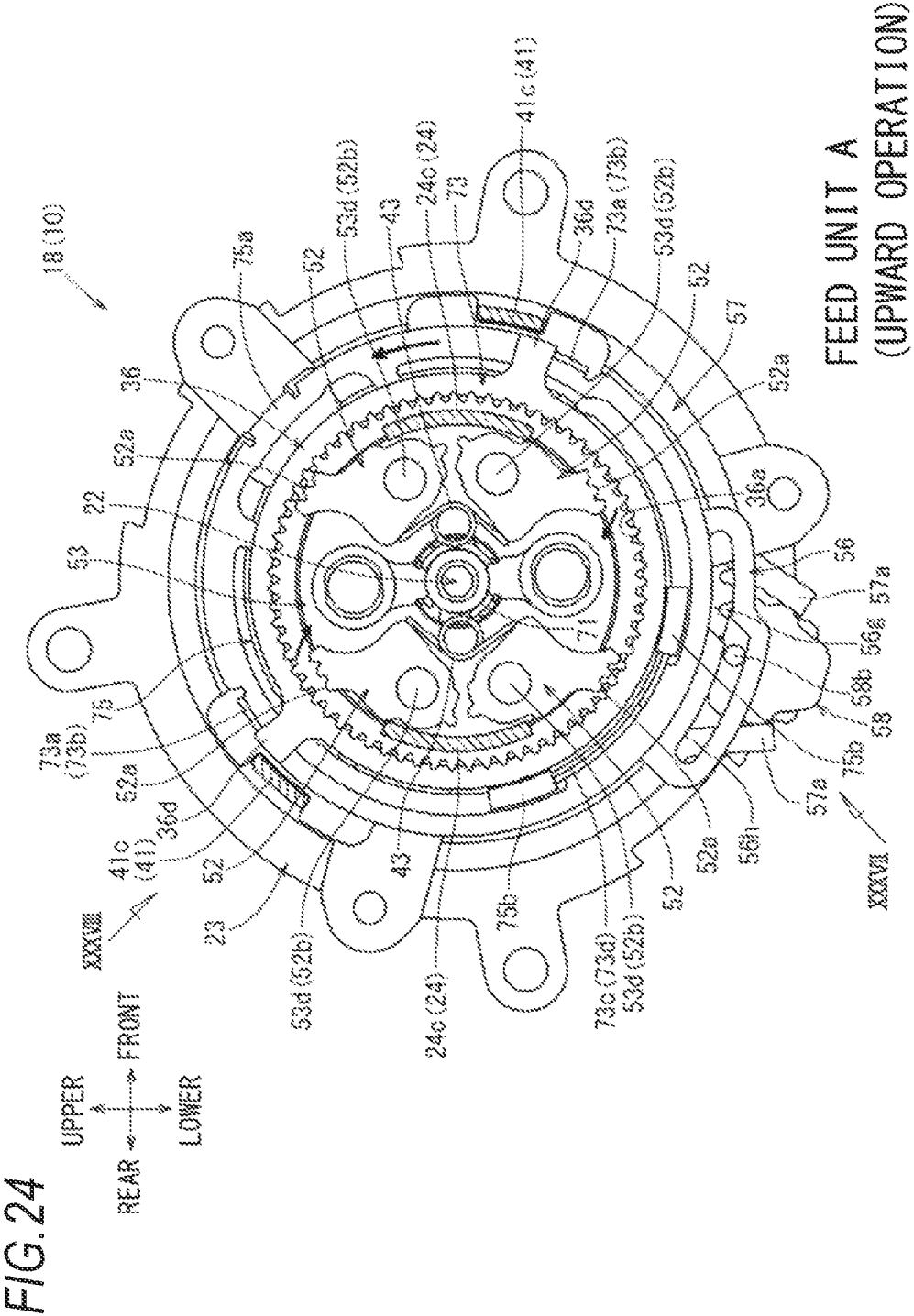
FIG. 24 is a schematic view illustrating a state of the feed unit when the operation handle is pulled upward from the neutral position.

As illustrated in FIG. 17, the rotation transmission plate 36 is joined to the inner lever 53 to be integrated with the inner lever 53 in the rotation direction by meshing the four feed claws 52 with an internal gear 36*a* formed on an outer peripheral portion of the rotation transmission plate 36. As illustrated in FIGS. 19 and 24, when the inner lever 53 is rotated in either direction from the neutral position, a corresponding pair of the four feed claws 52 to be described later are unmeshed from the internal gear 36*a*, and the rotation transmission plate 36 is fed in the rotation direction of the inner lever 53 by the meshing with the remaining pair of feed claws 52.

Figure 22:
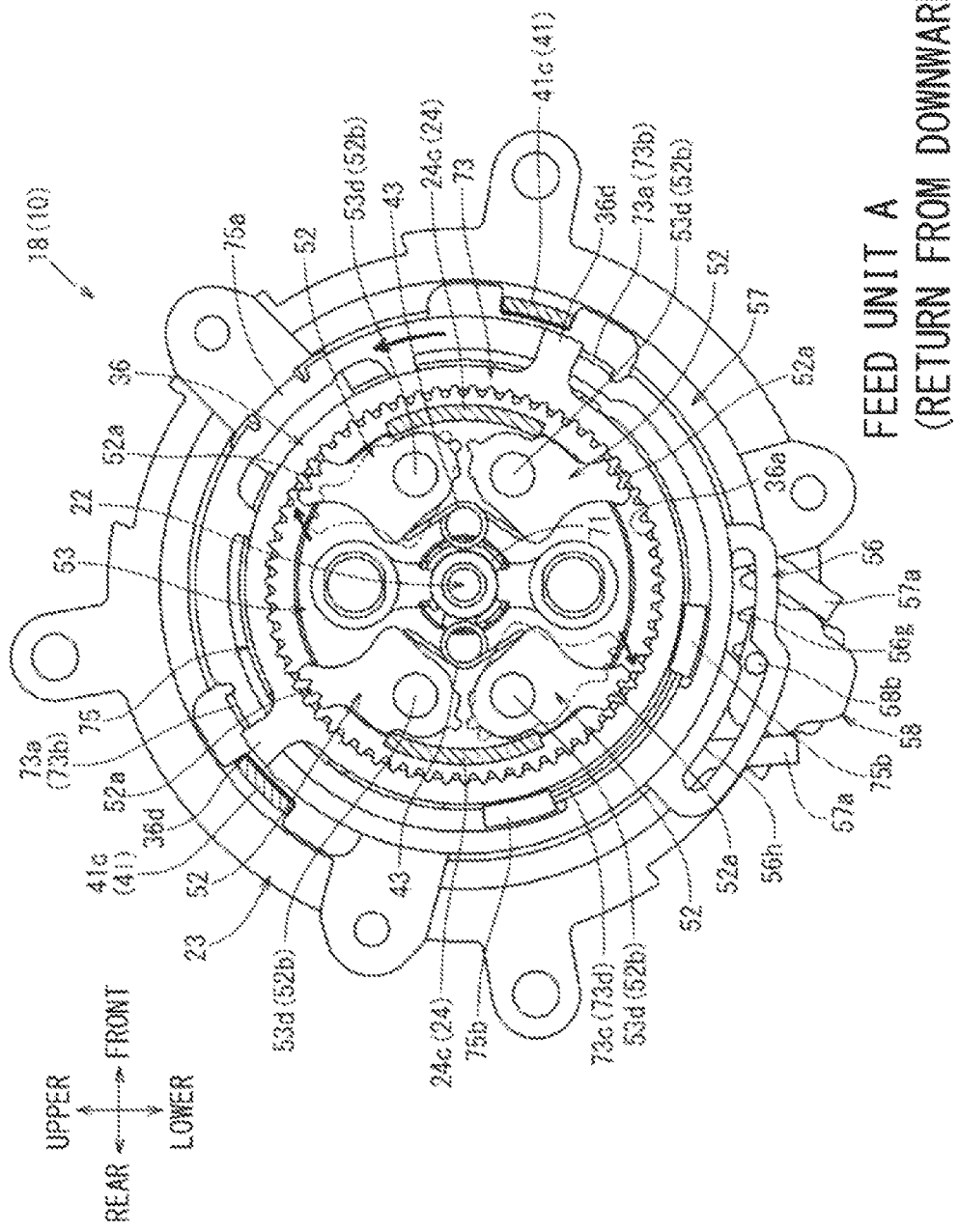
FIG. 22 is a schematic view illustrating a state of the feed unit when the operation handle is returned to the neutral position.
Figure 27:
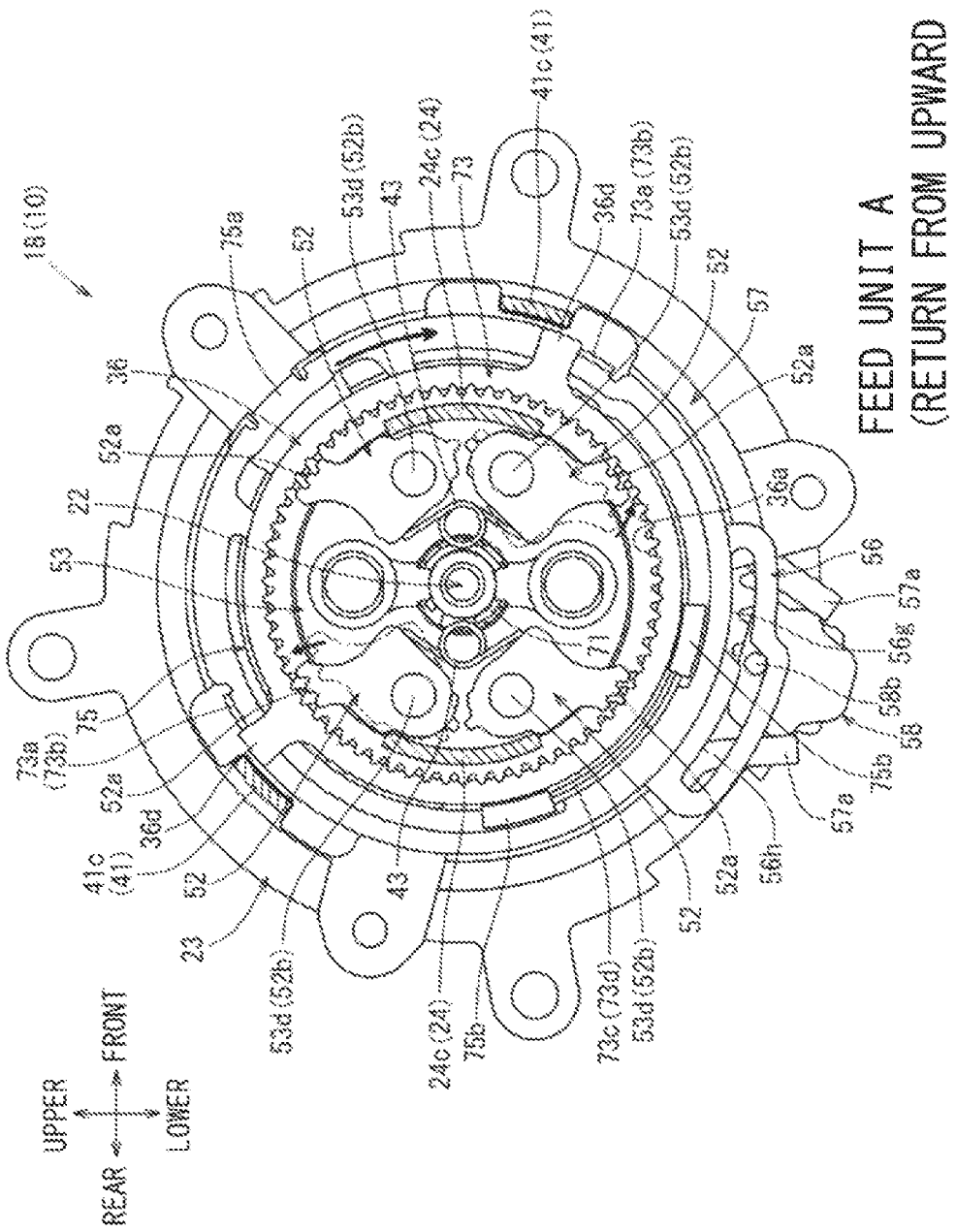
FIG. 27 is a schematic view illustrating a state of the feed unit when the operation handle is returned to the neutral position.

By the rotation described above, the rotation transmission plate 36 feeds the output shaft 22 coupled via the output plate 75 in the corresponding rotation direction. As illustrated in FIGS. 22 and 27, when the rotation of the operated inner lever 53 is returned, the rotation transmission plate 36 returns only the inner lever 53 to an initial position (neutral position) before the operation while the rotation transmission plate 36 itself remains in the position to which the rotation transmission plate 36 is rotated. That is, as illustrated in FIGS. 19 and 24, when the inner lever 53 is rotated from the neutral position in either direction, the rotation transmission plate 36 is fed in the corresponding rotation direction. Then, the rotation transmission plate 36 is once locked by the output shaft 22 being locked by the lock unit B in the position where the above-described operation is stopped.

However, as illustrated in FIGS. 22 and 27, when the inner lever 53 is returned from the position where the rotation transmission plate 36 is locked to the initial position (neutral position) before the operation, the rotation transmission plate 36 returns only the inner lever 53 to the initial position before the operation together with the corresponding feed claws 52 by sliding the pair of feed claws 52 meshing with the rotation transmission plate 36, while the rotation transmission plate 36 itself remains in the lock position.

Figure 10:
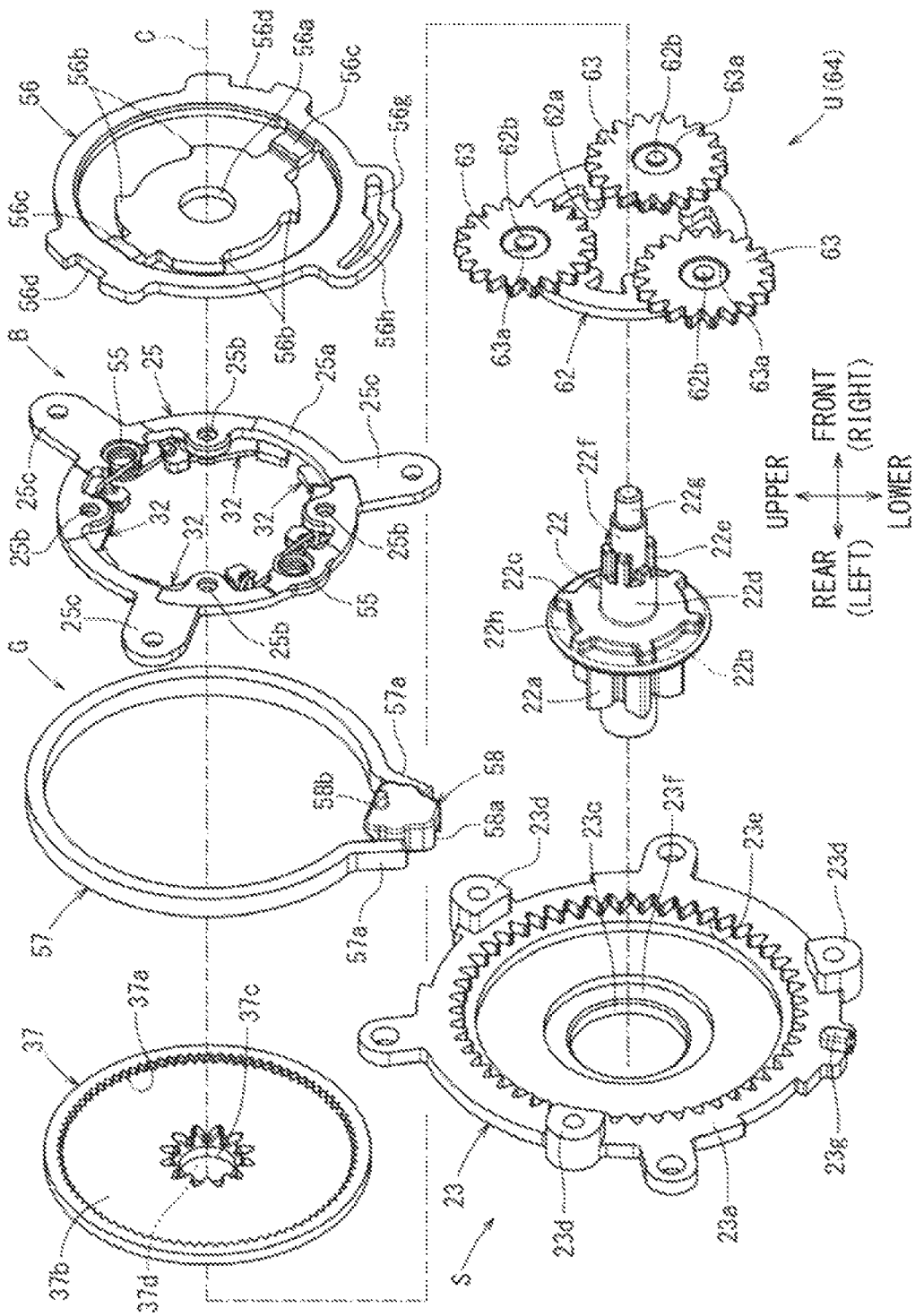
FIG. 10 is an exploded perspective view of a configuration of a left half of the rotation control device as viewed from the outer side in the seat width direction.
Figure 12:
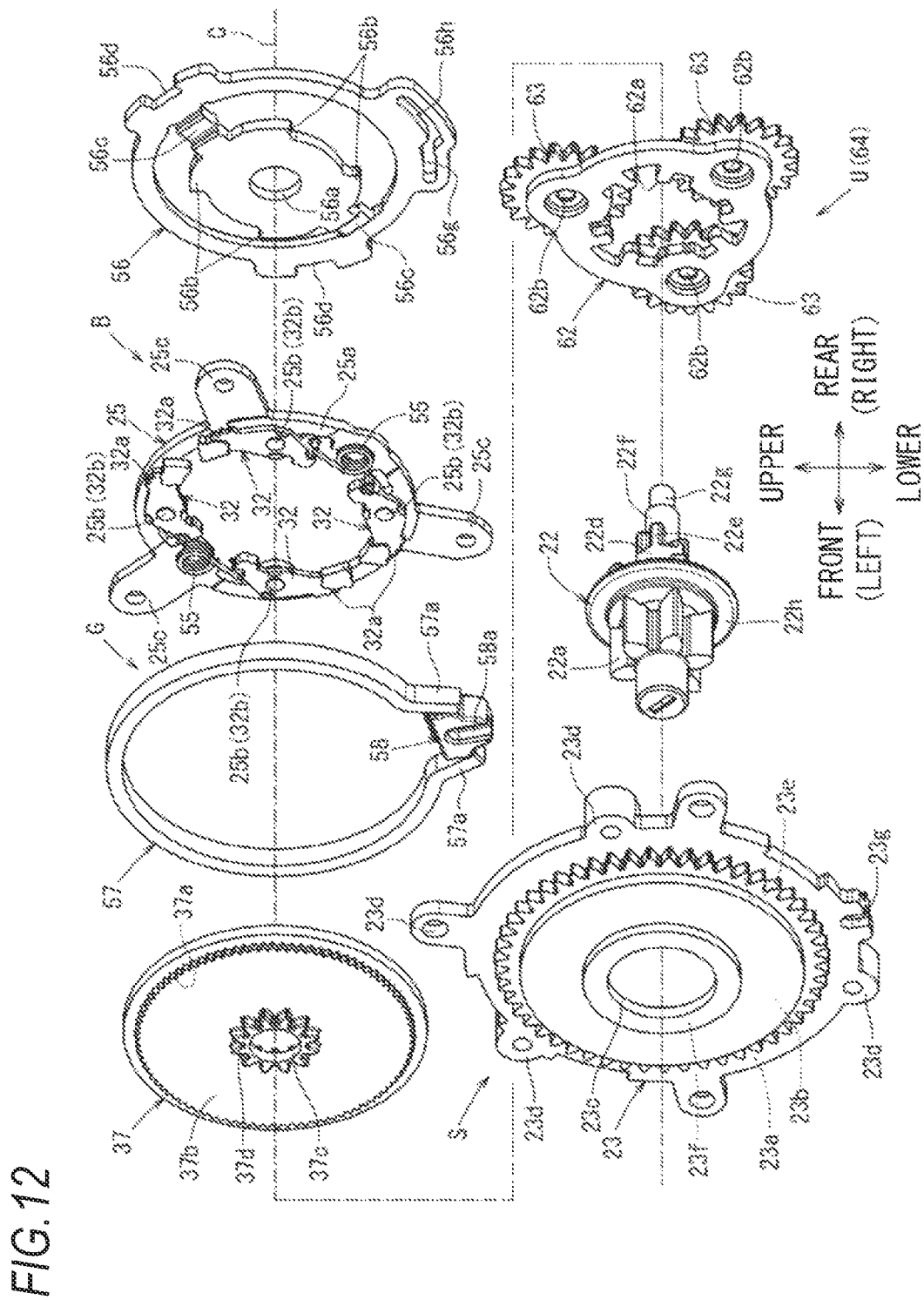
FIG. 12 is an exploded perspective view of the configuration of the left half of the rotation control device as viewed from the inner side in the seat width direction.
Figure 18:
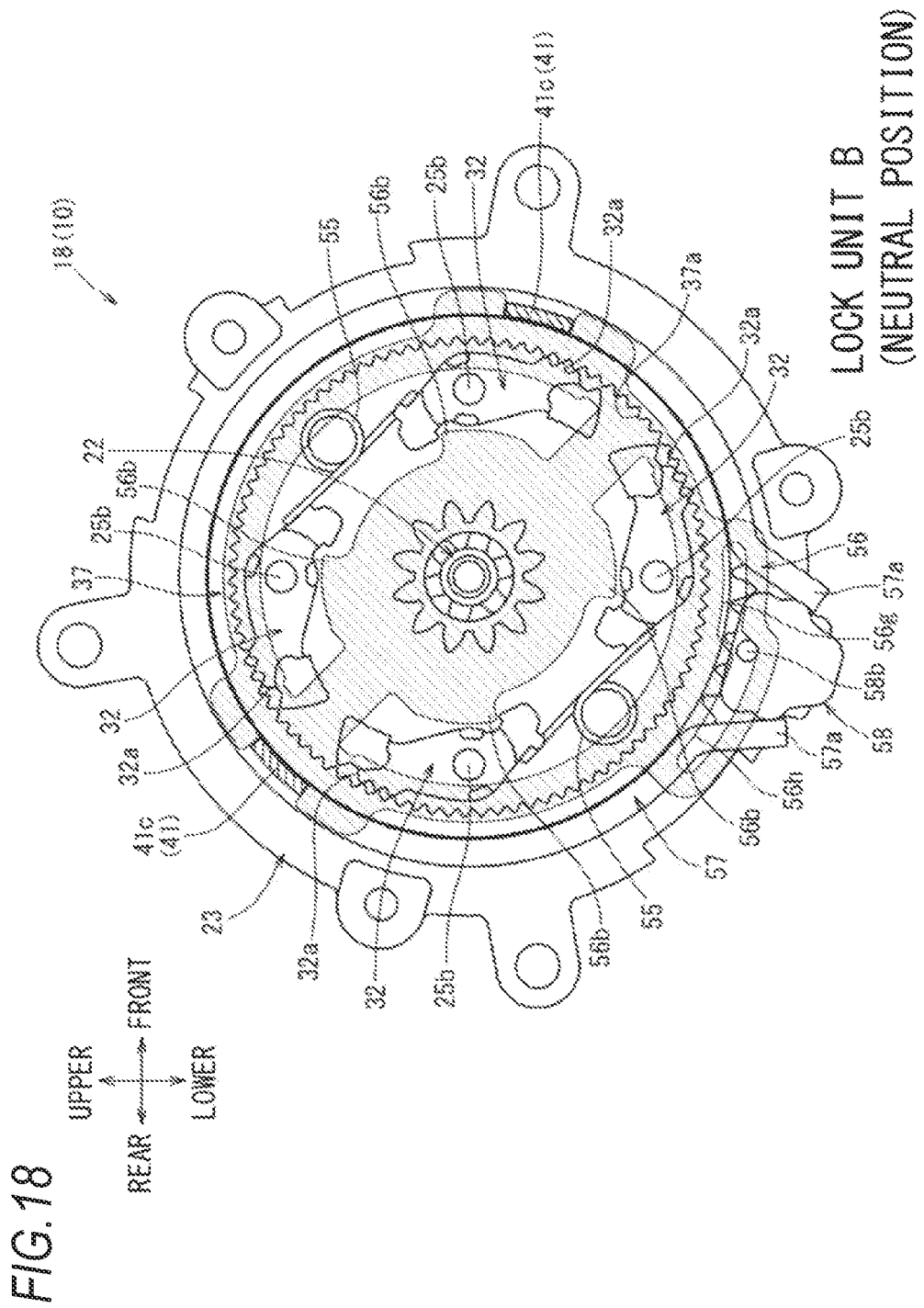
FIG. 18 is a schematic view illustrating a state of a lock unit when the operation handle is in the neutral position.

As illustrated in FIGS. 10 and 12, the lock unit B includes four pawls 32 and a substantially disk-shaped rotation plate 37. The four pawls 32 are rotatably assembled to the intermediate base 25. The rotation plate 37 is gear-coupled to the output shaft 22 via a planetary gear mechanism 64 constituting the speed increasing unit U to transmit power. As illustrated in FIG. 18, the four pawls 32 lock the rotation of the rotation plate 37 relative to the intermediate base 25 by meshing with an internal gear 37a formed on an outer peripheral portion of the rotation plate 37.

Figure 20:
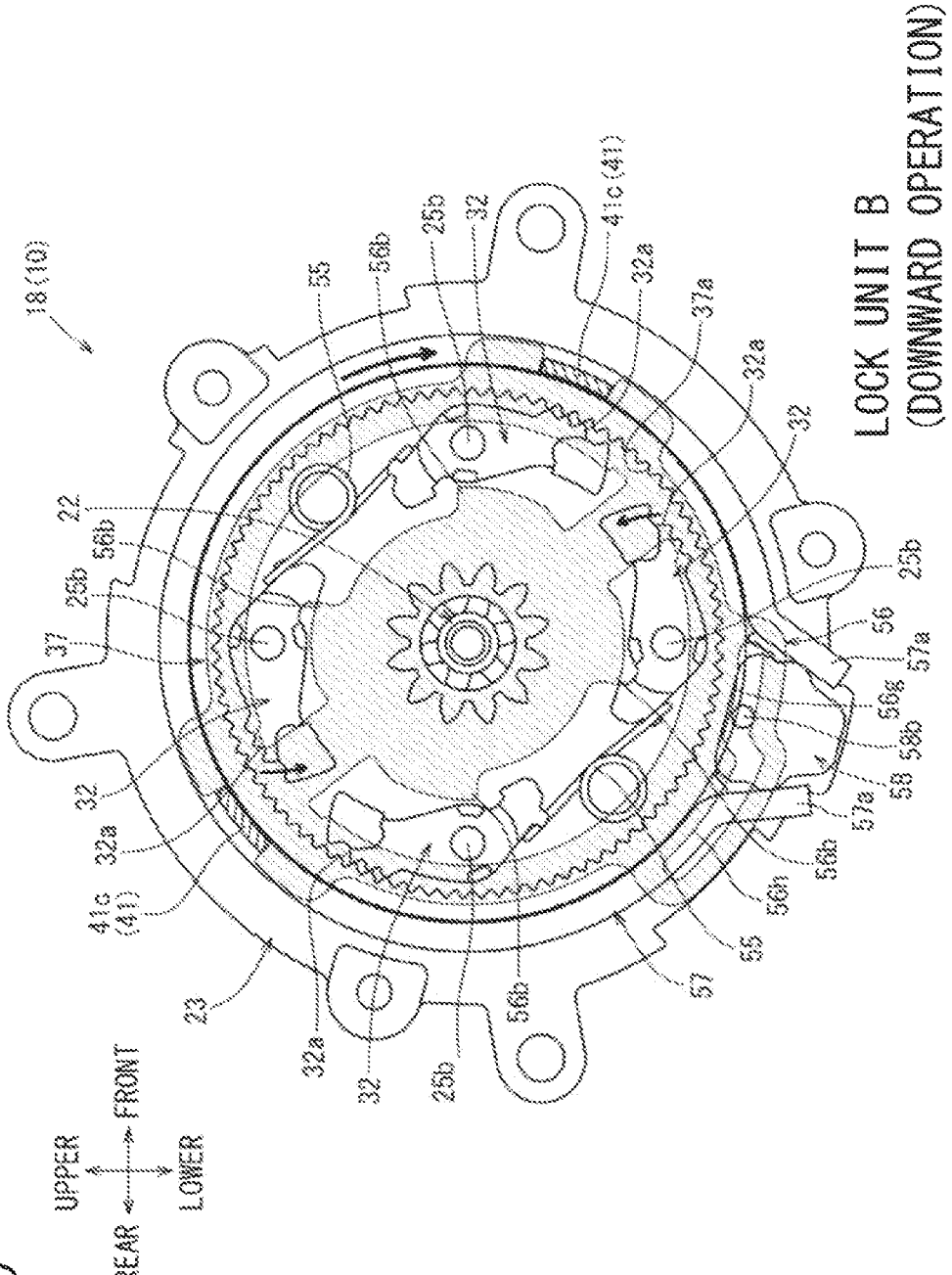
FIG. 20 is a schematic view illustrating a state of the lock unit when the operation handle is pushed downward from the neutral position.
Figure 21:
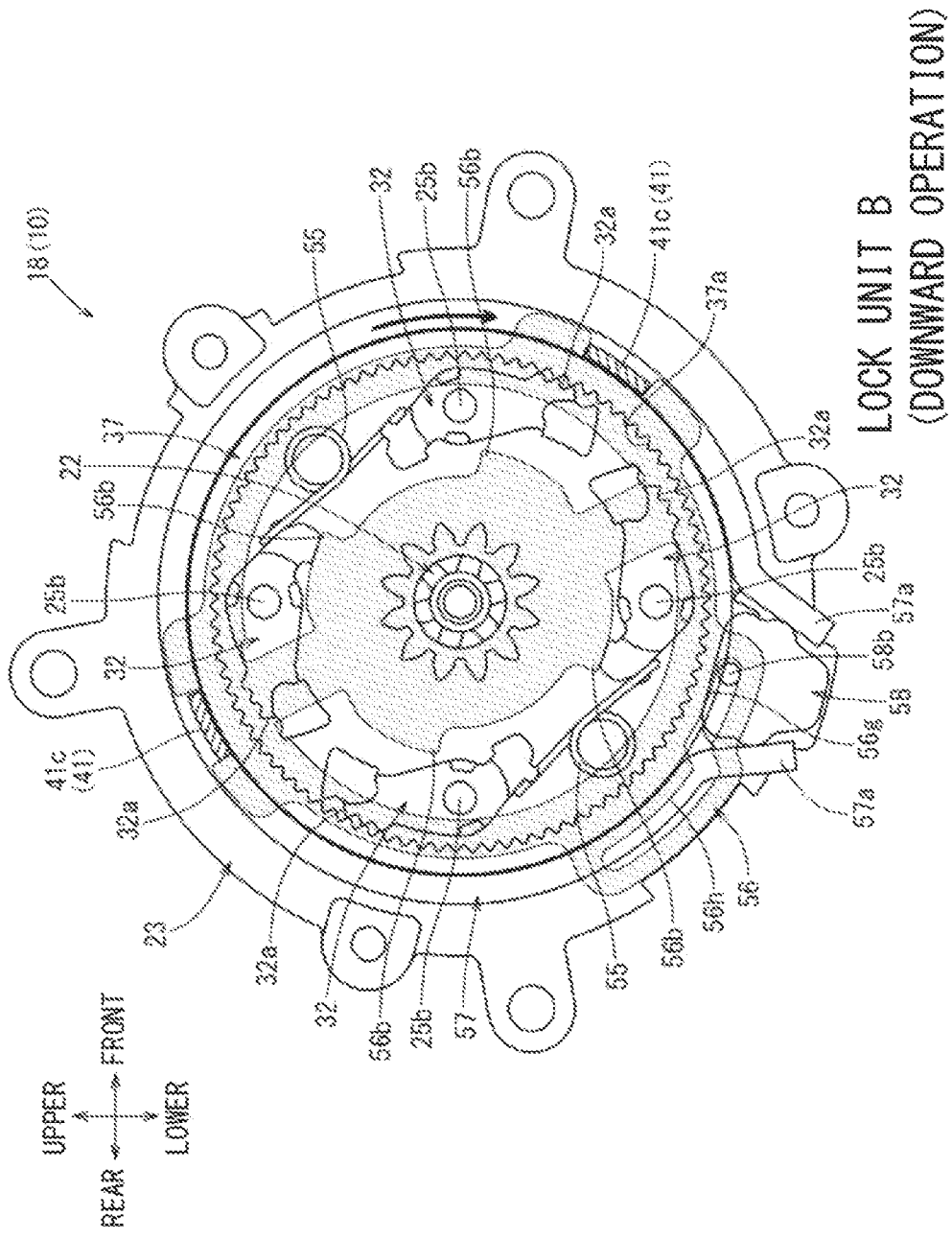
FIG. 21 is a schematic view illustrating a state of the lock unit when the operation handle is further pushed downward.
Figure 25:
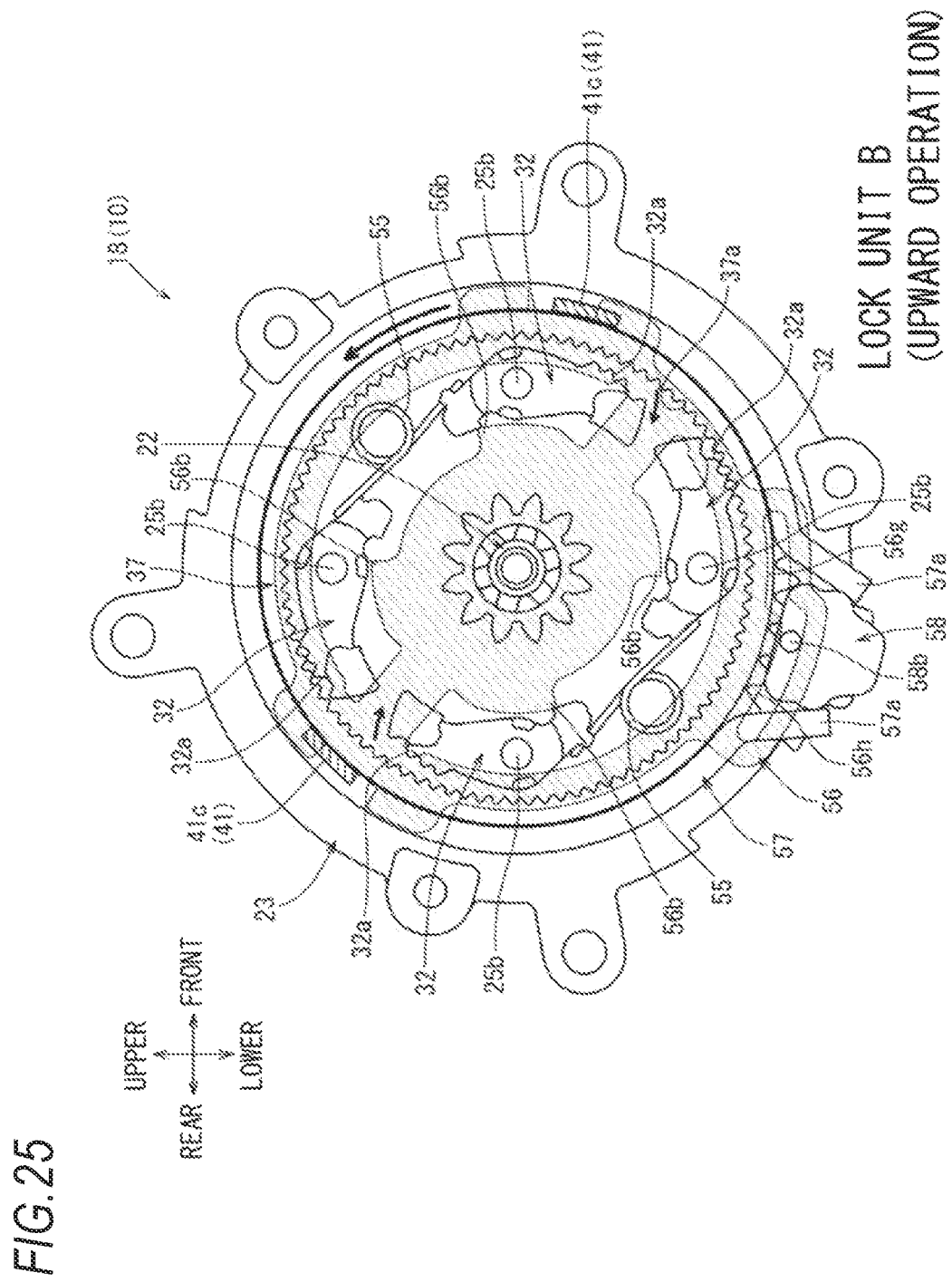
FIG. 25 is a schematic view illustrating a state of the lock unit when the operation handle is pulled upward from the neutral position.
Figure 26:
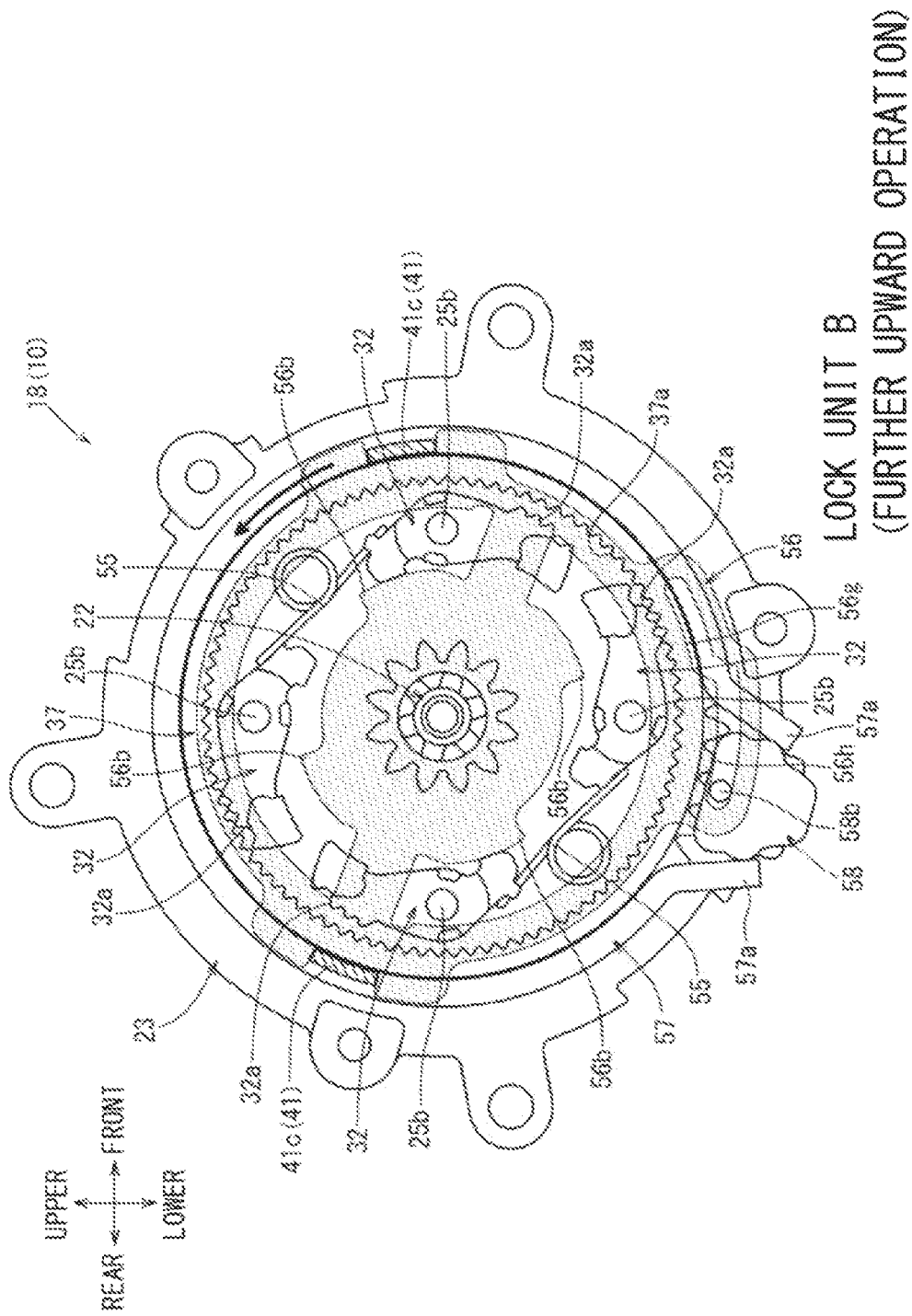
FIG. 26 is a schematic view illustrating a state of the lock unit when the operation handle is further pulled upward.

The rotation of the output shaft 22, which is gear-coupled to the rotation plate 37, is locked by the locking described above. As illustrated in FIGS. 20 and 25, when the outer lever 41 is rotated from the neutral position in either direction, a corresponding pair of pawls 32 of the four pawls 32 are unmeshed from the internal gear 37a of the rotation plate 37 via a control plate 56 to be described later. Accordingly, the remaining pair of pawls 32 of the four pawls 32 are in a state in which the rotation plate 37 is allowed to rotate in the corresponding direction, and a state in which the rotation plate 37 and the output shaft 22 are allowed to rotate in the corresponding direction, as illustrated in FIGS. 21 and 26.

Figure 23:
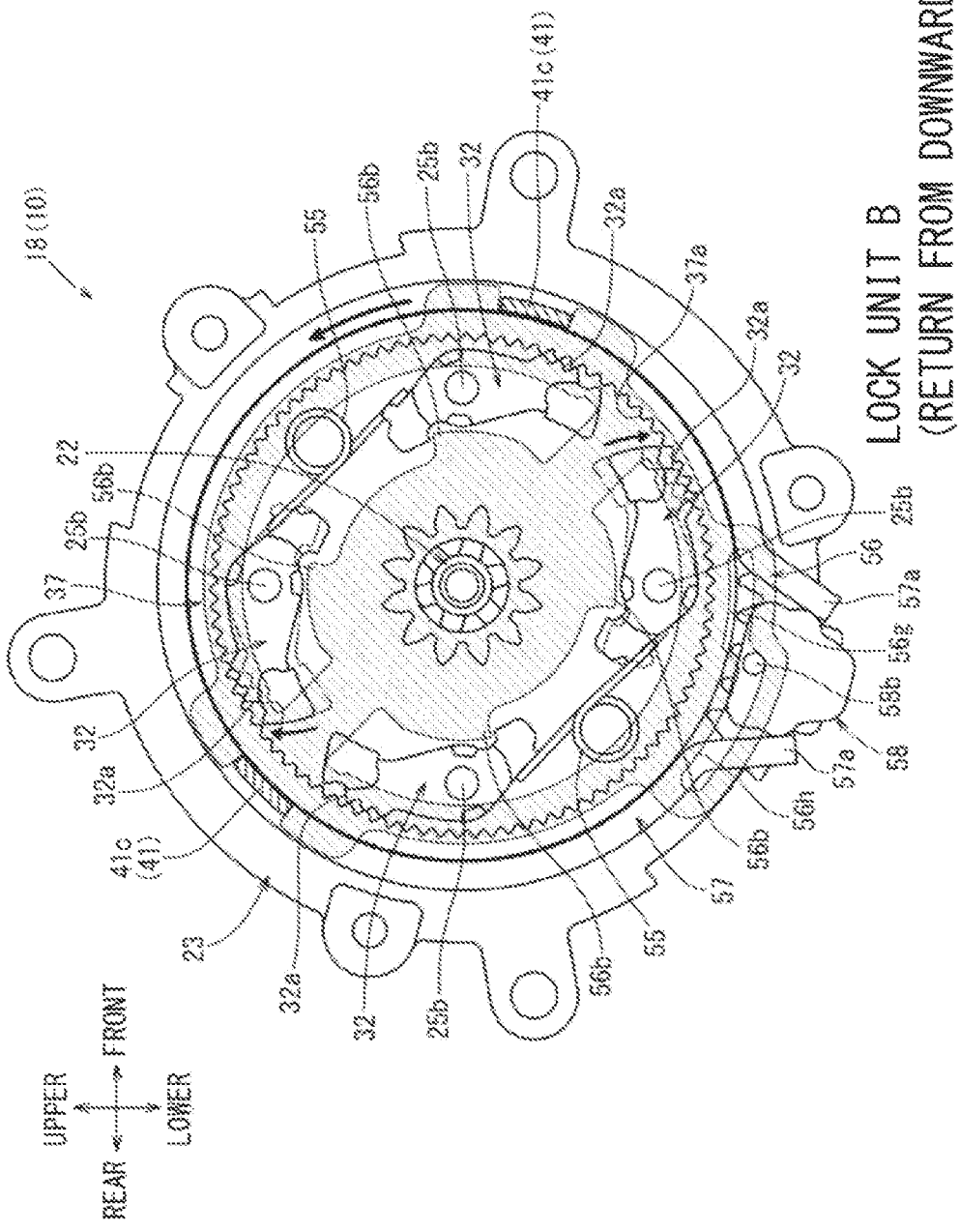
FIG. 23 is a schematic view illustrating a state of the lock unit when the operation handle is returned to the neutral position.
Figure 28:
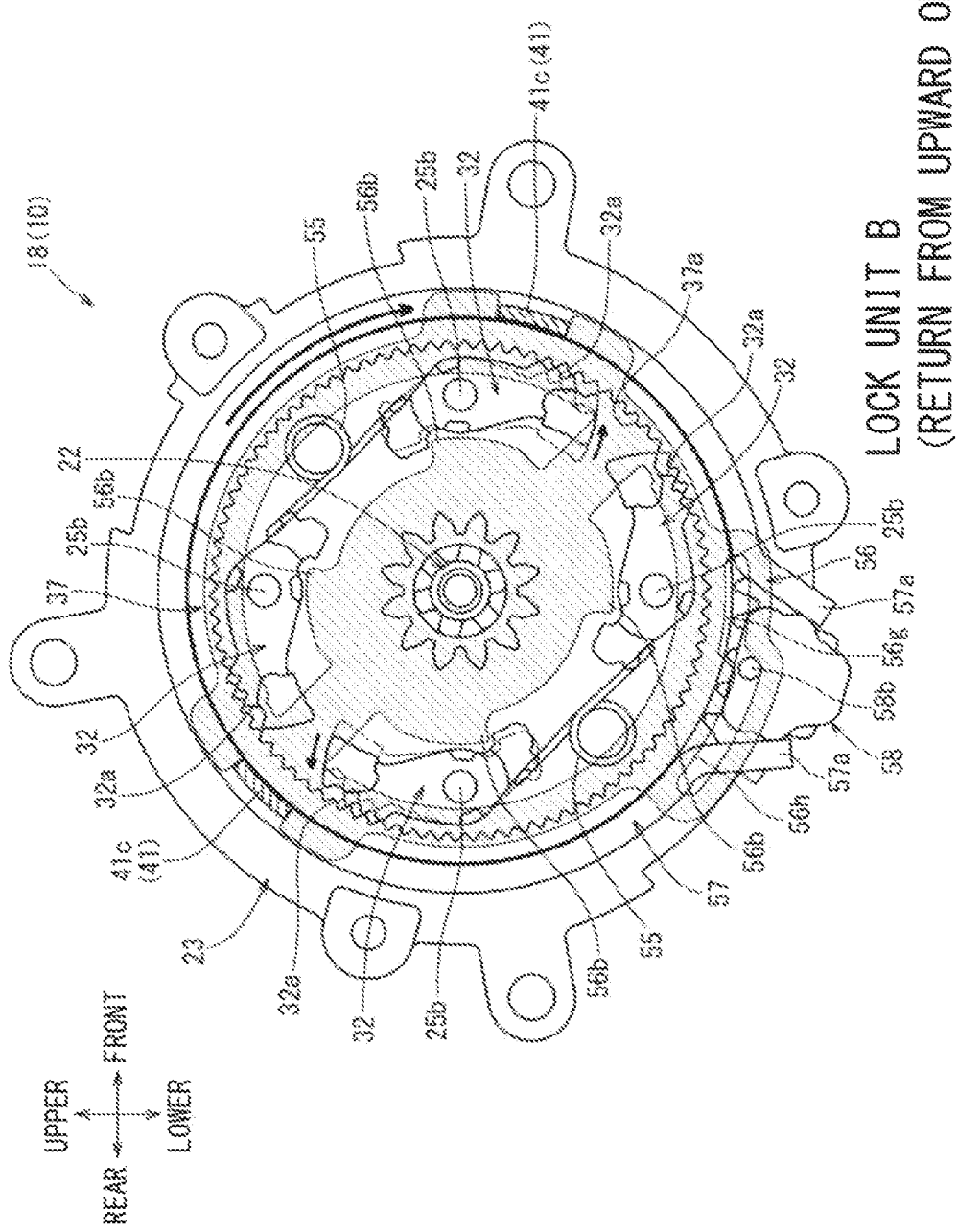
FIG. 28 is a schematic view illustrating a state of the lock unit when the operation handle is returned to the neutral position.
Figure 29:
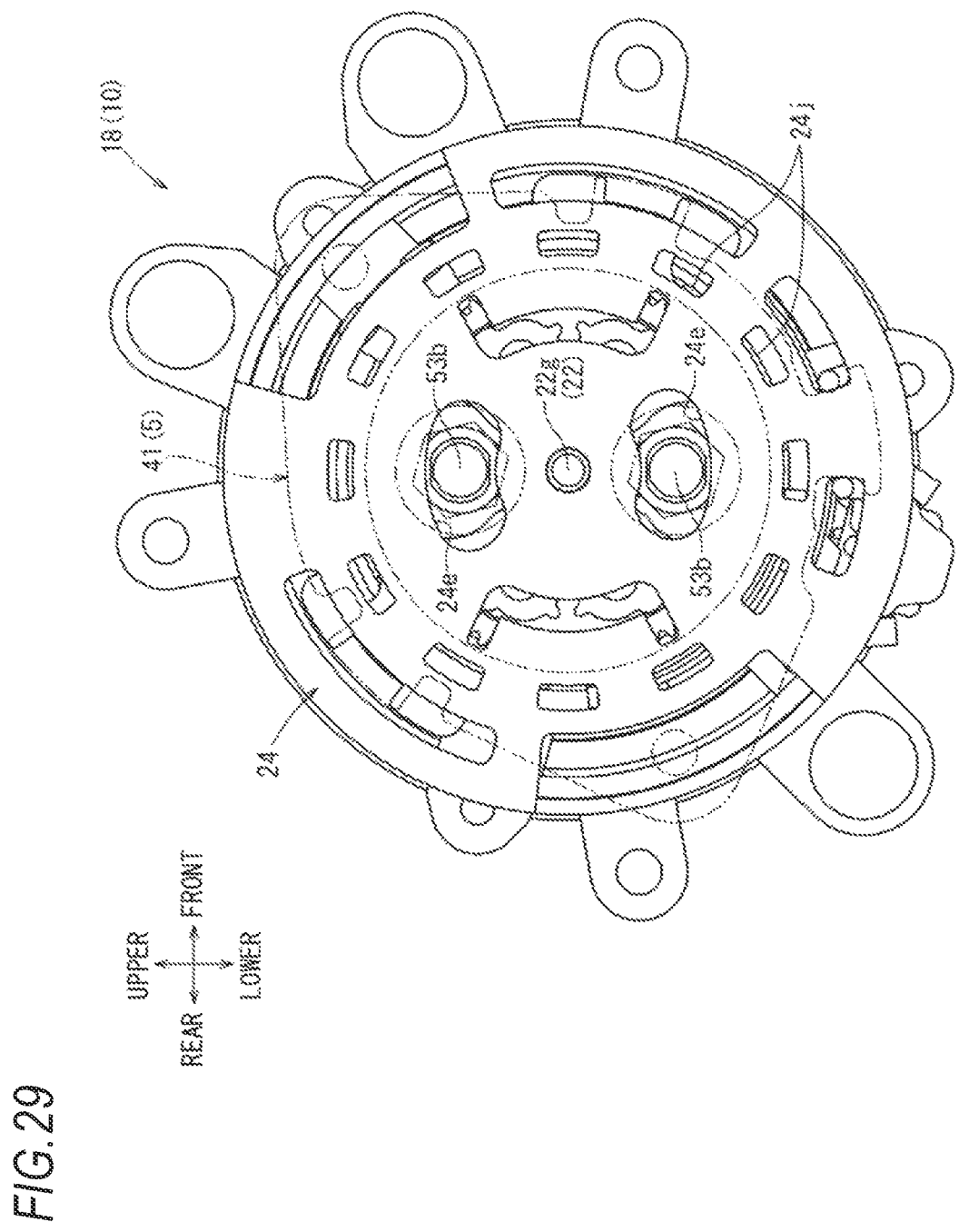
FIG. 29 is a front view illustrating a state of an input unit when the operation handle is in the neutral position.

When the rotation of the operated outer lever 41 is returned, the pair of pawls 32 meshing with the internal gear 37a of the four pawls 32 prevent the rotation plate 37 from rotating in the return direction, so that the rotation plate 37 and the output shaft 22 are held in a locked state. Then, as illustrated in FIGS. 23 and 28, when the rotation of the outer lever 41 is returned, the remaining pair of pawls 32 of the four pawls 32 are also returned to the state of meshing with the internal gear 37a of the rotation plate 37 and the rotation of the rotation plate 37 in both directions is locked.

Figure 13:
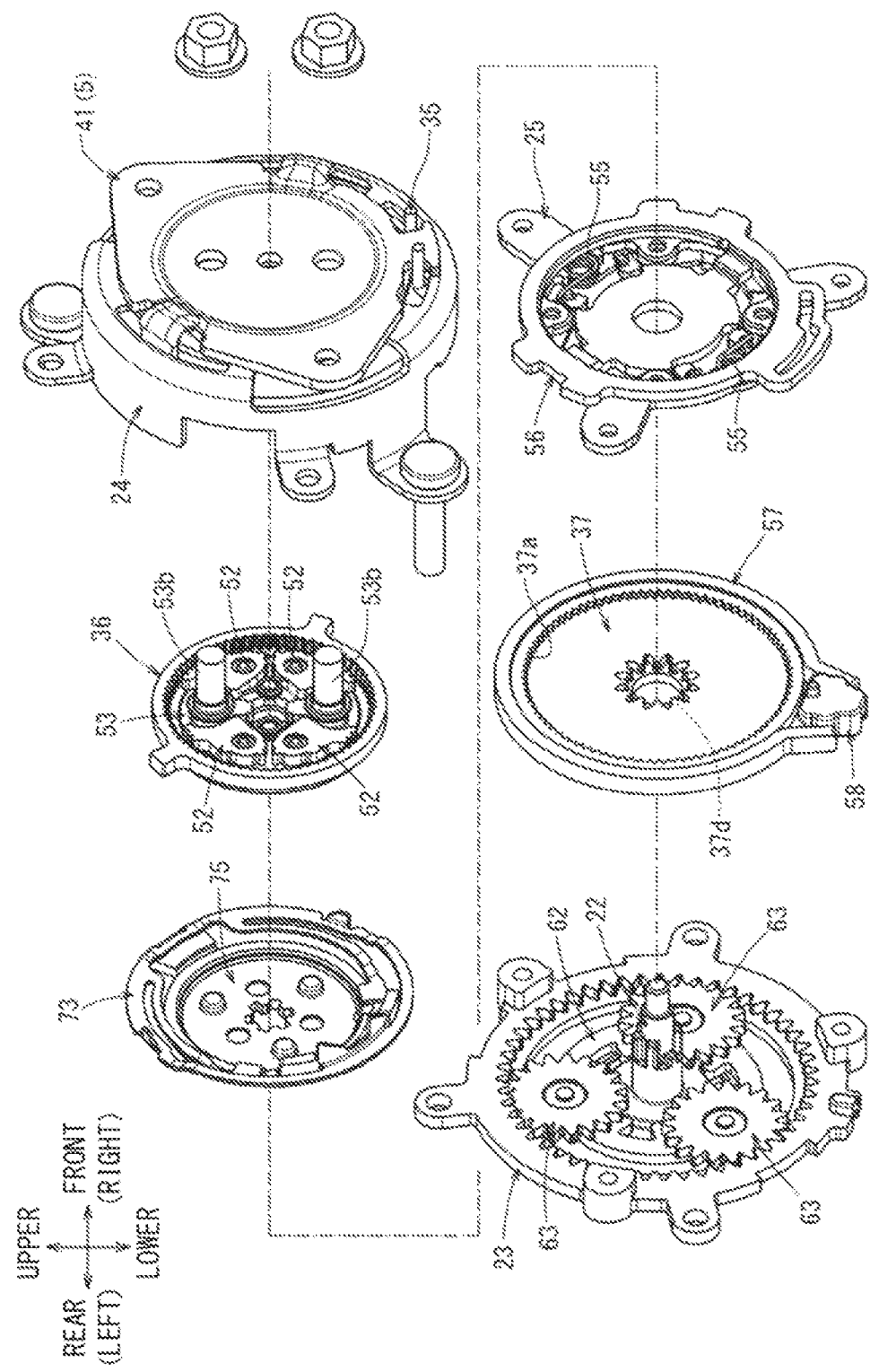
FIG. 13 is an exploded perspective view illustrating an assembled state of a part of the rotation control device.

As illustrated in FIGS. 10 and 12, the speed increasing unit U includes a substantially disk-shaped planetary carrier 62, three planetary gears 63, an internal gear 23e formed on an outer peripheral portion of the body base 23, and the rotation plate 37 having a sun gear 37d at a central portion thereof. As illustrated in FIG. 13, the planetary carrier 62 is integrally assembled with the output shaft 22 by inserting the output shaft 22 into a central portion (portion through which the central axis C passes) of the planetary carrier 62. The three planetary gears 63 are rotatably assembled to the planetary carrier 62.

Figure 14:
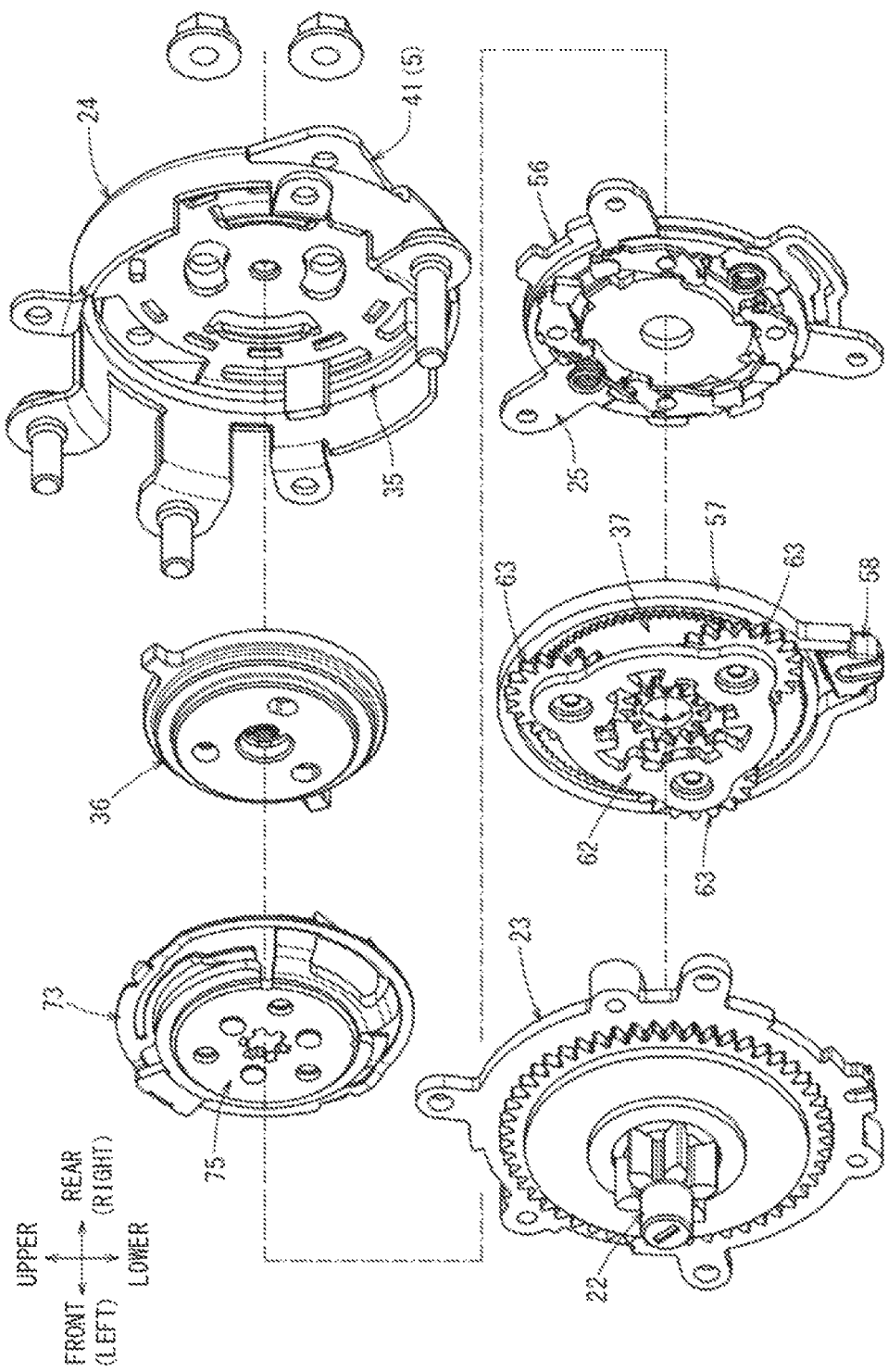
FIG. 14 is an exploded perspective view illustrating an assembled state of a part of the rotation control device.
Figure 15:
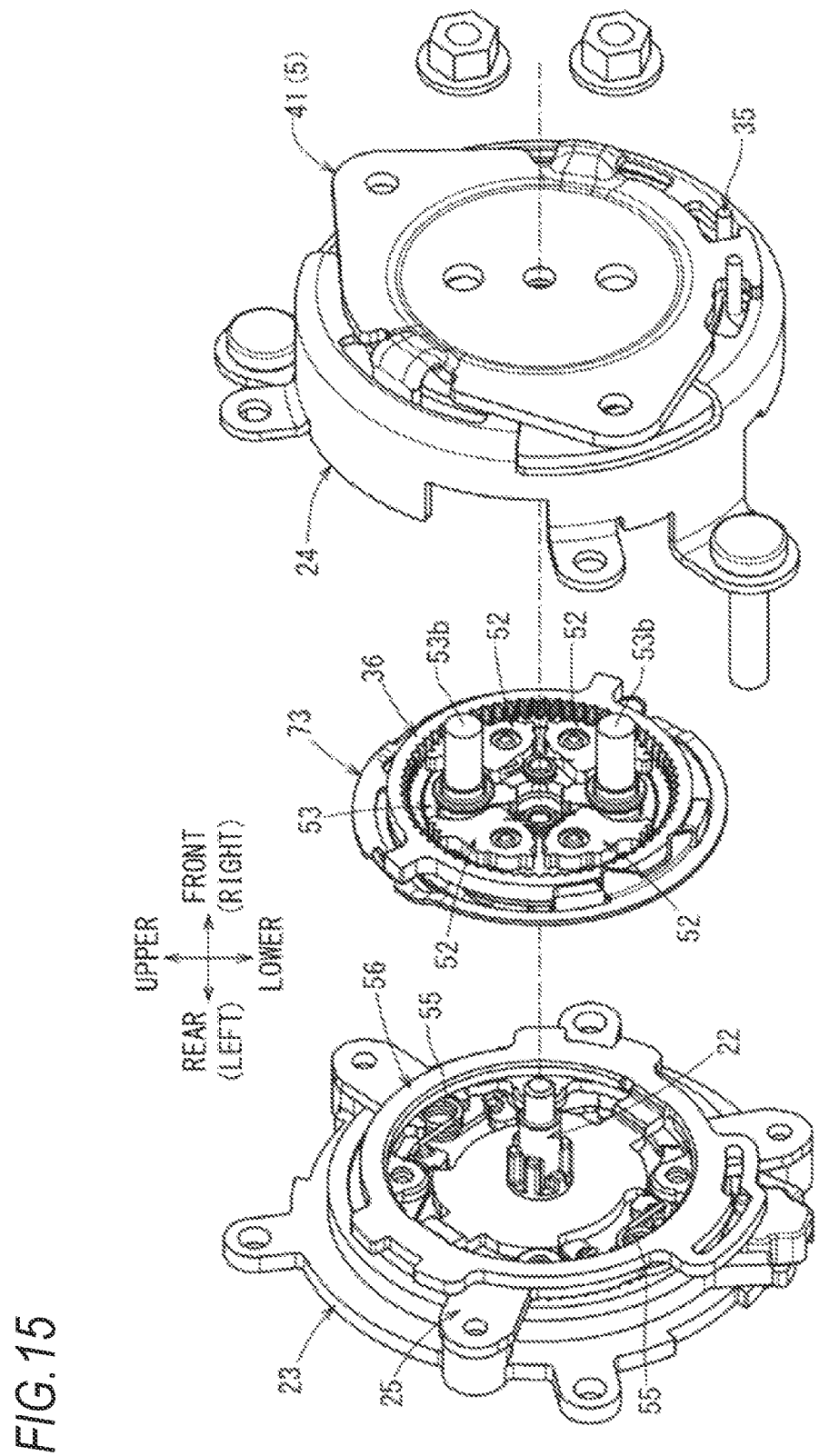
FIG. 15 is an exploded perspective view illustrating another assembled state of a part of the rotation control device.
Figure 16:
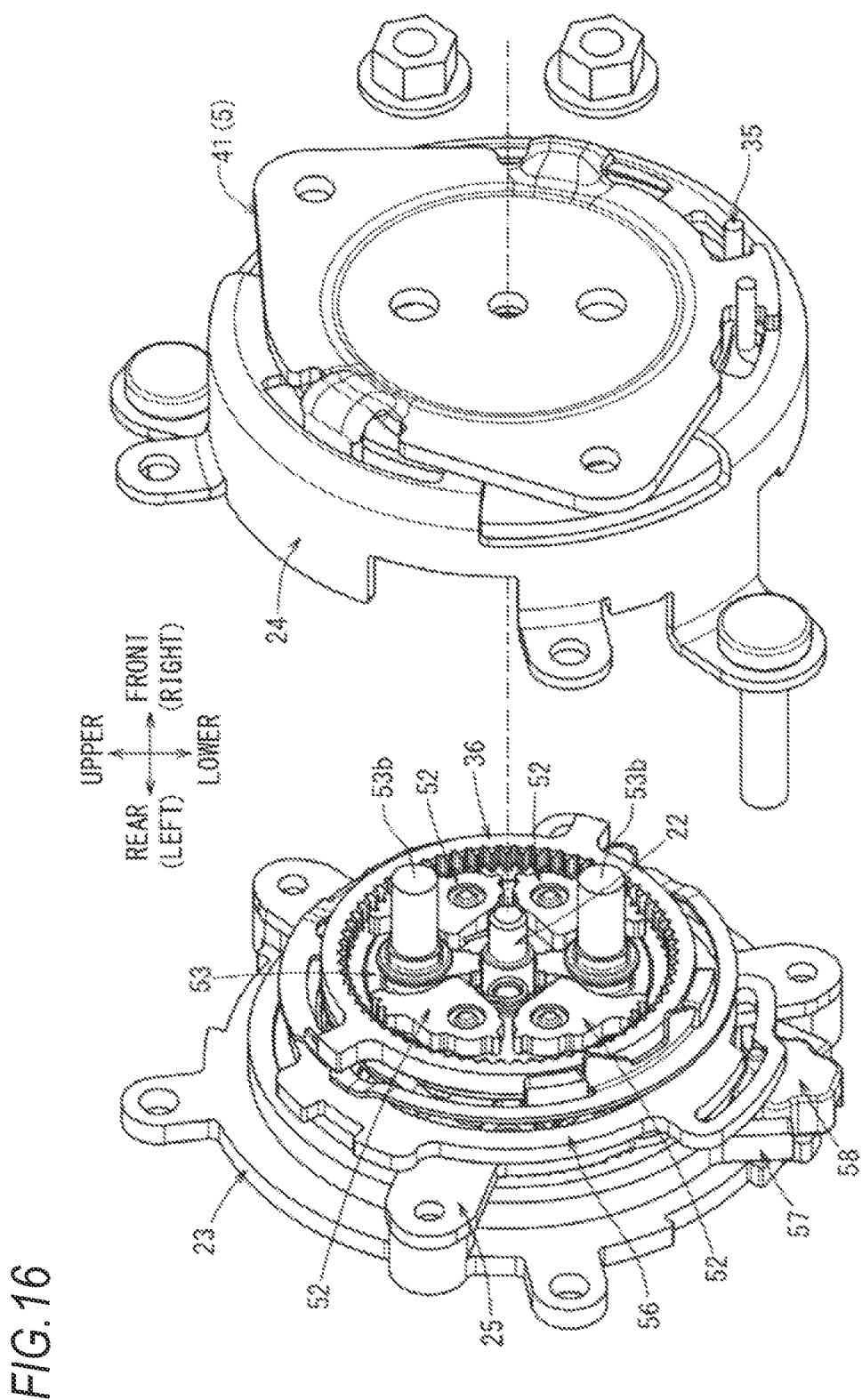
FIG. 16 is an exploded perspective view illustrating another assembled state of a part of the rotation control device.

The output shaft 22 integrally assembled with the planetary carrier 62 is inserted into the central portion (portion through which the central axis C passes) of the rotation plate 37, so that the sun gear 37d at the central portion of the rotation plate 37 is gear-coupled to the three planetary gears 63 to transmit power (see FIG. 14). As illustrated in FIG. 13, the coupled three planetary gears 63 are gear-coupled to the internal gear 23e formed on the outer peripheral portion of the body base 23 to transmit power. Accordingly, when the output shaft 22 is rotated from the neutral position in either direction, the three planetary gears 63 revolve while rotating on its own axis along the internal gear 23e of the body base 23 via the planetary carrier 62. When the three planetary gears 63 rotate, the rotation plate 37 having the sun gear 37d gear-coupled to central portions of the planetary gears 63 is rotated in the same rotation direction as the output shaft 22.

At this time, the rotation plate 37 rotates at an increasing speed according to a gear ratio between gears to rotate at a speed higher than a speed of the output shaft 22. In this way, the rotation of the output shaft 22 is increased in speed by the speed increasing unit U and transmitted to the rotation plate 37, so that the rotation plate 37 can be locked by the lock unit B without causing large backlash in the rotation direction.

As illustrated in FIGS. 10 and 12, the friction generation unit G includes a friction ring 57 having an opening ring shape and a control piece 58 having a truncated triangular columnar shape. The control piece 58 is set between end portions 57a of the friction ring 57. The friction ring 57 is fitted to the outer peripheral portion of the disk-shaped rotation plate 37. The friction ring 57 has an opening ring shape slightly smaller than the outer peripheral portion of the rotation plate 37 in a free state. Here, the rotation plate 37 corresponds to a "rotation member" of the present disclosure.

As illustrated in FIGS. 13 and 14, the friction ring 57 is fitted to the outer peripheral portion of the rotation plate 37 against its elastic force, so that an elastic force that presses the outer peripheral portion of the rotation plate 37 over substantially the entire circumference from an outer peripheral side is applied to the outer peripheral portion of the rotation plate 37. By the pressing described above, the friction ring 57 applies a sliding friction resistance force to the rotation of the rotation plate 37.

The opening ring of the friction ring 57 is opened by the control piece 58, which will be described later, so that a pressed state of the friction ring 57 against the rotation plate 37 is released. Accordingly, the friction ring 57 is released from applying friction to the rotation plate 37. Both the end portions 57a of the friction ring 57 are bent obliquely to approach each other in a mountain shape toward a radially outer side.

When the friction ring 57 applies a friction force to the outer peripheral portion of the rotation plate 37 as described above, the following effects are achieved. That is, since the rotation of the output shaft 22 is increased in speed by the speed increasing unit U and transmitted to the rotation plate 37, the friction force transmitted from the friction ring 57 to the rotation plate 37 is effectively applied. As a result, when the friction ring 57 is pressed against the rotation plate 37 (when the output shaft 22 is rotated downward, which will be described later), it is possible to effectively prevent the output shaft 22 from slipping in the downward rotation direction.

Figure 9:
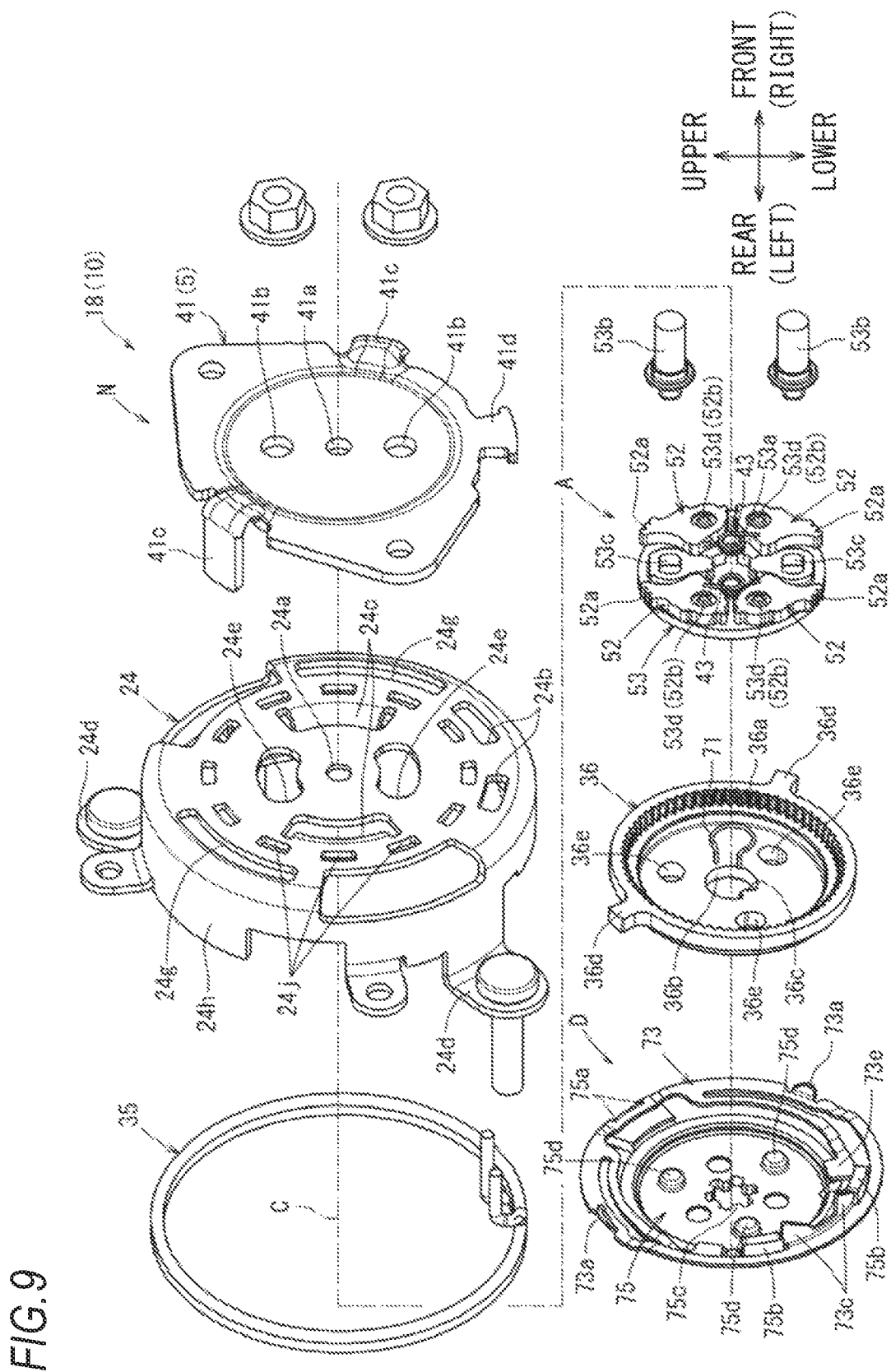
FIG. 9 is an exploded perspective view of a configuration of a right half of the rotation control device as viewed from the outer side in the seat width direction.

As illustrated in FIGS. 10 and 12, the control piece 58 is set between the end portions 57a of the friction ring 57, and is movable only radially inward and outward relative to the cover 24 (see FIG. 9). As illustrated in FIG. 17, when the outer lever 41 is in the neutral position, the control piece 58 is held in a state in which the control piece 58 is extruded radially outward by the control plate 56 to be described later. Accordingly, the control piece 58 enlarges the width between the end portions 57a of the friction ring 57 by both inclined surfaces of the truncated triangular columnar shape, and holds the friction ring 57 in a state in which the friction ring 57 is released from being pressed against the rotation plate 37.

As illustrated in FIG. 24, even when the outer lever 41 is rotated from the neutral position in a direction (counterclockwise direction in the drawing) in which the output shaft 22 is rotated upward, the control piece 58 is held in the state in which the control piece 58 is extruded radially outward by the control plate 56 to be described later. Accordingly, the control piece 58 holds the friction ring 57 in a state in which the friction ring 57 is released from being pressed against the rotation plate 37, which is a state in which the width between the end portions 57a of the friction ring 57 is enlarged in the same manner as described above.

However, as illustrated in FIG. 19, when the outer lever 41 is rotated from the neutral position in a direction (clockwise direction in the drawing) in which the output shaft 22 is rotated downward, the control piece 58 is pulled radially inward by the control plate 56 to be described later. Accordingly, the control piece 58 is released from the state in which the width between the end portions 57a of the friction ring 57 is enlarged. As a result, the friction ring 57 is pressed against the outer peripheral portion of the rotation plate 37 by the elastic force, and a sliding friction resistance force is applied to the rotation of the rotation plate 37.

As illustrated in FIGS. 10 and 12, the rotation control device 18 further includes the control plate 56 integrally having a double inner and outer ring plate shape. The control plate 56 is rotatably supported by the output shaft 22 with the output shaft 22 being inserted into a central portion (portion through which the central axis C passes) of the control plate 56. The control plate 56 is integrally assembled with the outer lever 41 by fitting two arms 41c extending from the outer lever 41 illustrated in FIGS. 9 and 11 to an outer peripheral portion of the control plate 56.

As illustrated in FIGS. 20 and 25, the control plate 56 rotates integrally with the outer lever 41 when the outer lever 41 is rotated in either direction from the neutral position, and operates to unmesh a corresponding pair of pawls 32 of the four pawls 32 from the internal gear 37a of the rotation plate 37. As illustrated in FIG. 24, the control plate 56 holds the control piece 58 in a state in which the control piece 58 is extruded radially outward when the outer lever 41 is rotated in the direction (counterclockwise direction in the drawing) in which the output shaft 22 is rotated upward. However, as illustrated in FIG. 19, the control plate 56 is operated to pull the control piece 58 radially inward when the outer lever 41 is rotated in the direction (clockwise direction in the drawing) in which the output shaft 22 is rotated downward.

Accordingly, the friction ring 57 is pressed against the outer peripheral portion of the rotation plate 37 by the elastic force, and a sliding friction resistance force is applied to the rotation of the rotation plate 37. In this way, since the friction force is applied to the rotation in the direction in which the output shaft 22 is pushed downward, it is possible to effectively prevent the output shaft 22 from slipping in the direction in which the output shaft 22 is pushed downward due to an effect of its own weight applied to the seat 1 or the like.

Figure 11:
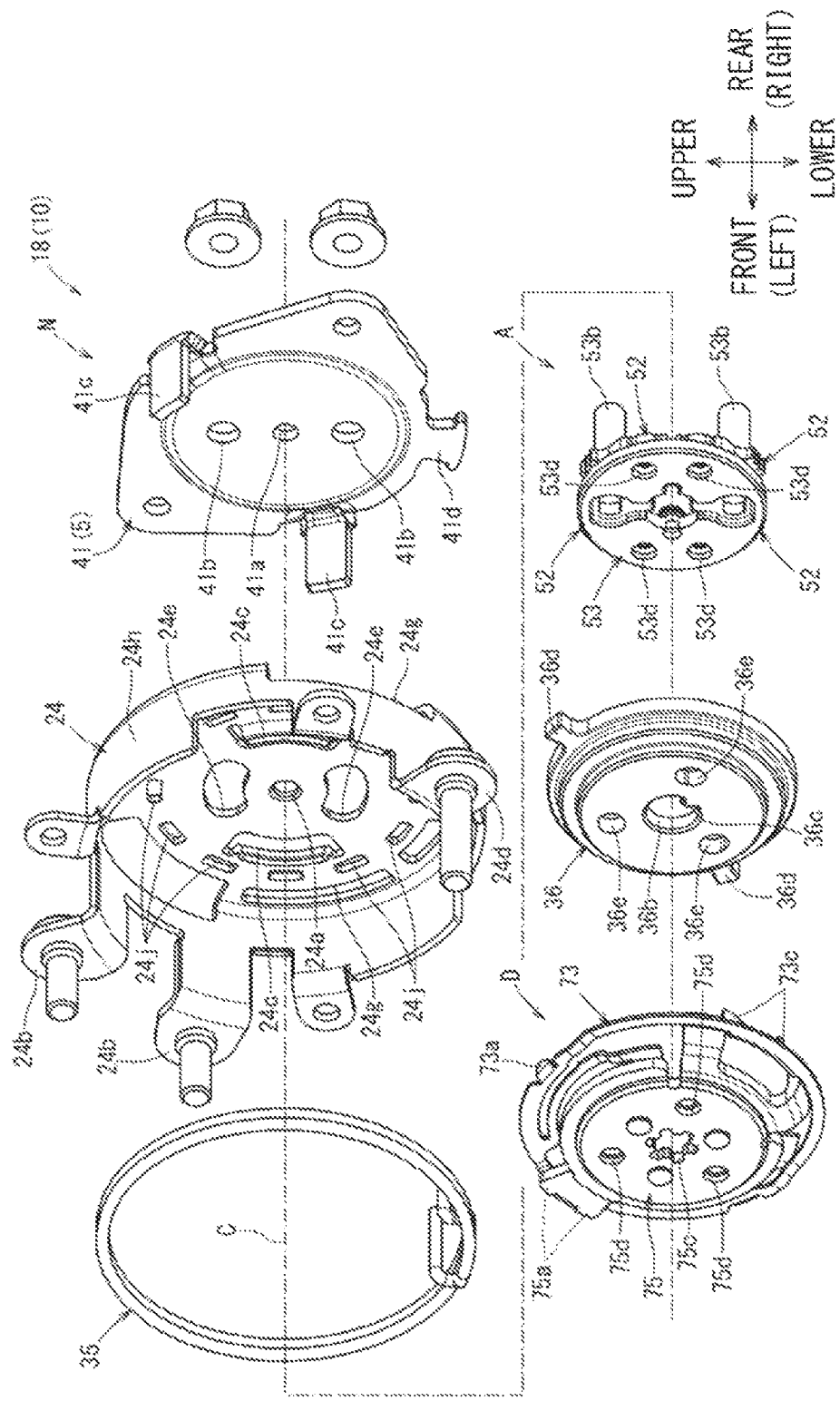
FIG. 11 is an exploded perspective view of the configuration of the right half of the rotation control device as viewed from the inner side in the seat width direction.

As illustrated in FIGS. 9 and 11, the slippage preventing unit D includes the output plate 75 and a substantially ring plate-shaped plate spring 73 assembled to the output plate 75. A portion of the plate spring 73 in the circumferential direction is fixed to the output plate 75, and another portion of the plate spring 73 in the circumferential direction can be bent in the axial direction like bending of a cantilever support beam with the fixed portion as a fulcrum.

Figure 30:
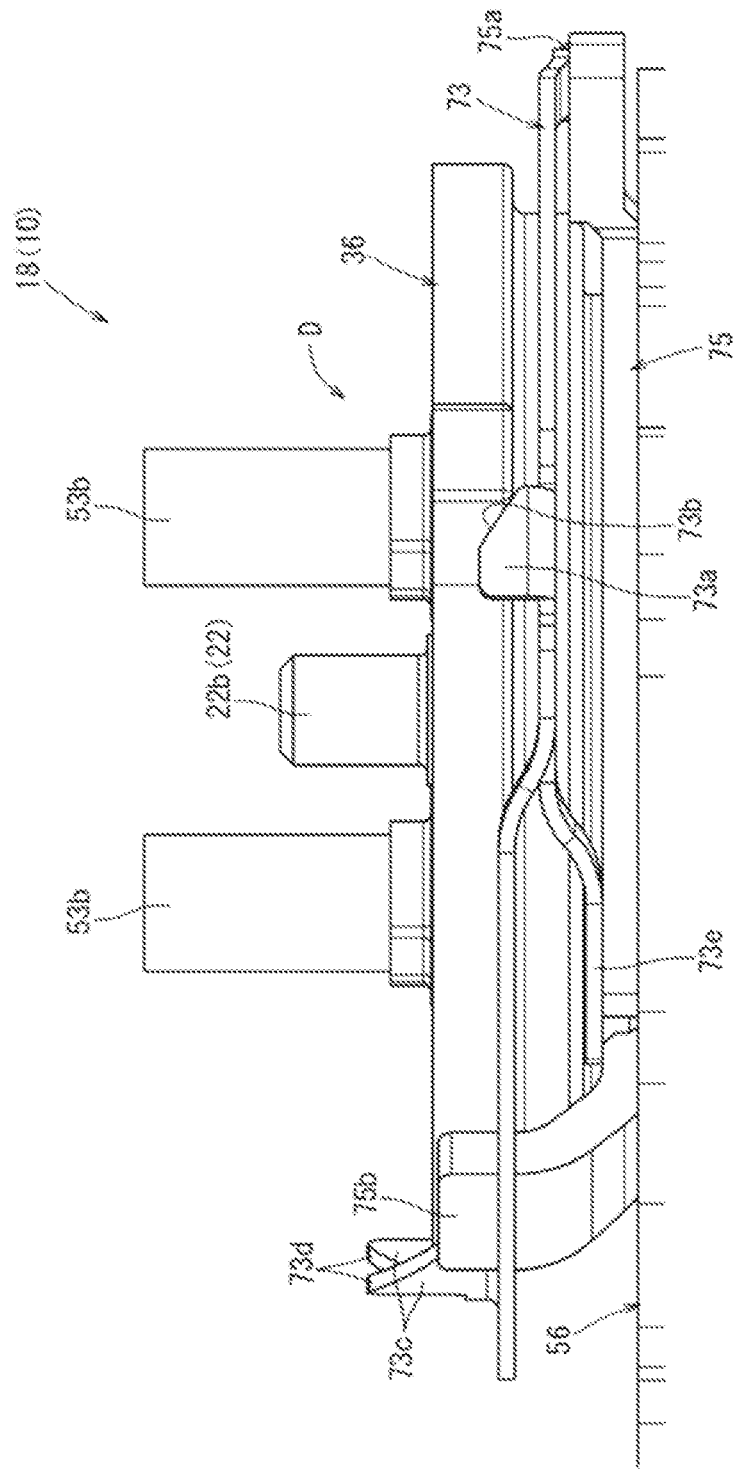
FIG. 30 is a view taken along an arrow XXX in FIG. 17.
Figure 31:
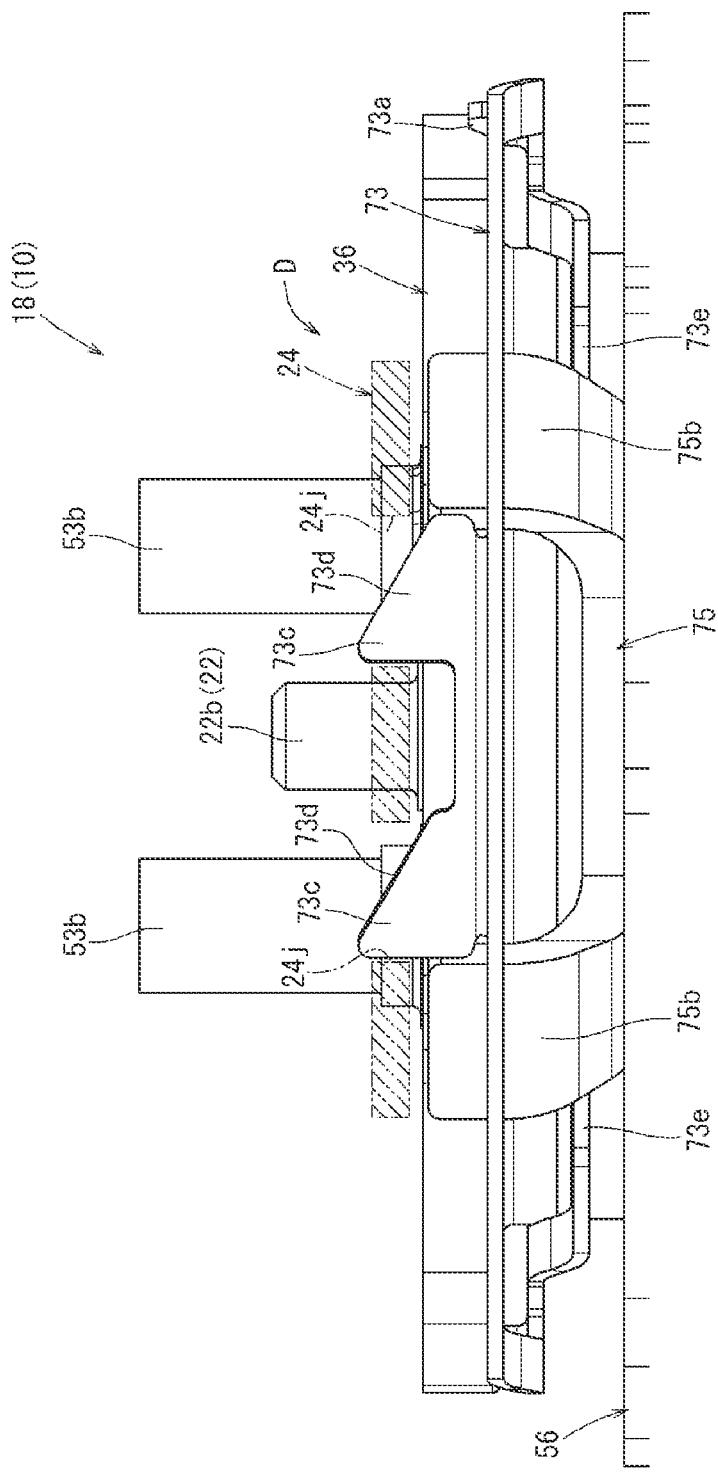
FIG. 31 is a view taken along an arrow XXXI in FIG. 17.

The plate spring 73 is assembled to the output plate 75 in a state in which an elastic force is constantly applied to bend the other portion of the plate spring 73 to a right side (outer side in the seat width direction). Accordingly, as illustrated in FIGS. 17, 30, and 31, when the outer lever 41 is in the neutral position, the plate spring 73 is in a state in which fitting pieces 73c, which are formed on a free end side of the plate spring 73 and protrude to the right side, are fitted into fitting holes 24j formed in the cover 24 by the elastic force.

By the fitting described above, the plate spring 73 locks the rotation of the output plate 75 in the clockwise direction (downward rotation direction) illustrated in FIG. 17, and allows the rotation of the output plate 75 in the counterclockwise direction (upward rotation direction). This is because, as illustrated in FIG. 31, each of the fitting pieces 73c of the plate spring 73 has an inclined surface 73d whose protrusion decreases in the counterclockwise direction in the drawing.

That is, in a state in which the fitting pieces 73c are fitted into the fitting holes 24j of the cover 24, a side surface of each of the fitting pieces 73c of the plate spring 73 straight abuts against a corresponding one of inner side surfaces of the fitting holes 24j relative to the rotation of the output plate 75 in the clockwise direction (downward rotation direction) in the drawing. However, the inclined surface 73d of each of the fitting pieces 73c of the plate spring 73 obliquely abuts against the inner side surface of the corresponding fitting hole 24j relative to the rotation of the output plate 75 in the counterclockwise direction (upward rotation direction) in the drawing. Therefore, the fitting pieces 73c of the plate spring 73 are pulled out from the fitting holes 24j against the elastic force accompanying with the rotation of the output plate 75 by the guiding due to the oblique abutment (refer to FIGS. 37 and 38).

The fitting pieces 73c of the plate spring 73 are pulled out from the fitting holes 24j when the outer lever 41 is rotated in the clockwise direction (downward rotation direction) as illustrated in FIG. 19 from the state in which the outer lever 41 is in the neutral position illustrated in FIG. 17. Accordingly, the rotation lock state of the output plate 75 in the clockwise direction is released. Specifically, as illustrated in FIG. 19, when the outer lever 41 is rotated in the clockwise direction (downward rotation direction), the rotation transmission plate 36 is rotated in the clockwise direction.

Figure 32:
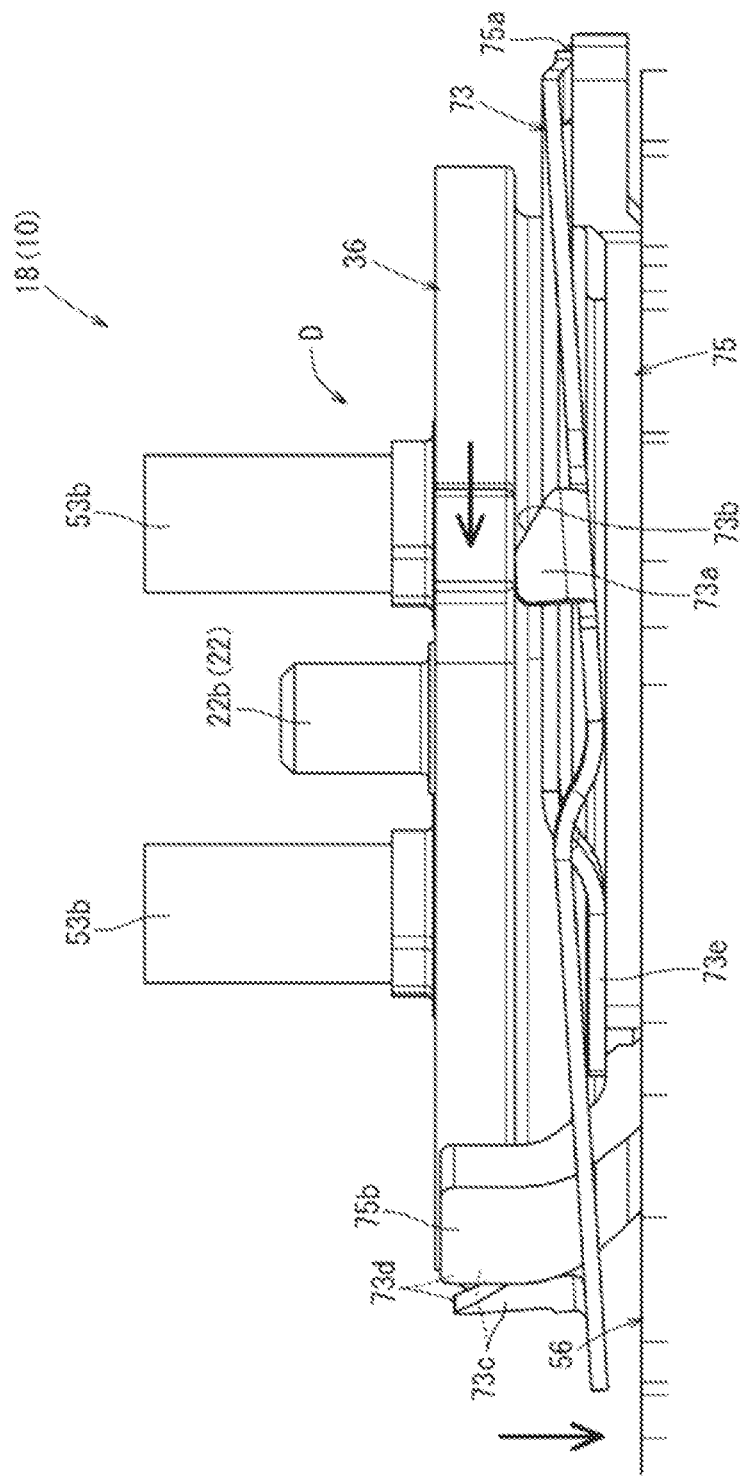
FIG. 32 is a view taken along an arrow XXXII in FIG. 19.
Figure 33:
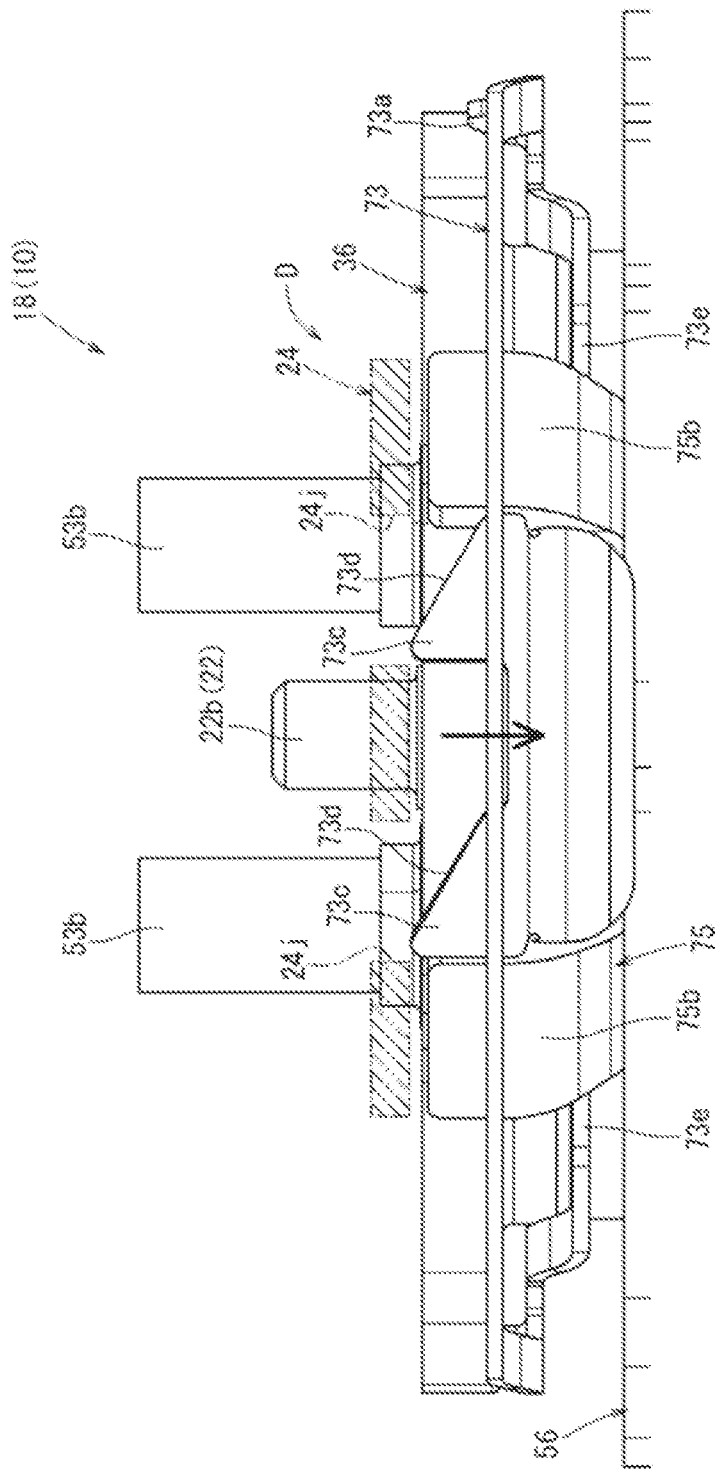
FIG. 33 is a view taken along an arrow XXXIII in FIG. 19.

Accordingly, pressing portions 36d formed on the outer peripheral portion of the rotation transmission plate 36 press pressing pieces 73a of the plate spring 73 to the left side as illustrated in FIG. 32. Accordingly, as illustrated in FIG. 33, the plate spring 73 is operated to pull out the fitting pieces 73c from the fitting holes 24j of the cover 24 against the elastic force. As a result, the output plate 75 is allowed to rotate in the clockwise direction in the drawing (downward rotation).

Figure 34:
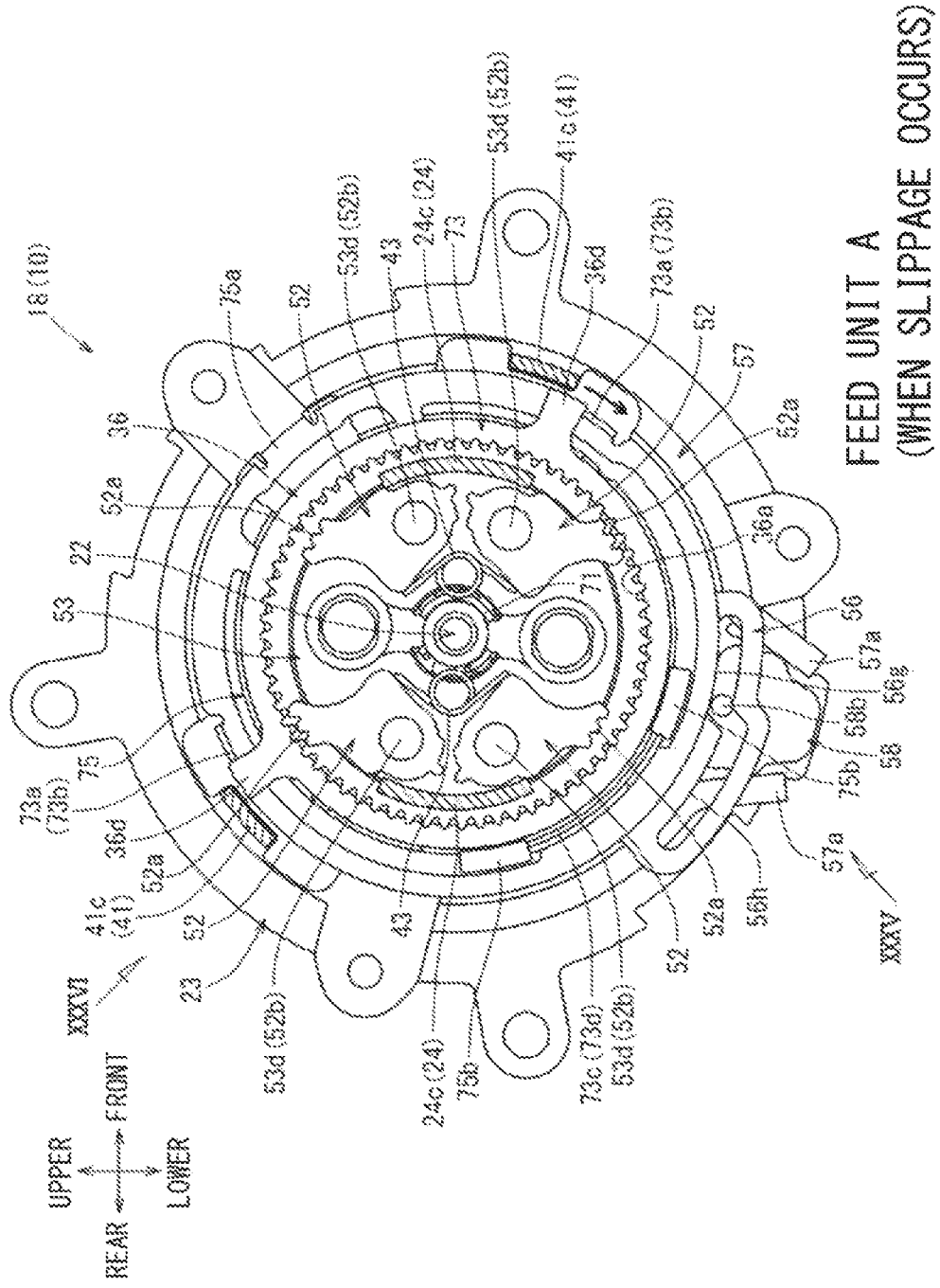
FIG. 34 is a schematic view corresponding to FIG. 19 when slippage occurs in an output shaft when the output shaft is lowered.
Figure 35:
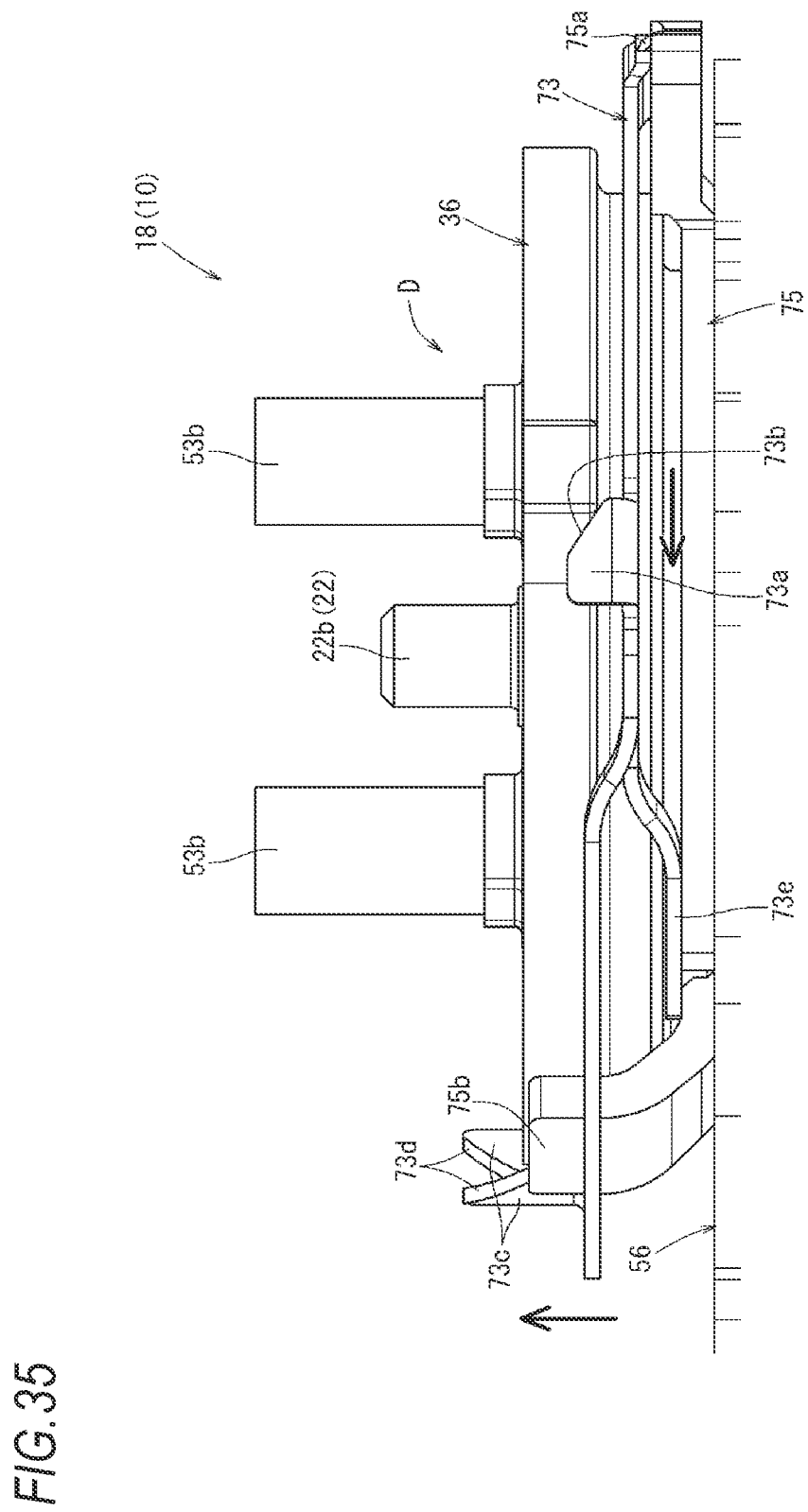
FIG. 35 is a view taken along an arrow XXXV in FIG. 34.
Figure 36:
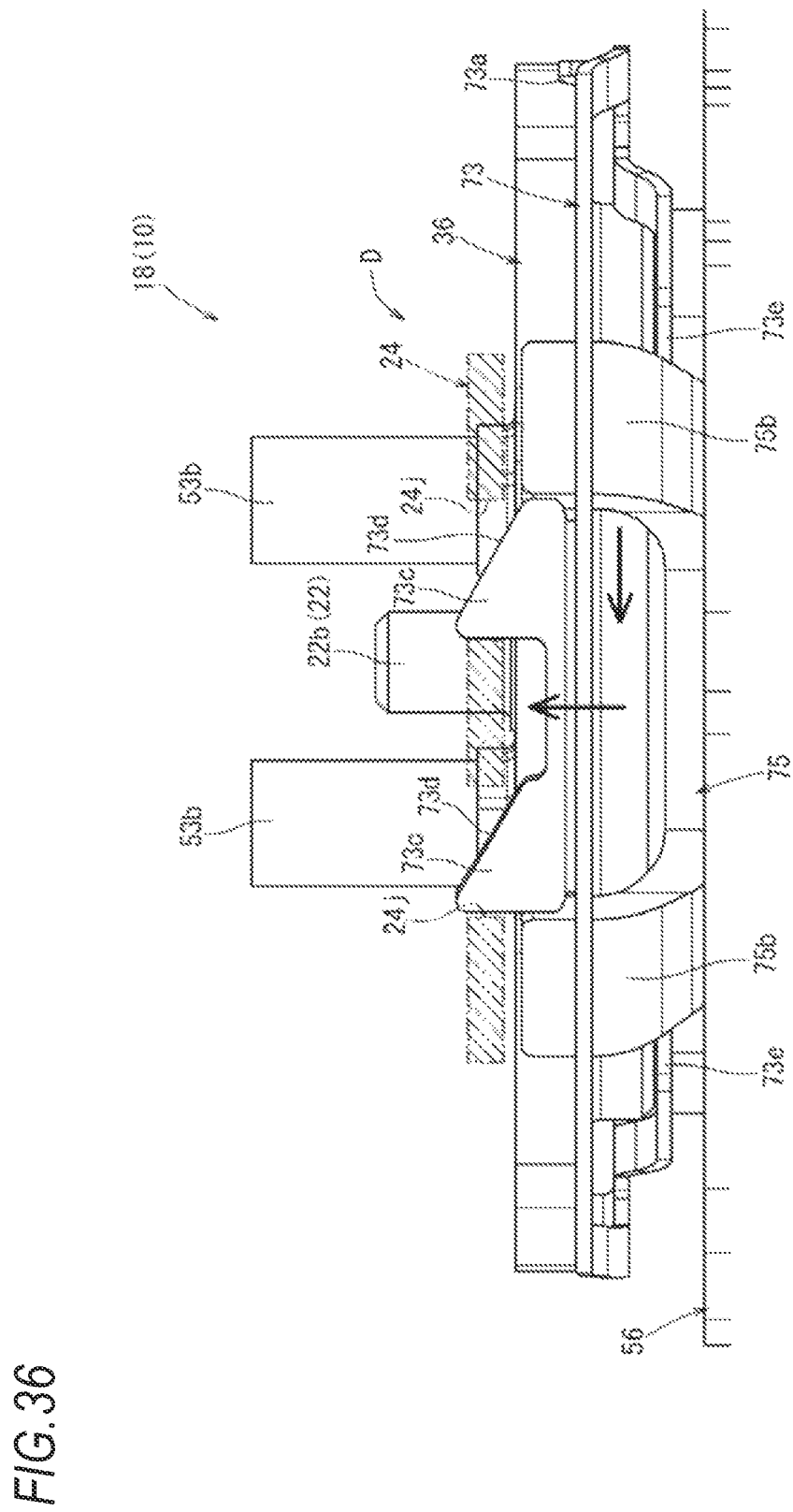
FIG. 36 is a view taken along an arrow XXXVI in FIG. 34.

As illustrated in FIG. 34, when the output shaft 22 is rotated downward in the clockwise direction in the drawing by the operation of the outer lever 41, the plate spring 73 is disengaged from the pressing portions 36d as illustrated in FIGS. 35 and 36 when slippage of the output shaft 22 occurs in which the output shaft 22 rotates preceding to the rotation transmission plate 36 against the friction force of the friction ring 57. Accordingly, the plate spring 73 causes the fitting pieces 73c to fit into the fitting holes 24j of the cover 24 again by its elastic force.

By the fitting described above, the plate spring 73 locks the rotation of the output plate 75 in the clockwise direction, and stops the slippage of the output shaft 22. Thereafter, when the plate spring 73 rotates to a position where the rotation transmission plate 36 catches up with the output shaft 22 by the operation of the outer lever 41, the pressing pieces 73a of the plate spring 73 are pushed leftward by the pressing portions 36d, as illustrated in FIGS. 19 and 32. Accordingly, as illustrated in FIG. 33, the fitting pieces 73c of the plate spring 73 are pulled out from the fitting holes 24j of the cover 24, and the downward rotation of the output plate 75 is allowed.

As illustrated in FIGS. 9 to 12, the rotation control device 18 further includes torsion springs 35, 43, 71, and 55. The torsion spring 35 is hooked between the outer lever 41 and the cover 24 and biases the outer lever 41 to the neutral position relative to the cover 24.

Each of the torsion springs 43 is hooked between a corresponding pair of upper and lower feed claws 52 among the four feed claws 52, and biases the feed claws 52 in a rotation direction in which the feed claws 52 mesh with the internal gear 36a of the rotation transmission plate 36. The torsion spring 71 is hooked between the rotation transmission plate 36 and the output plate 75, and holds the output plate 75 in a state in which the output plate 75 is biased in the downward rotation direction relative to the rotation transmission plate 36 and is abutted against the rotation transmission plate 36. Each of the torsion springs 55 is hooked between a corresponding pair of upper and lower pawls 32 (a pair of upper and front pawls 32 and a pair of rear and lower pawls 32), and biases the pawls 32 in a rotation direction in which the pawls 32 mesh with the internal gear 37a of the rotation plate 37.

{Specific Configurations of Each Unit of Rotation Control Device 18}

Next, members constituting the rotation control device 18 will be described in detail. FIGS. 4 to 8 show an assembled state of the rotation control device 18. FIGS. 9 to 12 are perspective views in which the rotation control device 18 is disassembled into portions. FIGS. 13 to 16 are perspective views in which the rotation control device 18 is assembled into portions. FIGS. 17 to 38 are schematic views illustrating the operation of the rotation control device 18 for each layer.

Therefore, in the following description, the assembled state of the rotation control device 18 will be appropriately referred to FIGS. 4 to 8. Configurations of single members will be appropriately referred to FIGS. 9 to 12. Assembled states of the members will be appropriately referred to FIGS. 13 to 16. Operations of the members will be appropriately referred to FIG. 17 to FIG. 38.

First, configurations of the outer lever 41 and the inner lever 53 constituting the input unit N will be described. As illustrated in FIGS. 9 to 12 and the like, the outer lever 41 is formed of a substantially disk-shaped member whose surface faces the seat width direction. The outer lever 41 is integrally assembled with the operation handle 5.

The outer lever 41 is formed with a center hole 41a in a central portion (portion through which the central axis C passes). The center hole 41a penetrates the central portion in the axial direction in a round hole shape. A fourth columnar shaft portion 22g, which constitutes an end portion of the output shaft 22 on a right side (outer side in the seat width direction), is inserted into the center hole 41a from a left side and is rotatably fitted therein (see FIGS. 7 and 8). The outer lever 41 is formed with through holes 41b in an intermediate portion of a disk portion in symmetrical positions (upper and lower positions) in the circumferential direction. The through holes 41b penetrate the intermediate portion in the axial direction in a round hole shape.

A pair of stopper pins 53b protruding from the inner lever 53 to the right side are inserted into the through holes 41b from the left side and are integrally joined to the through holes 41b. Accordingly, the outer lever 41 is integrally joined to the inner lever 53.

The outer lever 41 is formed with the arms 41c at a peripheral edge portion in two positions on a front lower side and a rear upper side. The arms 41c are bent at a right angle in the axial direction (leftward direction) and overhangs. The arms 41c pass through corresponding through holes 24g formed in the cover 24 and are inserted into corresponding insertion grooves 56d formed in the outer peripheral portion of the control plate 56 from the right side to be integrally fitted therein. Accordingly, the outer lever 41 rotates integrally with the control plate 56.

The inner lever 53 is formed of a substantially disk-shaped member whose surface faces the seat width direction. The inner lever 53 is formed with a center hole 53a in a central portion (portion through which the central axis C passes). The center hole 53a penetrates the central portion in the axial direction in a round hole shape. A third columnar shaft portion 22f, which constitutes an axially intermediate portion of the output shaft 22, is inserted into the center hole 53a from the left side and is rotatably fitted therein (see FIGS. 7 and 8).

The inner lever 53 is formed with elongated through holes 53c in an intermediate portion of a disk portion in symmetrical positions (upper and lower positions) in the circumferential direction. The through holes 53c penetrate the intermediate portion in the axial direction. The pair of stopper pins 53b are inserted into the through holes 53c from the right side to positions where the stopper pins 53b abut against the seat, and are integrally joined to the through holes 53c. Accordingly, the inner lever 53 is integrally joined to the outer lever 41.

The inner lever 53 is formed with shaft pins 53d at the intermediate portion of the disk portion in four positions in the circumferential direction. The shaft pins 53d protrude in a round pin shape in the axial direction (rightward direction). The four feed claws 52 are fitted to the shaft pins 53d from the right side and are rotatably coupled to the shaft pins 53d.

Next, configurations of the body base 23, the intermediate base 25, and the cover 24 constituting the support unit S will be described with reference to FIGS. 9 to 12 and the like. The body base 23 is formed of a substantially disk-shaped member whose surface faces the seat width direction. The body base 23 is formed with the internal gear 23e at the outer peripheral portion. The internal gear 23e is half-punched into a shape that is extruded into a substantially cylindrical shape in the axial direction (rightward direction).

The internal gear 23e has, on its inner peripheral surface, internal teeth formed in an endless shape over the entire circumference. The internal teeth can mesh with the three planetary gears 63 to transmit power. The body base 23 is formed with a center hole 23c in a central portion (portion through which the central axis C passes) of the internal gear 23e. The center hole 23c penetrates the central portion in the axial direction in a round hole shape. The pinion gear 22a, which is formed at an end portion of the output shaft 22 on a left side (inner side in the seat width direction), is inserted into the center hole 23c from a right side (outer side in the seat width direction). A first columnar shaft portion 22b, which constitutes the axially intermediate portion of the output shaft 22, is rotatably fitted into the center hole 23c (see FIGS. 7 and 8).

The body base 23 is formed with a stepped recessed portion 23f around the center hole 23c. The stepped recessed portion 23f concentrically recesses the periphery of the center hole 23c to a left side of an accommodation recessed portion 23b that is a region in the internal gear 23e. A disk-shaped flange 22h, which constitutes the axially intermediate portion of the output shaft 22, is rotatably fitted to the stepped recessed portion 23f (see FIGS. 7 and 8).

Figure 7:
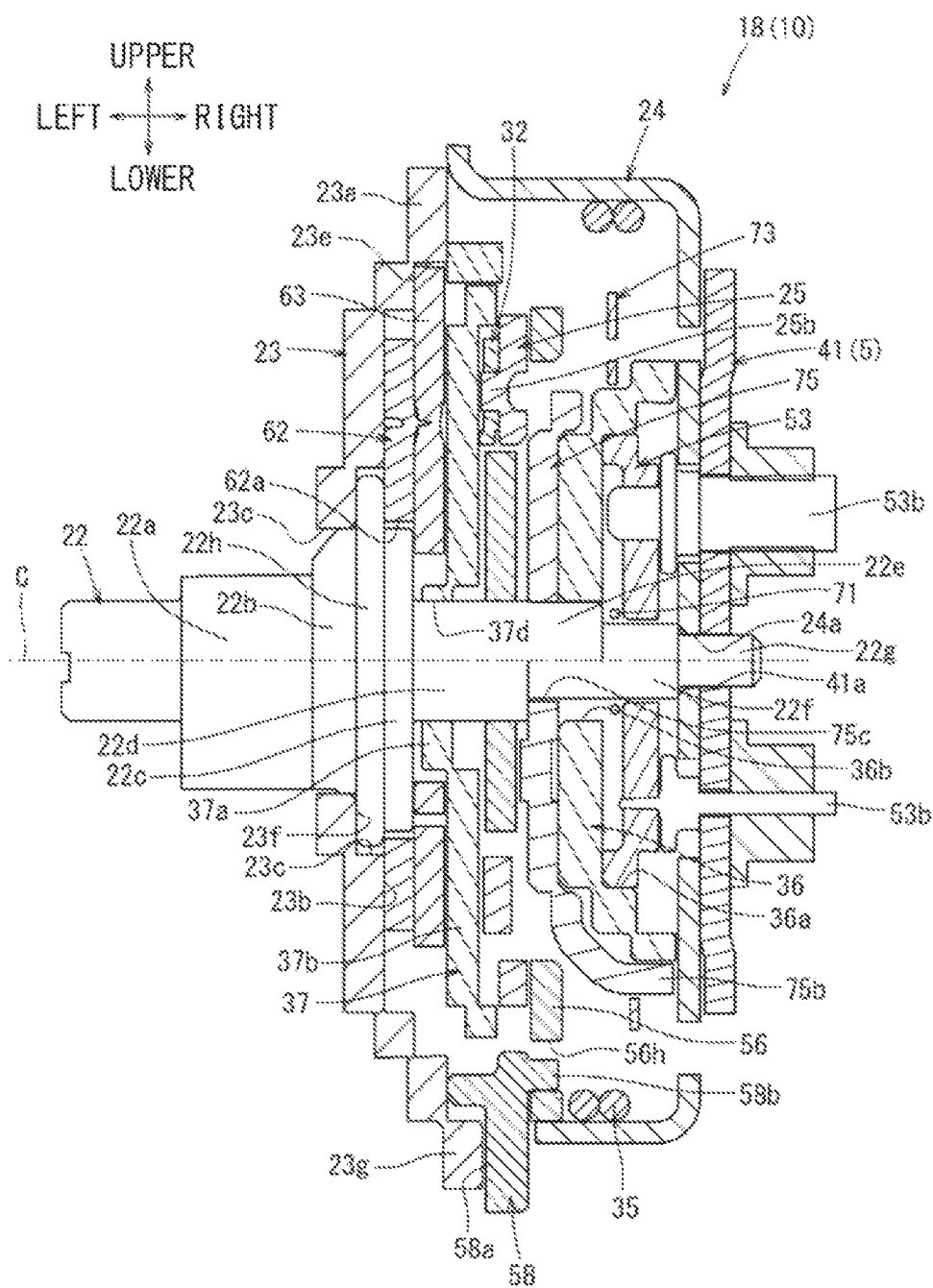
FIG. 7 is a sectional view taken along a line VII-VII of FIG. 6.
Figure 8:
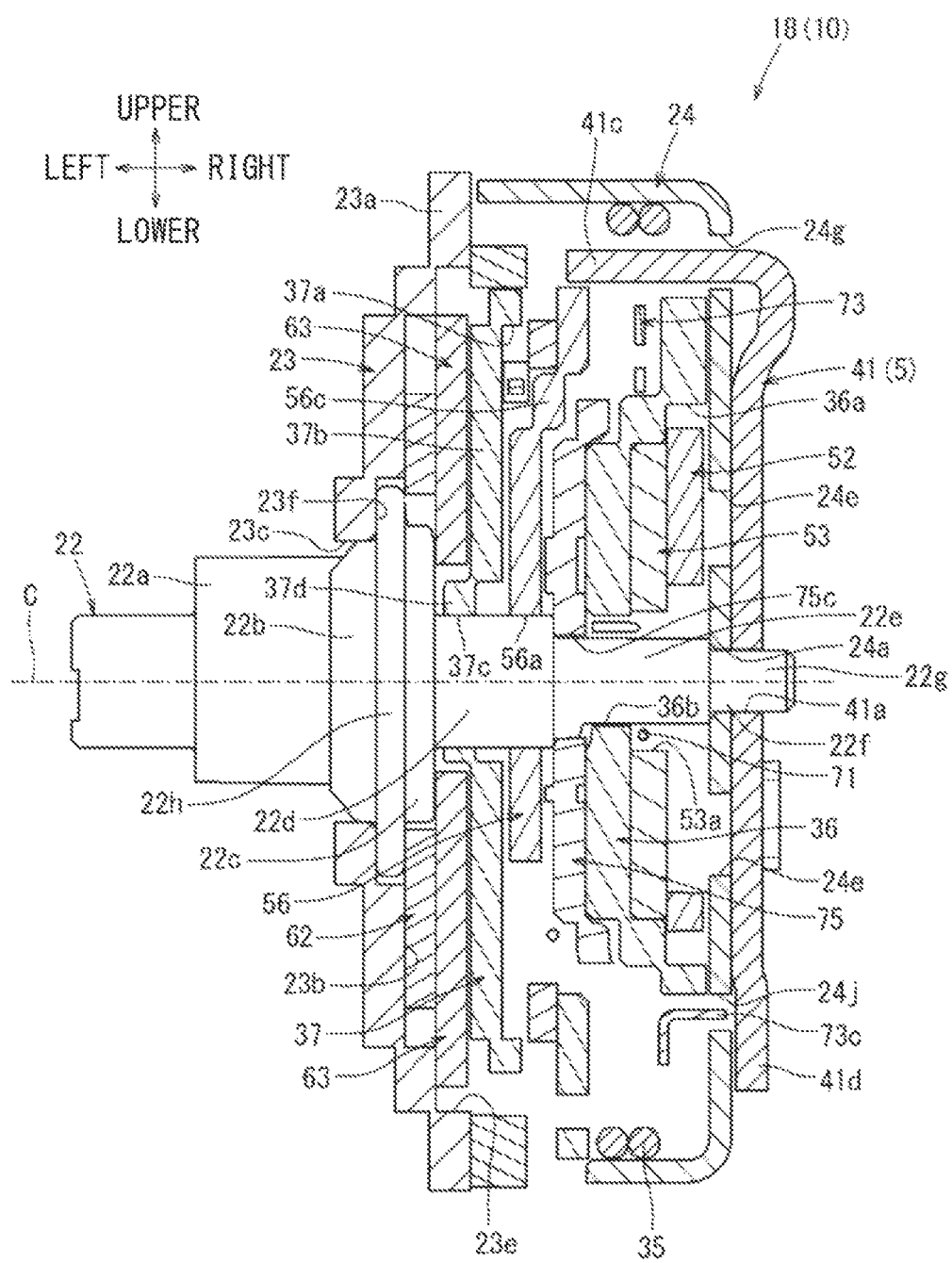
FIG. 8 is a sectional view taken along a line VIII-VIII of FIG. 6.

By the assembly described above, the axially intermediate portion of the output shaft 22, the planetary carrier 62 assembled to the intermediate portion, and the three planetary gears 63 are accommodated in the accommodation recessed portion 23b that is a region in the internal gear 23e of the body base 23 (see FIGS. 7, 8 and 13). Specifically, the three planetary gears 63 are meshed with the internal gear 23e of the body base 23 to transmit power.

A portion of the body base 23 whose surface faces the axial direction (rightward direction) at protruding tops of the internal gear 23e is a seat portion 23a. Seat portions 24d of the cover 24 are abutted against the seat portion 23a in the axial direction. Locking portions 23d are formed in three positions around the seat portion 23a. The locking portions 23d protrude in a pedestal shape in the axial direction (rightward direction), and abut against and are integrally bolted (not illustrated) to protruding portions 25c in the axial direction. The protruding portions 25c protrude radially outward from corresponding three positions around the intermediate base 25.

The intermediate base 25 and the cover 24 are overlapped on the seat portion 23a in order in the axial direction from the right side (outer side in the seat width direction), and are integrally joined to the seat portion 23a by bolting. The body base 23 is also bolted and integrally joined to the right side frame 3a (see FIG. 3).

The body base 23 is formed with a guide protrusion 23g in a lower position on the seat portion 23a. The guide protrusion 23g protrudes in the axial direction (rightward direction) to extend straight radially inward and outward in a stripe shape. A slide groove 58a formed in the control piece 58, which will be described later, is fitted into the guide protrusion 23g from the right side to be radially slidable. Accordingly, the control piece 58 is engaged with the guide protrusion 23g of the body base 23 to be movable only radially inward and outward.

The intermediate base 25 is formed of a substantially ring-shaped member whose surface faces the seat width direction. The intermediate base 25 is formed with shaft pins 25b in four positions in the circumferential direction of a seat portion 25a having a ring plate shape. The shaft pins 25b protrude in a round pin shape in the axial direction (leftward direction). The four pawls 32 are fitted into the shaft pins 25b from the left side and are rotatably coupled to the shaft pins 25b.

The intermediate base 25 is formed with the protruding portions 25c in three positions in the circumferential direction of the seat portion 25a. The protruding portions 25c protrude radially outward. The protruding portions 25c are abutted against the corresponding locking portions 23d formed in three positions at the seat portion 23a of the body base 23 from the right side, and are bolted and integrally joined to the locking portions 23d.

The cover 24 is formed of a substantially disk-shaped member whose surface faces the seat width direction. The cover 24 is formed with a flange 24h protruding in a substantially cylindrical shape in the axial direction (leftward direction) from an outer peripheral edge of the cover 24. Since the seat portions 24d, which are bent at a right angle and extend to an outer peripheral side from the three positions at protruding tops of the flange 24h, are abutted against and bolted to the seat portion 23a of the body base 23, the cover 24 is integrally coupled to the body base 23. By the joining described above, the cover 24 is set in a state in which components such as the feed unit A and the lock unit B are enclosed between the cover 24 and the body base 23 (see FIGS. 4 and 5).

The cover 24 is formed with a center hole 24a in a central portion (portion through which the central axis C passes) of a disk portion thereof. The center hole 24a penetrates the central portion in the axial direction in a round hole shape. The fourth columnar shaft portion 22g, which constitutes the end portion of the output shaft 22 on the right side (outer side in the seat width direction), is inserted into the center hole 24a from the left side and is rotatably fitted therein (see FIGS. 7 and 8).

The cover 24 is further formed with two spring hook holes 24b in a peripheral edge portion of the disk portion. Each of the spring hook holes 24b has an arc shape penetrating the peripheral edge portion in the axial direction. An operation piece 41d, which extends downward from a lower edge portion of the outer lever 41, is overlapped between the spring hook holes 24b from a right side.

End portions of the torsion spring 35 are inserted into the corresponding two spring hook holes 24b from the left side. Then, the operation piece 41d is sandwiched in the circumferential direction between the end portions of the torsion spring 35 that are inserted into the spring hooking holes 24b. By the assembly described above, the outer lever 41 is biased to the cover 24 by the biasing force of the torsion spring 35 so that the operation piece 41d is constantly held in a position between the two spring hook holes 24b (neutral position before operation, see FIG. 6).

As illustrated in FIG. 10 and the like, the cover 24 is further formed with riding portions 24c at the peripheral edge portion of the disk portion. The riding portions 24c are cut and raised at a right angle and protrude in the axial direction (leftward direction) from symmetrical positions (front and rear positions) in the circumferential direction. As illustrated in FIG. 17, each of the riding portions 24c is inserted between a corresponding pair of upper and lower feed claws 52 of the four feed claws 52.

As illustrated in FIG. 19, when the inner lever 53 is rotated in a direction (clockwise direction in the drawing) in which the output shaft 22 is rotated downward, the two feed claws 52 on a right upper side (front upper side) and a left lower side (rear lower side) of the four feed claws 52 are abutted against edges of the riding portions 24c, and the two feed claws 52 are unmeshed from the internal gear 36a of the rotation transmission plate 36. As illustrated in FIG. 22, when the rotation of the inner lever 53 is returned, the riding portions 24c return the two unmeshed feed claws 52 to the state in which the two feed claws 52 are meshed with the internal gear 36a of the rotation transmission plate 36.

Similarly, as illustrated in FIG. 24, when the inner lever 53 is rotated in a direction (counterclockwise direction in the drawing) in which the output shaft 22 is rotated upward, the two feed claws 52 on a left upper side (rear upper side) and a right lower side (front lower side) of the four feed claws 52 are abutted against edges of the riding portions 24c, and the two feed claws 52 are unmeshed from the internal gear 36a of the rotation transmission plate 36. As illustrated in FIG. 27, when the rotation of the inner lever 53 is returned, the riding portions 24c return the two unmeshed feed claws 52 to the state in which the two feed claws 52 are meshed with the internal gear 36a of the rotation transmission plate 36.

As illustrated in FIG. 10 and the like, the cover 24 is formed with guide holes 24e in an intermediate portion of the disk portion in symmetrical positions (upper and lower positions) in the circumferential direction. The guide holes 24e penetrate the intermediate portion in the axial direction in a shape extending in an arc shape drawn around the central axis C. The stopper pins 53b, which extend in the axial direction across the outer lever 41 and the inner lever 53, are inserted into the guide holes 24e from the left side.

Each of the guide holes 24e has a hole shape extending in an arc shape, thereby releasing movement in which the outer lever 41 and the inner lever 53 are integrally rotated from the neutral position (see FIG. 29) in the downward rotation direction or in the upward rotation direction. Further, the guide holes 24e lock the upward and downward movements of the outer lever 41 and the inner lever 53 in positions where the stopper pins 53b abut against end portions of the holes extending in an arc shape.

As illustrated in FIG. 9 and the like, the cover 24 is formed with the through holes 24g in the peripheral edge portion of the disk portion in two positions on a front lower side and a rear upper side of the cover 24. The through holes 24g penetrate the peripheral edge portion in the axial direction in a shape extending in an arc shape drawn around the central axis C. The corresponding arms 41c protruding from the peripheral edge portion of the outer lever 41 in the axial direction (leftward direction) are inserted into the corresponding through holes 24g from the right side. Accordingly, the through holes 24g release the movement of the arms 41c when the outer lever 41 is rotated from the neutral position.

The cover 24 is formed with the fitting holes 24j in the peripheral edge portion of the disk portion in twelve positions in the circumferential direction. The fitting holes 24j penetrate the peripheral edge portion in the axial direction in a shape extending in a concentric arc shape drawn around the central axis C. The fitting holes 24j are holes for locking the movement of the output plate 75 integrally coupled with the plate spring 73 and the movement of the output shaft 22 in the downward rotation direction by fitting the fitting pieces 73c of the plate spring 73 constituting the slippage preventing unit D to the fitting holes 24j from the left side.

Next, configurations of the four feed claws 52, the rotation transmission plate 36, and the output plate 75 constituting the feed unit A will be described with reference to FIG. 9, 11, and the like. Each of the four feed claws 52 is formed of an arm-shaped member whose surface faces the seat width direction. Each feed claw 52 is formed with a center hole 52b penetrating a base end portion of the feed claw 52 in a round hole shape in the axial direction. Each of the shaft pins 53d formed on the inner lever 53 is fitted into the corresponding center hole 52b from the right side so that the feed claw 52 is rotatably coupled to the shaft pin 53d.

As illustrated in FIG. 17, the four feed claws 52 are arranged side by side on the inner lever 53 and constitute pairs in each of the front-rear direction and the upper-lower direction. Among the four feed claws 52, each of the two feed claws 52 on the front upper side and the rear lower side has a shape whose arm extends in the counterclockwise direction in the drawing from a rotation center (shaft pin 53d). Each of the two feed claws 52 on the front lower side and the rear upper side has a shape whose arm extends in the clockwise direction in the drawing from a rotation center (shaft pin 53d).

The four feed claws 52 are formed with external teeth 52a at top end portions of the arms thereof. The external teeth 52a can mesh with the internal gear 36a of the rotation transmission plate 36. Each of the torsion springs 43 is hooked between a corresponding pair of upper and lower feed claws 52 among the four feed claws 52.

The front torsion spring 43 is set in a state in which one end and the other end thereof are pressed against the front upper feed claw 52 and the front lower feed claw 52, respectively, in a biasing direction in which a resilient force is applied to the front upper feed claw 52 and the front lower feed claw 52. The rear torsion spring 43 is set in a state in which one end and the other end thereof are pressed against the rear upper feed claw 52 and the rear lower feed claw 52, respectively, in a biasing direction in which a resilient force is applied to the rear upper feed claw 52 and the rear lower feed claw 52.

By assembling the torsion springs 43, as illustrated in FIG. 17, the feed claws 52 are constantly pressed and rotated radially outward around corresponding rotation centers (shaft pins 53d), and the external teeth 52a of the feed claws 52 are held in a state of being meshed with the internal gear 36a of the rotation transmission plate 36. Among the four feed claws 52, a meshing force applied by the external teeth 52a to the internal gear 36a of the rotation transmission plate 36 is different between the pair of two feed claws 52 on the front upper side and the rear lower side and the pair of two feed claws 52 on the front lower side and the rear upper side.

Specifically, when the external teeth 52a of the two feed claws 52 on the rear upper side and the front lower side mesh with the internal gear 36a, as illustrated in FIG. 19, the inner lever 53 is rotated from the neutral position in the clockwise direction (downward rotation direction) in the drawing, so that the two feed claws 52 on the rear upper side and the front lower side are integrated with the internal gear 36a in the rotation direction to press and rotate the internal gear 36a in the clockwise direction. However, after the inner lever 53 is rotated in the clockwise direction in the drawing, the two feed claws 52 on the rear upper side and the front lower side are not integrated with the internal gear 36a relative to the rotation in the reverse direction in which the inner lever 53 is returned to the initial position before the operation as illustrated in FIG. 22, and are returned to the initial position before the operation while sliding on the internal gear 36a in the rotation direction.

On the other hand, as illustrated in FIG. 17, when the external teeth 52a of the two feed claws 52 on the front upper side and the rear lower side mesh with the internal gear 36a, as illustrated in FIG. 24, the inner lever 53 is rotated from the neutral position in the counterclockwise direction (upward rotation direction) in the drawing, so that the two feed claws 52 on the front upper side and the rear lower side are integrated with the internal gear 36a in the rotation direction to press and rotate the internal gear 36a in the counterclockwise direction. However, after the inner lever 53 is rotated in the counterclockwise direction in the drawing, the two feed claws 52 on the front upper side and the rear lower side are not integrated with the internal gear 36a relative to the rotation in the reverse direction in which the inner lever 53 is returned to the initial position before the operation as illustrated in FIG. 27, and are returned to the initial position before the operation while sliding on the internal gear 36a in the rotation direction.

With the above-described configuration, the four feed claws 52 can feed the rotation transmission plate 36 in a manner of pressing and rotating the rotation transmission plate 36 in either rotation direction of the inner lever 53 from the neutral position. When the inner lever 53 is returned from the position to which the inner lever 53 is rotated in either direction to the neutral position, the four feed claws 52 return the inner lever 53 to the initial position before the operation while leaving the rotation transmission plate 36 in the position to which the rotation transmission plate 36 is pressed and rotated.

As illustrated in FIG. 19, when the inner lever 53 is rotated in the clockwise direction (downward rotation direction) from the neutral position, the two feed claws 52 on the front upper side and the rear lower side among the four feed claws 52 are unmeshed from the internal gear 36a and held in this state. Further, as illustrated in FIG. 24, when the inner lever 53 is rotated from the neutral position in the counterclockwise direction (upward rotation direction) in the drawing, the two feed claws 52 on the rear upper side and the front lower side are unmeshed from the internal gear 36a and held in this state.

With such a configuration, when the inner lever 53 is returned from the position to which the inner lever 53 is rotated in either direction to the neutral position, the two feed claws 52 that act to restrict the movement of the inner lever 53 do not hinder the returning movement of the inner lever 53. Specifically, as illustrated in FIG. 19, when the inner lever 53 is rotated from the neutral position in the clockwise direction (downward rotation direction) in the drawing, the two feed claws 52 on the front upper side and the rear lower side are pressed against edges of the corresponding riding portions 24c of the cover 24, and are rotated to be unmeshed from the internal gear 36a. While the inner lever 53 is operated in the above-described direction, the two feed claws 52 on the front upper side and the rear lower side ride on the corresponding riding portions 24c and are held in a state in which the two feed claws 52 on the front upper side and the rear lower side are unmeshed from the internal gear 36a.

On the other hand, as illustrated in FIG. 26, when the inner lever 53 is rotated from the neutral position in the counterclockwise direction (upward rotation direction) in the drawing, the two feed claws 52 on the rear upper side and the front lower side are pressed against the edges of the corresponding riding portions 24c of the cover 24, and are rotated to be unmeshed from the internal gear 36a. While the inner lever 53 is operated in the above-described direction, the two feed claws 52 on the rear upper side and the front lower side ride on the corresponding riding portions 24c and are held in a state in which the two feed claws 52 on the rear upper side and the front lower side are unmeshed from the internal gear 36a.

Here, as illustrated in FIG. 17, the external teeth 52a of the two feed claws 52 on the front upper side and the rear lower side mesh with the teeth of the internal gear 36a in positions where the external teeth 52a shift from the teeth of the internal gear 36a by a half pitch. Similarly, the external teeth 52a of the two feed claws 52 on the rear upper side and the front lower side mesh with the teeth of the internal gear 36a in positions where the external teeth 52a shift from the teeth of the internal gear 36a by a half pitch. With such a configuration, the backlash in the rotation direction that may occur between the external teeth 52a of the feed claws 52 and the internal gear 36a when the external teeth 52a and the internal gear 36a mesh with each other is reduced to be small.

When the inner lever 53 is rotated in the clockwise direction (downward rotation direction) in the drawing, the two feed claws 52 on the front upper side and the rear lower side press and rotate the internal gear 36a in the clockwise direction from the initial stage. However, when the inner lever 53 is rotated in the counterclockwise direction (upward rotation direction) in the drawing, the two feed claws 52 on the rear upper side and the front lower side do not apply the force of pressing and rotating the internal gear 36a in the counterclockwise direction to the inner gear 36a at the initial stage, but press and rotate the inner gear 36a in the counterclockwise direction after the rotation progresses to a certain extent.

A reason for this is that the coupling between the rotation transmission plate 36 and the output plate 75, which will be described later, is a coupling in which, in the initial neutral position, the rotation transmission plate 36 and the output plate 75 are released from rotation on one side and the rotation transmission plate 36 and the output plate 75 integrally rotate on the other side. That is, as described above with reference to FIGS. 17, 30, and 31, when the inner lever 53 is in the initial neutral position, the rotation transmission plate 36 is disposed in a position deviated, relative to the output plate 75, in the counterclockwise direction in the drawing from the position where the pressing portions 36d press the pressing pieces 73a of the plate spring 73 by the biasing force of the torsion spring 71 in order to fit the fitting pieces 73c of the plate spring 73 into the fitting holes 24j of the cover 24.

Figure 37:
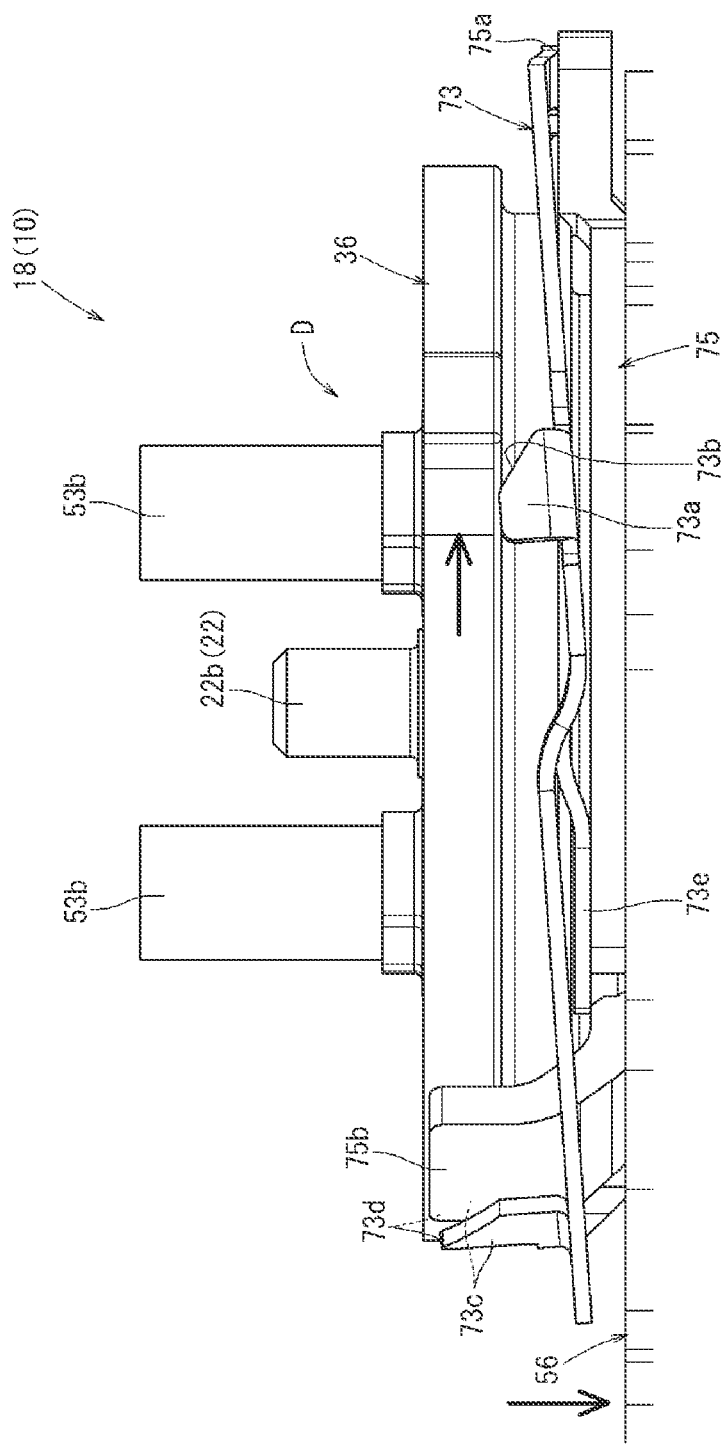
FIG. 37 is a view taken along an arrow XXXVII in FIG. 24.
Figure 38:
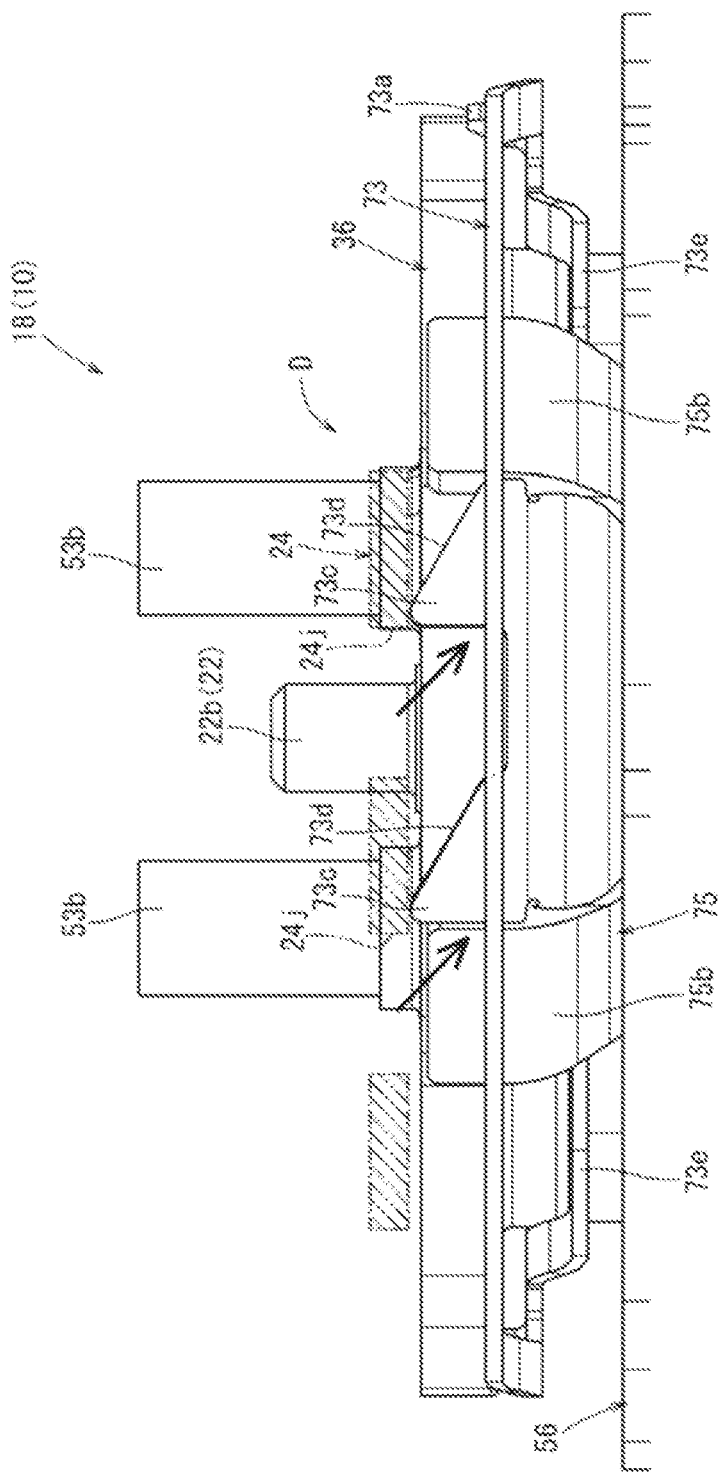
FIG. 38 is a view taken along an arrow XXXVIII in FIG. 24.

Then, as illustrated in FIGS. 19, 32, and 33, initial relative rotation of the rotation transmission plate 36 relative to the output plate 75 is allowed in order to press the pressing pieces 73a of the plate spring 73 in the axial direction (leftward direction) with the pressing portions 36d and release the lock by the operation of rotating the inner lever 53 in the clockwise direction (downward rotation direction) from the neutral position. On the other hand, as illustrated in FIGS. 24, 37, and 38, when the inner lever 53 is rotated from the neutral position in the counterclockwise direction (upward rotation direction) in the drawing, the rotation transmission plate 36 is integrated with the output plate 75 in the rotation direction from the initial stage since it is not necessary to release the lock.

As illustrated in FIG. 9 and the like, the rotation transmission plate 36 is formed of a substantially disk-shaped member whose surface faces the seat width direction. The rotation transmission plate 36 is formed with the internal gear 36a on the outer peripheral portion. The internal gear 36a is half-punched into a shape that is extruded into a substantially cylindrical shape in the axial direction (rightward direction). The rotation transmission plate 36 is formed with a center hole 36b in a central portion (portion through which the central axis C passes) of the disk portion thereof. The center hole 36b penetrates the central portion in the axial direction in a round hole shape.

An external gear-shaped second spline 22e constituting the axially intermediate portion of the output shaft 22 is inserted into the center hole 36b from the left side to be relatively rotatable. The center hole 36b has a round hole shape slightly larger than a shape of the second spline 22e of the output shaft 22, and the second spline 22e is relatively rotated inside the center hole 36b.

The center hole 36b is formed with a hooking portion 36c on an inner circumferential surface in one position in the circumferential direction. The hook portion 36c radially protrudes inward. The open ring-shaped torsion spring 71 is hooked between the hook portion 36c and a convex portion of a spline hole 75c of the output plate 75 to be described later. The torsion spring 71 applies a biasing force to the output plate 75 so that the output plate 75 constantly rotates in the clockwise direction in the drawing relative to the rotation transmission plate 36.

As illustrated in FIG. 9 and the like, the rotation transmission plate 36 is formed with elongated holes 36e in three positions in the circumferential direction of the disk portion. The elongated holes 36e penetrate the disk portion in the axial direction in a shape extending in an arc shape drawn around the central axis C. The elongated holes 36e are arranged side by side and extend in the circumferential direction by the same length in positions of the same circle. Engagement pins 75d, which protrude rightward in a round pin shape from three positions in the circumferential direction of the disk portion of the output plate 75, are fitted into the corresponding elongated holes 36e from the left side and are engaged with the elongated holes 36e to be slidable in the rotation direction.

By the above-described engagement, the rotation transmission plate 36 and the output plate 75 are assembled to be rotatable relative to each other in a range in which the engagement pins 75d are slidable inside the elongated holes 36e. As illustrated in FIG. 17, when the inner lever 53 is in the initial neutral position, the rotation transmission plate 36 and the output plate 75 are held in a rotation position in which the engagement pins 75d are pressed against end portions of the elongated holes 36e on a clockwise side in the drawing by the biasing force of the torsion spring 71 hooked between the inner lever 53 and the output plate 75.

By the abutment described above, when the rotation transmission plate 36 is rotated in the clockwise direction (downward rotation direction) in FIG. 9 by the inner lever 53 from the neutral position, the rotation transmission plate 36 is rotated relative to the output plate 75 to a position where the engagement pins 75d are pressed against end portions of the elongated holes 36e on a counterclockwise side in the drawing. The rotation transmission plate 36 rotates in such a manner that the output plate 75 is integrally pulled in the clockwise direction from a position where the engagement pins 75d are pressed against the end portions of the elongated holes 36e on the counterclockwise side in the drawing by the rotation.

When the rotation transmission plate 36 is rotated in the counterclockwise direction (upward rotation direction) in FIG. 9 by the inner lever 53 from the neutral position, the engagement pins 75d are abutted against the end portions of the elongated holes 36e on the clockwise side in the drawing, so that the rotation transmission plate 36 rotates in such a manner that the output plate 75 is integrally pulled in the counterclockwise direction from the initial stage.

The rotation transmission plate 36 is formed with the pressing portions 36d at the outer peripheral portion. The pressing portions 36d protrude radially outward from two positions in the circumferential direction of the rotation transmission plate 36. As illustrated in FIGS. 19 and 32, when the rotation transmission plate 36 rotates relative to the output plate 75 in the clockwise direction (downward rotation direction) in the drawing, the pressing portions 36d ride on the pressing pieces 73a of the plate spring 73 and press the pressing pieces 73a in the axial direction (leftward direction).

As illustrated in FIG. 9 and the like, the output plate 75 is formed of a substantially disk-shaped member whose surface faces the seat width direction. The output plate 75 is formed with a latch portion 75a in one position in the circumferential direction of the outer peripheral portion thereof. The latch portion 75a is hooked to sandwich a corresponding part of the outer peripheral portion of the plate spring 73 in the axial direction. The output plate 75 is further formed with clamping pieces 75b in outer peripheral positions that are symmetrical with a position of the latch portion 75a of the output plate 75 in the circumferential direction. The clamping pieces 75b extend in a bent shape in the axial direction (rightward direction) and are arranged side by side in two positions in the circumferential direction.

The clamping pieces 75b support the two claw-shaped fitting pieces 73c formed on the plate spring 73 to be described later in a state in which the two claw-shaped fitting pieces 73c are collectively clamped from both sides in the circumferential direction. The output plate 75 can prevent the plate spring 73 from rotating in the circumferential direction by the hooking by the latch portion 75a and the support by the clamping pieces 75b, and the formation region of the fitting pieces 73c can be bent in the axial direction like the bending of the cantilever support beam with the latch portion 75a as a fulcrum.

The output plate 75 is formed with the spline hole 75c in a central portion (portion through which the central axis C passes) of the disk portion. The spline hole 75c has a form of an internal gear penetrating the central portion in the axial direction. The external gear-shaped second spline 22e, which constitutes the axially intermediate portion of the output shaft 22, is inserted into the spline hole 75c in a state of being integrally fitted thereto from the left side. By the fitting described above, the output plate 75 is coupled to the output shaft 22 in a state of being integrated with the output shaft 22 in the rotation direction.

The output plate 75 is formed with the engagement pins 75d in three positions in the circumferential direction of the disk portion. The engagement pins 75d protrude rightward in a round pin shape. The engagement pins 75d are assembled into the corresponding elongated holes 36e formed in the disk portion of the rotation transmission plate 36. The description of the specific function will be omitted because it is as described above. A specific configuration of the plate spring 73 will be described in detail in a detailed description of the slippage preventing unit D to be described later.

Next, configurations of the four pawls 32 and the rotation plate 37 constituting the lock unit B will be described with reference to FIGS. 10, 12, and the like. Each of the four pawls 32 is formed of an arm-shaped member whose surface faces the seat width direction. Each pawl 32 is formed with a center hole 32b penetrating a base end portion of the pawl 32 in a round hole shape in the axial direction. Each of the shaft pins 25b formed on the intermediate base 25 is fitted into the corresponding center hole 32b from the left side so that the pawl 32 is rotatably coupled to the shaft pin 25b.

As illustrated in FIG. 18, the four pawls 32 are arranged side by side on the intermediate base 25 and constitute pairs in each of the front-rear direction and the upper-lower direction. Among the four pawls 32, each of the two pawls 32 arranged in the upper-lower direction has a shape whose arm extends in the counterclockwise direction in the drawing from a rotation center (shaft pin 25b). Each of the remaining two pawls 32 arranged in the front-rear direction has a shape whose arm extends in the clockwise direction in the drawing from a rotation center (shaft pin 25b).

The four pawls 32 are formed with external teeth 32a at top end portions of the arms thereof. The external teeth 32a can mesh with the internal gear 37a of the rotation plate 37. Each of the torsion springs 55 is hooked between a corresponding one of the pair of upper and front pawls 32 and a corresponding one of the pair of lower and rear pawls 32 among the four pawls 32.

The front torsion spring 55 is set in a state in which one end and the other end thereof are abutted against the upper pawl 32 and the front pawl 32, respectively, in a biasing direction in which a resilient force is applied to the upper pawl 32 and the front pawl 32. The rear torsion spring 55 is set in a state in which one end and the other end thereof are abutted against the lower pawl 32 and the rear pawl 32, respectively, in a biasing direction in which a resilient force is applied to the lower pawl 32 and the rear pawl 32.

By assembling the torsion springs 55, as illustrated in FIG. 18, the pawls 32 are constantly pressed and rotated radially outward around corresponding rotation centers (shaft pins 25b), and the external teeth 32a of the pawls 32 are held in a state of being meshed with the internal gear 37a of the rotation plate 37. Among the four pawls 32, a meshing force applied by the external teeth 32a to the internal gear 37a of the rotation plate 37 is different between the pair of upper and lower pawls 32 and the pair of front and rear pawls 32.

Specifically, the two upper and lower pawls 32 prevent the rotation of the rotation plate 37 in the clockwise direction (downward rotation direction) in the drawing by meshing the external teeth 32a with the internal gear 37a. However, when the rotation plate 37 is rotated in the counterclockwise direction (upward rotation direction) in the drawing, even if the external teeth 32a of the two upper and lower pawls 32 mesh with the internal gear 37a, as illustrated in FIG. 26, the two upper and lower pawls 32 slide on the internal gear 37a and release the rotation of the rotation plate 37.

On the other hand, as illustrated in FIG. 18, the two front and rear pawls 32 prevent the rotation of the rotation plate 37 in the counterclockwise direction (upward rotation direction) in the drawing by meshing the external teeth 32a with the internal gear 37a. However, when the rotation plate 37 is rotated in the clockwise direction (downward rotation direction) in the drawing, even if the external teeth 32a of the two front and rear pawls 32 mesh with the internal gear 37a, as illustrated in FIG. 21, the two front and rear pawls 32 slide on the internal gear 37a and release the rotation of the rotation plate 37.

The four pawls 32 are in the following state when the inner lever 53 is rotated in the clockwise direction (downward rotation direction) from the neutral position illustrated in FIG. 19. That is, as illustrated in FIG. 20, the two upper and lower pawls 32 are unmeshed from the internal gear 37a by the control plate 56 by the rotation and are held in this state. On the other hand, the two front and rear pawls 32 are held in a state of being meshed with the internal gear 37a. Accordingly, the four pawls 32 are brought into a state in which the rotation of the rotation plate 37 in the clockwise direction (downward rotation direction) in the drawing can be released (see FIG. 21).

When the operation of the inner lever 53 is returned to the neutral position as illustrated in FIG. 22 after the rotation plate 37 is rotated in the clockwise direction in the drawing, the two front and rear pawls 32 meshing with the internal gear 37a among the four pawls 32 prevent the rotation of the rotation plate 37 in the counterclockwise direction in the drawing and hold the rotation plate 37 in the fixed position as illustrated in FIG. 23. When the operation of the inner lever 53 (see FIG. 22) is returned to the neutral position, the rotation of the control plate 56 is returned to the initial position. Accordingly, as illustrated in FIG. 23, the two upper and lower pawls 32 are returned to the initial state of meshing with the internal gear 37a.

On the other hand, the four pawls 32 are in the following state when the inner lever 53 is rotated in the counterclockwise direction (upward rotation direction) from the neutral position illustrated in FIG. 24. That is, as illustrated in FIG. 25, the two front and rear pawls 32 are unmeshed from the internal gear 37a by the control plate 56 by the rotation and are held in this state. On the other hand, the two upper and lower pawls 32 are held in a state of being meshed with the internal gear 37a. Accordingly, the four pawls 32 are brought into a state in which the rotation of the rotation plate 37 in the counterclockwise direction (upward rotation direction) in the drawing can be released (see FIG. 26).

When the operation of the inner lever 53 is returned to the neutral position as illustrated in FIG. 27 after the rotation plate 37 is rotated in the counterclockwise direction in the drawing, the two upper and lower two pawls 32 meshing with the internal gear 37a among the four pawls 32 prevent the rotation of the rotation plate 37 in the clockwise direction in the drawing and hold the rotation plate 37 in the fixed position as illustrated in FIG. 28. When the operation of the inner lever 53 (see FIG. 27) is returned to the neutral position, the rotation of the control plate 56 is returned to the initial position. Accordingly, as illustrated in FIG. 28, the two front and rear pawls 32 are returned to the initial state of meshing with the internal gear 37a.

As illustrated in FIGS. 10, 12, and the like, the rotation plate 37 is formed of a substantially disk-shaped member whose surface faces the seat width direction. The rotation plate 37 is formed with the internal gear 37a at an outer peripheral portion. The internal gear 37a is half-punched into a shape that is extruded into a substantially cylindrical shape in the axial direction (rightward direction). The internal gear 37a is formed with, on its inner circumferential surface, internal teeth in an endless shape over the entire circumference. The internal teeth can mesh with the external teeth 32a of the four pawls 32.

The rotation plate 37 is further formed with a center hole 37c in a central portion (portion through which the central axis C passes) of the disk portion 37b. The center hole 37c penetrates the central portion in the axial direction in a round hole shape. A cylindrical second shaft portion 22d, which constitutes the axially intermediate portion of the output shaft 22, is rotatably fitted into the center hole 37c (see FIGS. 7 and 8).

The sun gear 37d protruding in the axial direction (leftward direction) is formed around the center hole 37c of the rotation plate 37. When the output shaft 22 is set in the center hole 37c of the sun gear 37d, the sun gear 37d is set among the three planetary gears 63 of the planetary carrier 62 assembled to the intermediate portion of the output shaft 22, and is gear-coupled to the planetary gears 63 to transmit power.

Accordingly, w % ben the three planetary gears 63 are rotated accompanying the rotation of the output shaft 22, the sun gear 37d receives the transmission of the rotational driving force and rotates. Specifically, the sun gear 37d rotates by increasing the speed at which the three planetary gears 63 rotate in the internal gear 23e of the body base 23 by the gear ratio of the meshing.

Next, configurations of the planetary carrier 62 and the three planetary gears 63 constituting the speed increasing unit U will be described with reference to FIGS. 10, 12, and the like. The specific configuration and function of the rotation plate 37 constituting the speed increasing unit U are as described above.

The planetary carrier 62 is formed of a substantially ring-shaped member whose surface faces the seat width direction. The planetary carrier 62 is formed with a spline hole 62a in a central portion (portion through which the central axis C passes). The spline hole 62a has a form of an internal gear and penetrates the central portion in the axial direction.

An external gear-shaped first spline 22c, which constitutes the axially intermediate portion of the output shaft 22, is inserted into the spline hole 62a from the left side and is integrally fitted to the spline hole 62a in the rotation direction. By the fitting described above, the planetary carrier 62 is coupled to the output shaft 22 in a state of being integrated with the output shaft 22 in the rotation direction.

The planetary carrier 62 is formed with shaft pins 62b in three positions in the circumferential direction on the ring plate. The shaft pins 62b protrude in a round pin shape in the axial direction (rightward direction). The three planetary gears 63 are fitted into the corresponding shaft pins 62b from the right side and are rotatably coupled to the shaft pins 62b.

Each of the three planetary gears 63 is a substantially disk-shaped external gear whose surface faces the seat width direction. Each of the three planetary gears 63 is formed with a center hole 63a penetrating a central portion of the planetary gear 63 in a round hole shape in the axial direction. Each of the shaft pins 62b of the planetary carrier 62 is fitted into the corresponding center hole 63a from the right side so that the three planetary gears 63 are rotatably coupled to the shaft pins 62b.

The planetary gears 63 are set in a state of being meshed with the internal gear 23e of the body base 23 by being assembled to the body base 23 via the planetary carrier 62 and the output shaft 22 (see FIG. 13 and the like). As a result of the assembly described above, when the output shaft 22 is rotated in either direction, the planetary gears 63 revolve while rotating on its own axis in the corresponding rotation direction along the internal gear 23e of the body base 23.

Next, configurations of the friction ring 57 and the control piece 58 constituting the friction generation unit G will be described with reference to FIGS. 10, 12, and the like. The friction ring 57 is formed of an opened ring member. The friction ring 57 is fitted to the outer peripheral portion of the rotation plate 37. Both the end portions 57a of the friction ring 57 are bent obliquely to approach each other in a mountain shape toward the radially outer side.

The control piece 58 is formed of a substantially truncated triangular columnar shaped member fitted between the end portions 57a of the friction ring 57. The control piece 58 is sandwiched between the end portions 57a of the friction ring 57. The control piece 58 is set in a state in which the slide groove 58a, which is formed in a left side surface of the control piece 58 and recessed in a shape extending in a stripe shape in the radial direction, is fitted to the guide protrusion 23g formed on the body base 23 from the right side.

Further, as illustrated in FIG. 10 and the like, the control piece 58 is set in a state in which a round pin-shaped engagement pin 58b, which protrudes from a right side surface of the control piece 58, is inserted from the left side into a riding hole 56h formed along the outer peripheral portion of the control plate 56. The riding hole 56h has a shape extending in an arc shape drawn around the central axis C of the control plate 56. The riding hole 56h communicates with a relief hole 56g via an inclined joint at an end portion of the riding hole 56h on a counterclockwise side illustrated in FIG. 10. The riding hole 56h has a slightly small diameter and extends in a concentric arc shape in the counterclockwise direction in the drawing.

As illustrated in FIG. 17, when the outer lever 41 integrally formed with the control plate 56 is in the neutral position, the engagement pin 58b of the control piece 58 is located at the end portion of the riding hole 56h of the control plate 56 on the counterclockwise side in the drawing. In this state, the control piece 58 is extruded radially outward relative to the body base 23, the width between both the end portions 57a of the friction ring 57 is enlarged by both inclined surfaces of the truncated triangular columnar shape, so that the state in which the friction ring 57 is pressed against the rotation plate 37 is released.

As illustrated in FIG. 19, when the outer lever 41 is rotated in the clockwise direction (downward rotation direction) from the neutral position, the engagement pin 58b of the control piece 58 is pulled into the relief hole 56g from the riding hole 56h of the control plate 56, and is pulled radially inward relative to the body base 23. Accordingly, the control piece 58 releases the state in which the width between the end portions 57a of the friction ring 57 is enlarged. As a result, the friction ring 57 is pressed against the outer peripheral portion of the rotation plate 37 by the elastic force, and a sliding friction resistance force is applied to the rotation of the rotation plate 37.

Specifically, in the control piece 58, the engagement pin 58b is pulled into the relief hole 56g of the control plate 56 before the outer lever 41 is rotated in the clockwise direction (downward rotation direction) in the drawing and the two pawls 32 are unmeshed from the internal gear 37a of the rotation plate 37 as illustrated in FIG. 20. Then, when the outer lever 41 is further rotated in the clockwise direction (downward rotation direction) in the drawing, the two pawls 32 are unmeshed from the internal gear 37a of the rotation plate 37.

With such a configuration, it is possible to unlock the output shaft 22 after a friction force is applied to the output shaft 22 that receives the weight of the seat 1, and to release the lock quietly in a state in which the weight of the seat 1 is less likely to be applied. After the lock is released, the output shaft 22 can be rotated in a direction (clockwise direction in the drawing) in which the output shaft 22 is smoothly rotated downward while maintaining a state in which a friction force is applied to the output shaft 22.

On the other hand, as illustrated in FIG. 24, when the outer lever 41 is rotated in the counterclockwise direction (upward rotation direction) from the neutral position, the engagement pin 58b of the control piece 58 slides in the riding hole 56h of the control plate 56. For this reason, the control piece 58 is held in a state of being extruded radially outward relative to the body base 23 and the friction ring 57 is released from being pressed against the rotation plate 37. Therefore, when the outer lever 41 is rotated in the counterclockwise direction (upward rotation direction) from the neutral position, no friction force is applied from the friction ring 57 to the rotation plate 37.

Next, the configuration of the control plate 56 will be described with reference to FIGS. 9 to 12 and the like. The control plate 56 integrally has a double inner and outer ring plate shape whose surface faces the seat width direction. In the control plate 56, a ring plate on an inner peripheral side and a ring plate on an outer peripheral side are coupled in two positions in the circumferential direction by coupling portions 56c. The control plate 56 has a shape in which the ring plate on the inner peripheral side is shifted to the left side relative to the ring plate on the outer peripheral side via the coupling portions 56c.

The control plate 56 is formed with a center hole 56a in a central portion (portion through which the central axis C passes). The center hole 56a penetrates the central portion in the axial direction in a round hole shape. The cylindrical second shaft portion 22d, which constitutes the axially intermediate portion of the output shaft 22, is rotatably fitted into the center hole 56a (see FIGS. 7 and 8).

The control plate 56 is formed with the insertion grooves 56d in an outer peripheral portion of the ring plate on the outer peripheral side in two positions in the circumferential direction. The insertion grooves 56d are recessed radially inward. The arms 41c extending leftward from the outer lever 41 are fitted into the corresponding insertion grooves 56d from the right side. Accordingly, the control plate 56 is coupled to the outer lever 41 in a state of being integrated with the outer lever 41 in the rotation direction (see FIG. 18).

The control plate 56 is formed with hooking portions 56b at an outer peripheral portion of the ring plate on the inner peripheral side in four positions in the circumferential direction. The hooking portions 56b bulge radially outward in a claw shape. As illustrated in FIGS. 20 and 25, when the control plate 56 is rotated in either direction, the hooking portions 56b are pressed against corresponding claw portions formed on inner peripheral portions of the four pawls 32, and are operated to unmesh the claw portions from the internal gear 37a of the rotation plate 37.

As illustrated in FIG. 10 and the like, the riding hole 56h and the relief hole 56g are formed in the outer peripheral portion of the ring plate on the outer peripheral side of the control plate 56. Specific configurations and functions of the riding hole 56h and the relief hole 56g are as described above.

As illustrated in FIGS. 10, 12, and the like, the output shaft 22 includes the pinion gear 22a, the first shaft portion 22b, the flange 22h, the first spline 22c, the second shaft portion 22d, the second spline 22e, the third shaft portion 22f, and the fourth shaft portion 22g arranged side by side on the same axis from the left side. The coupling of the portions of the output shaft 22 to other members is as described above. The output shaft 22 has a both-end support structure in which the second shaft portion 22d is fitted into the center hole 23c of the body base 23 to be rotatably supported, and the fourth shaft portion 22g is fitted into the center hole 24a of the cover 24 to be rotatably supported.

Next, a configuration of the plate spring 73 constituting the slippage preventing unit D will be described with reference to FIGS. 9 to 12 and the like. The specific configuration and function of the output plate 75 constituting the slippage preventing unit D are as described above.

As illustrated in FIG. 9 and the like, the plate spring 73 is formed of a substantially ring-shaped member whose surface faces the seat width direction. The plate spring 73 is formed with the pressing pieces 73a in two positions in the circumferential direction at the outer peripheral portion of the ring plate. The pressing pieces 73a are bent at a right angle and protrude in the axial direction (rightward direction). Each of the pressing pieces 73a has an inclined surface 73b on an end surface of a protruding top (see FIG. 30). The inclined surface 73b is inclined to reduce the protrusion in the counterclockwise direction in the drawing.

The plate spring 73 is further formed with the fitting pieces 73c in positions that are symmetrical in the circumferential direction with the position where the plate spring 73 is hooked by the latch portion 75a of the output plate 75. The fitting pieces 73c are bent at a right angle and protrude in the axial direction (rightward direction) from the inner peripheral edge and are arranged side by side in two positions in the circumferential direction. The fitting pieces 73c are spaced apart from each other in the circumferential direction. Each of the fitting pieces 73c has the inclined surface 73d on an end surface of a protruding top (see FIG. 31). The inclined surface 73d is inclined to reduce the protrusion in the counterclockwise direction in the drawing.

The plate spring 73 is further formed with pressing portions 73e in two positions in the circumferential direction in which an inner peripheral portion in the position where the plate spring 73 is hooked by the latch portion 75a of the output plate 75 is sandwiched. The pressing portions 73e extend opposite to each other in a cantilever shape in the circumferential direction. Each of the pressing portions 73e has a shape in which an extending intermediate portion is bent leftward in a crank shape. Each of the pressing portions 73e has an end portion on its extending top pressed against a right side surface of the outer peripheral portion of the output plate 75.

By the above-described assembly, an elastic force for pressing the plate spring 73 rightward is applied to the plate spring 73 with the pressing portions 73e pressed against the output plate 75 as a fulcrum. As illustrated in FIG. 17, when the inner lever 53 is in the initial neutral position, the plate spring 73 is held in a state in which the pressing pieces 73a and the fitting pieces 73c protrude rightward with the position where the plate spring 73 is hooked by the latch portion 75a as a fulcrum (see FIGS. 30 and 31).

By the protrusion described above, as illustrated in FIG. 31, the fitting pieces 73c of the plate spring 73 are fitted into the corresponding fitting holes 24j of the cover 24. Accordingly, the plate spring 73 locks the movement of the output plate 75 and the output shaft 22, which are integrally coupled to the plate spring 73, in the downward rotation direction (the left direction in the drawing). However, since the inclined surface 73d of each of the fitting pieces 73c abuts against the inner peripheral surface of the corresponding fitting hole 24j, the plate spring 73 allows the movement of the output plate 75 and the output shaft 22 in the upward rotation direction (right direction in the drawing). The operation of allowing this movement will be described later.

The plate spring 73 releases the lock state when the outer lever 41 is rotated in the clockwise direction (downward rotation direction) as illustrated in FIG. 19 from the neutral position illustrated in FIG. 17 and the rotation transmission plate 36 is rotated in the clockwise direction as illustrated in FIG. 19. Specifically, by the rotation of the rotation transmission plate 36, the pressing portions 36d formed on the rotation transmission plate 36 ride on the pressing pieces 73a of the plate spring 73 and press the pressing pieces 73a leftward (see FIG. 32).

Specifically, the pressing portions 36d of the rotation transmission plate 36 slide on the inclined surfaces 73b of the pressing pieces 73a of the plate spring 73 and ride on right end surfaces of the pressing pieces 73a. When the pressing pieces 73a are pressed leftward by the above-described riding, the plate spring 73 pulls the fitting pieces 73c leftward from the corresponding fitting holes 24j of the cover 24 (see FIG. 33). Accordingly, the lock state of the output plate 75 and the output shaft 22 in the downward rotation direction (leftward direction in the drawing) is released.

The unlocking of the plate spring 73 described above is performed preceding to the unlocking of the pawls 32 accompanying the rotation of the outer lever 41 in the downward rotation direction. With such a configuration, it is possible to appropriately prevent an excessive load from being applied to fitting portions between the fitting pieces 73c of the plate spring 73 and the fitting holes 24j of the cover 24 due to the preceding release of the pawls 32.

Then, by the downward rotation of the outer lever 41 after the above-described unlocking of the plate spring 73 is performed, the end portions of the elongated holes 36e of the rotation transmission plate 36 described with reference to FIG. 9 and the like abut against the corresponding engagement pins 75d of the output plate 75. Accordingly, the output plate 75 rotates integrally with the rotation transmission plate 36 in the downward rotation direction.

When an excessive load is applied to the seat cushion 3 from above during the downward rotation, an excessive load in the downward rotation direction exceeding the friction force of the friction ring 57 may be applied to the output shaft 22. When such an excessive load is applied to the output shaft 22, as illustrated in FIG. 34, the output plate 75 integrated with the output shaft 22 may slip to rotate in the downward rotation direction preceding to the rotation transmission plate 36.

However, when such slippage occurs, the fitting pieces 73c of the plate spring 73 are released from being pressed by the pressing portions 36d of the rotation transmission plate 36 accompanying the preceding rotation of the output plate 75 (see FIG. 35). Accordingly, as illustrated in FIG. 36, the fitting pieces 73c of the plate spring 73 are fitted into the corresponding fitting holes 24j of the cover 24 again by the elastic force. By the fitting described above, the movement of the output plate 75 and the output shaft 22 in the downward rotation direction is locked. Therefore, the slippage of the output shaft 22 when the excessive load is input can be prevented at an early stage.

On the other hand, when the outer lever 41 is rotated in the counterclockwise direction (upward rotation direction) as illustrated in FIG. 24 from the neutral position illustrated in FIG. 17 and the rotation transmission plate 36 is rotated in the counterclockwise direction, the plate spring 73 allows the rotation in the counterclockwise direction. Specifically, in response to the rotation in the counterclockwise direction, the output plate 75 rotates integrally with the rotation transmission plate 36 (see FIG. 37). Accordingly, as illustrated in FIG. 38, the plate spring 73 that rotates integrally with the output plate 75 rotates the fitting pieces 73c fitted into the fitting holes 24j of the cover 24 in the counterclockwise direction (rightward direction in the drawing).

By the rotation described above, the fitting pieces 73c of the plate spring 73 press the inclined surfaces 73d against inner peripheral surfaces of the fitting holes 24j in the rotation direction (rightward direction in the drawing). Accordingly, the fitting pieces 73c of the plate spring 73 are pressed leftward against the elastic force by the counterforce caused by the abutment between the inclined surfaces 73d and the inner peripheral surfaces of the fitting holes 24j, and are released leftward from the fitting holes 24j. With the progress of the above-described movement, the plate spring 73 allows the output plate 75 and the output shaft 22 to move in the upward rotation direction.

Summary

In summary, the seat lifter device 10 according to the first embodiment has the following configuration. In the following description, reference numerals in parentheses correspond to respective configurations described in the above-described embodiment.

That is, a seat lifter device (10) includes an output shaft (22) configured to raise and lower a seat (1) in accordance with a rotational operation amount of an operation handle (5). The seat lifter device (10) includes a support unit (S) that supports the output shaft (22) such that the output shaft (22) is rotatable, and an input unit (N) rotatably coupled to the support unit (S) and integrally coupled to the operation handle (5). The seat lifter device (10) further includes a feed unit (A) that transmits rotation of the input unit (N) to the output shaft (22), and a lock unit (B) that locks rotation of the output shaft (22) relative to the support unit (S). The seat lifter device (10) further includes a friction generation unit (G) provided between the support unit (S) and a rotation member (37) configured to rotate together with the output shaft (22), and a slippage preventing unit (D) provided in a power transmission path between the output shaft (22) and the feed unit (A).

The feed unit (A) is of a ratchet type, transmits bidirectional rotation of the input unit (N) from a neutral position to the output shaft (22), and does not transmit rotation of the input unit (N) returning to the neutral position to the output shaft (22). The lock unit (B) unlocks the output shaft (22) in response to an operation of the input unit (N) rotating from the neutral position, and locks the rotation of the output shaft (22) in response to an operation of the input unit (N) returning to the neutral position.

The friction generation unit (G) applies a friction force between the rotation member (37) and the support unit (S) in response to the operation of the input unit (N) rotating in a direction in which the seat (1) is lowered, thereby stopping preceding rotation of the output shaft (22) due to a weight of the seat (1). The slippage preventing unit (D) transmits rotation of the feed unit (A) to the output shaft (22) by the operation of the input unit (N) rotating from the neutral position. When the input unit (N) rotates in the direction in which the seat (1) is lowered and the output shaft (22) rotates preceding to the feed unit (A) against the friction force of the friction generation unit (G) to slip, the slippage preventing unit (D) is fitted to the support unit (S) by an elastic force in response to the slippage of the output shaft (22) to stop the slippage.

According to the above-described configuration, when the input unit (N) is rotated in the direction in which the seat (1) is lowered, the lock unit (B) is unlocked and the output shaft (22) is fed in a rotation direction in which the seat (1) is lowered via the feed unit (A). At this time, the output shaft (22) is prevented from slipping due to the weight of the seat (1) by the friction generation unit (G). Even when an excessive load in a downward rotation direction that exceeds the friction force of the friction generation unit (G) is input to the output shaft (22) from an output side, the slippage preventing unit (D) is fitted to the support unit (S) so that a slip rotation is prevented. Therefore, it is possible to appropriately stop the slippage of the seat (1) when the seat (1) is lowered.

The slippage preventing unit (D) is fitted to the support unit (S) in an axial direction. According to the above-described configuration, the slippage preventing unit (D) can be configured in a relatively space-saving manner.

In response to the operation of the feed unit (A) rotating to a position in which the slippage of the output shaft (22) does not occur by the rotation of the input unit (N), the slippage preventing unit (D) in a state of being fitted to the support unit (S) is released from the state of being fitted to the support unit (S) against the elastic force. According to the above-described configuration, even after the slippage preventing unit (D) is fitted to the support unit (S), the slippage preventing unit (D) can be returned to a state in which the slippage preventing unit (D) can function again by the feed unit (A) rotating to the position in which the slippage does not occur.

The slippage preventing unit (D) is fitted to the support unit (S) by the elastic force even when the input unit (N) is in the neutral position. The slippage preventing unit (D) is released from the state of being fitted to the support unit (S) against the elastic force when the input unit (N) rotates in the direction in which the seat (1) is lowered, thereby allowing the output shaft (22) to rotate. The slippage preventing unit (D) has an inclined surface (73d), and is released from the state of being fitted to the support unit (S) against the elastic force by the inclined surface (73d) being abutted against the support unit (S) when the input unit (N) rotates in a direction in which the seat (1) is raised, thereby allowing the output shaft (22) to rotate.

According to the above-described configuration, it is possible to prevent the output shaft (22) from slipping even when the input unit (N) is in the neutral position. Even with such a configuration, the slippage preventing unit (D) can avoid hindering the input unit (N) from rotating in the direction in which the seat (1) is raised.

The slippage preventing unit (D) is released from the state of being fitted to the support unit (S) before the lock unit (B) unlocks the output shaft (22) when the input unit (N) rotates from the neutral position in the direction in which the seat (1) is lowered. According to the above-described configuration, the lock unit (B) can be prevented from being released first and an excessive load can be prevented from being applied to the slippage preventing unit (D).

Other Embodiments

Although embodiments of the present disclosure have been described above using one embodiment, the present disclosure can be implemented in various forms described below in addition to the above-described embodiment.

1. The seat lifter device of the present disclosure can be widely applied not only to a seat mounted on a vehicle other than an automobile, such as a railway, but also to a seat mounted on a vehicle other than a vehicle, such as an aircraft or a ship. The seat lifter device can be widely applied to non-vehicle seats such as grandstands and massage seats installed in various facilities such as sports facilities, theaters, concert venues, and event venues.

2. The friction generation unit may weaken the pressure applied to the rotation member instead of releasing the pressure when the input unit is in the neutral position and when the input unit rotates in a direction to raise the seat. One of the portion of the friction generation unit that is pressed against the rotation member and the portion of the rotation member that is pressed by the friction generation unit may have a square shape or another irregular shape instead of a circular shape.

The friction generation unit may be pressed against the rotation member from a plurality of positions (for example, two positions, three positions, or four positions) in the rotation direction individually, in addition to being pressed against the rotation member from the outer peripheral side in a surrounding manner. The friction generation unit may be pressed against the rotation member in a thrust direction to generate a friction force, in addition to from the inner peripheral side to generate a friction force. The rotation member to which the friction generation unit applies the friction force may be a member ("rotation transmission plate 36" or "output plate 75" described in the first embodiment) that rotates integrally with the output shaft, in addition to a member ("rotation plate 37" described in the first embodiment) of which the rotation speed is increased via the speed increasing unit.

3. The slippage preventing unit may be fitted to the support unit in a radial direction. The slippage preventing unit may be not fitted to the support unit in a state where the input unit is in the neutral position. When the input unit is rotated from the neutral position in the direction in which the seat is lowered, either of the slippage preventing unit and the lock unit may be first unlocked, or the lock unit may be first unlocked.

What is claimed is:

1. A seat lifter device comprising:
an output shaft configured to raise and lower a seat in accordance with a rotational operation amount of an operation handle;
a support unit that supports the output shaft such that the output shaft is rotatable;
an input unit rotatably coupled to the support unit and integrally coupled to the operation handle;
a ratchet-type feed unit configured to transmit rotation of the input unit to the output shaft, the feed unit being configured to transmit bidirectional rotation of the input unit from a neutral position to the output shaft and not to transmit rotation of the input unit returning to the neutral position to the output shaft;
a lock unit configured to lock rotation of the output shaft relative to the support unit, the lock unit being configured to unlock the output shaft in response to an operation of the input unit rotating from the neutral position and to lock the rotation of the output shaft in response to an operation of the input unit returning to the neutral position;
a friction generation unit provided between the support unit and a rotation member configured to rotate together with the output shaft, the friction generation unit being configured to apply a friction force between the rotation member and the support unit in response to an operation of the input unit rotating in a direction in which the seat is lowered, thereby stopping preceding rotation of the output shaft due to a weight of the seat; and
a slippage preventing unit provided in a power transmission path between the output shaft and the feed unit and configured to transmit rotation of the feed unit to the output shaft by the operation of the input unit rotating from the neutral position, wherein the slippage preventing unit is operable to, when the input unit rotates in the direction in which the seat is lowered and the output shaft rotates against the friction force of the friction generation unit prior to rotation induced by the feed unit to initially slip, the slippage preventing unit is operable to engage with the support unit by an elastic force in response to the initial slip of the output shaft to stop further slippage.

2. The seat lifter device according to claim 1, wherein the slippage preventing unit is fitted to the support unit in an axial direction.

3. The seat lifter device according to claim 1, wherein, in response to the rotation of the feed unit rotating to a position in which the slippage of the output shaft does not occur by the rotation of the input unit, the slippage preventing unit in a state of being fitted to the support unit is released from the state against the elastic force.

4. The seat lifter device according to claim 3, wherein the slippage preventing unit is fitted to the support unit by the elastic force even when the input unit is in the neutral position, wherein the slippage preventing unit is released from the state of being fitted to the support unit against the elastic force when the input unit rotates in the direction in which the seat is lowered, thereby allowing the output shaft to rotate, and wherein the slippage preventing unit has an inclined surface, and is released from the state of being fitted to the support unit against the elastic force by the inclined surface being abutted against the support unit when the input unit rotates in a direction in which the seat is raised, thereby allowing the output shaft to rotate.

5. The seat lifter device according to claim 4, wherein the slippage preventing unit is released from the state of being fitted to the support unit before the lock unit unlocks the output shaft when the input unit rotates from the neutral position in the direction in which the seat is lowered.

6. The seat lifter device according to claim 1, wherein the support unit has a fitting hole, and the slippage preventing unit includes a fitting piece that protrudes therefrom, and wherein the slippage preventing unit is fitted to the support unit such that the fitting piece is fitted into the fitting hole by the elastic force.

* * * * *